United States Patent
Onoe

(10) Patent No.: US 9,607,648 B2
(45) Date of Patent: Mar. 28, 2017

(54) RECORDING/REPRODUCING APPARATUS AND RECORDING MEDIUM

(71) Applicant: HITACHI CONSUMER ELECTRONICS CO., LTD., Yokohama-shi, Kanagawa (JP)

(72) Inventor: Shinsuke Onoe, Tokyo (JP)

(73) Assignee: Hitachi Consumer Electronics Co., Ltd., Kanagawa (JP)

(*) Notice: Subject to any disclaimer, the term of this patent is extended or adjusted under 35 U.S.C. 154(b) by 0 days.

(21) Appl. No.: 14/647,465

(22) PCT Filed: Nov. 30, 2012

(86) PCT No.: PCT/JP2012/081021
§ 371 (c)(1),
(2) Date: May 27, 2015

(87) PCT Pub. No.: WO2014/083671
PCT Pub. Date: Jun. 5, 2014

(65) Prior Publication Data
US 2015/0318011 A1 Nov. 5, 2015

(51) Int. Cl.
*G11B 7/095* (2006.01)
*G11B 7/007* (2006.01)
*G11B 7/0065* (2006.01)
*G11B 7/09* (2006.01)
*G11B 7/005* (2006.01)
(Continued)

(52) U.S. Cl.
CPC ........ *G11B 7/00781* (2013.01); *G11B 7/0053* (2013.01); *G11B 7/0065* (2013.01); *G11B 7/00736* (2013.01); *G11B 7/083* (2013.01); *G11B 7/09* (2013.01); *G11B 7/0953* (2013.01);
(Continued)

(58) Field of Classification Search
None
See application file for complete search history.

(56) References Cited

U.S. PATENT DOCUMENTS

| 4,884,259 A | 11/1989 | Horikawa et al. |
| 2005/0088947 A1 | 4/2005 | Ichihara et al. |
| 2010/0085859 A1* | 4/2010 | Takahashi .......... G11B 7/08564 369/103 |

FOREIGN PATENT DOCUMENTS

| JP | 58-169354 A1 | 10/1983 |
| JP | 61-57084 A | 3/1986 |
(Continued)

*Primary Examiner* — Brian Butcher
(74) *Attorney, Agent, or Firm* — Mattingly & Malur, PC

(57) ABSTRACT

This recording/reproducing apparatus that records or reproduces information by radiating light to a recording medium is provided with: a medium rotating unit that rotates the recording medium; a moving unit having a movable unit that is capable of moving within a predetermined plane; a rotation angle detecting unit that detects a rotating angle of the recording medium using an angle detection mark that is provided on the recording medium; a position detecting unit that detects a position of the recording medium using an eccentricity detection mark that is provided on the recording medium; and a member for fixing the rotation angle detecting unit and the position detecting unit. With respect to the member, the movable unit relatively moves within a plane substantially parallel to the recording surface of the recording medium, and the medium rotating unit is fixed to the movable unit.

19 Claims, 25 Drawing Sheets

(51) Int. Cl.
*G11B 7/08* (2006.01)
*G11B 27/24* (2006.01)
*G11B 7/24* (2013.01)
*G11B 7/0037* (2006.01)

(52) U.S. Cl.
CPC ............ *G11B 7/0037* (2013.01); *G11B 27/24* (2013.01); *G11B 2007/240025* (2013.01)

(56) References Cited

FOREIGN PATENT DOCUMENTS

| | | |
|---|---:|---|
| JP | 61-107569 A | 5/1986 |
| JP | 6-215382 A | 8/1994 |
| JP | 2005-107114 A | 4/2005 |
| JP | 4963509 B2 | 6/2012 |

* cited by examiner

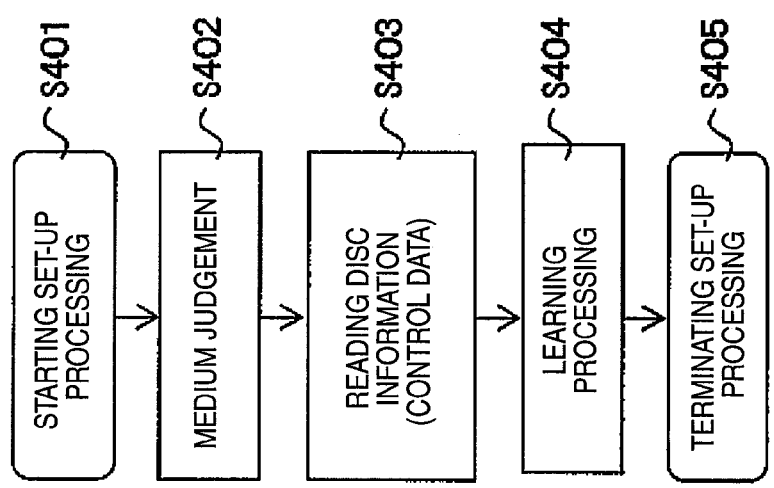
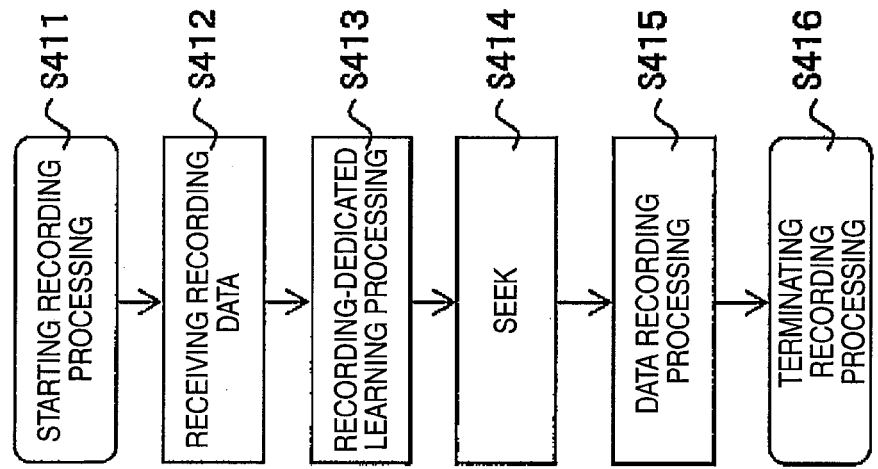
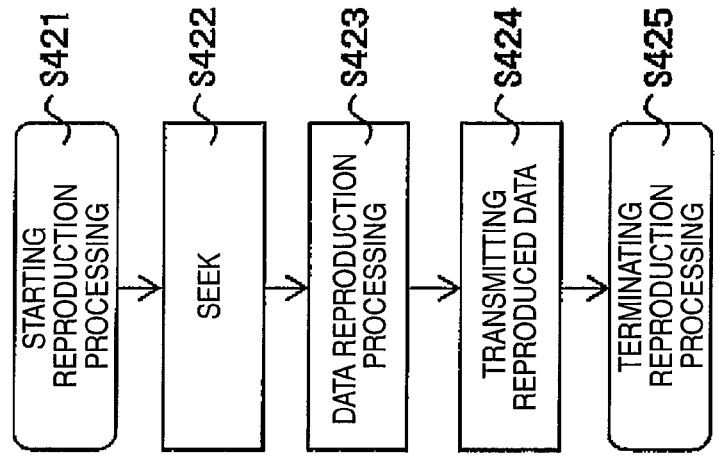

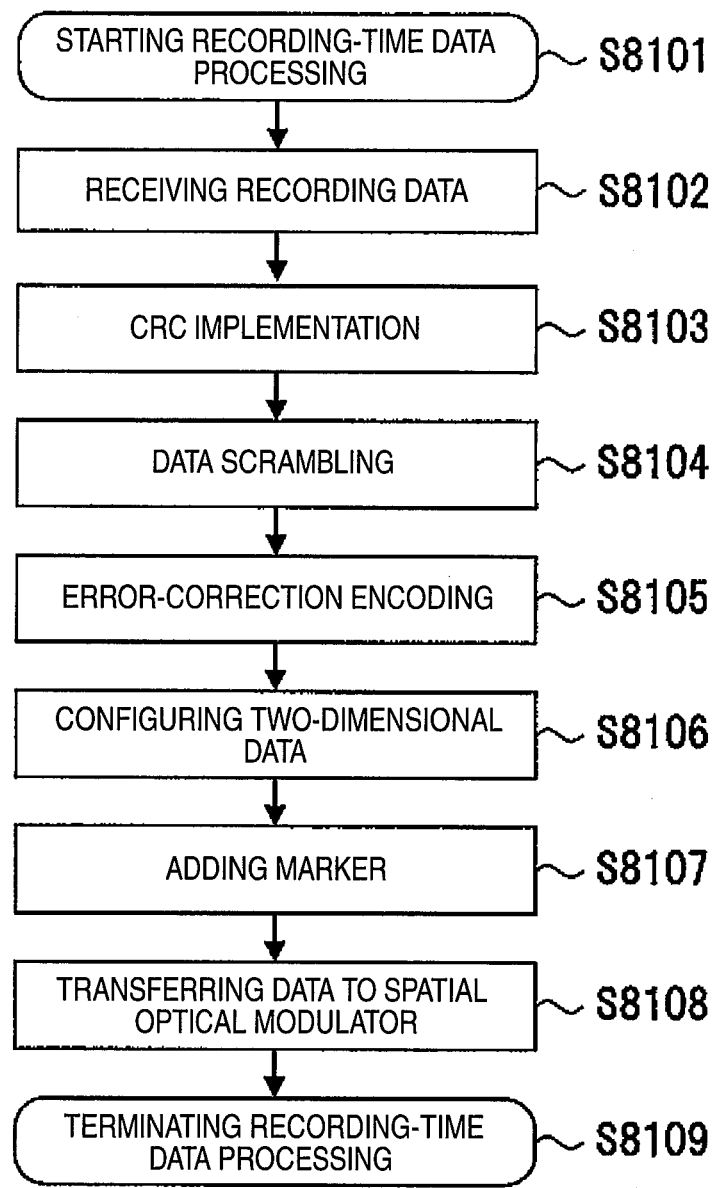

RECORDING/REPRODUCING APPARATUS AND RECORDING MEDIUM

TECHNICAL FIELD

The present invention relates to an apparatus for performing recording or reproduction, and a recording medium. More specifically, it relates to an apparatus for performing recording or reproduction using holography, and a hologram recording medium.

BACKGROUND ART

At present, based on the Blu-ray Disc™ standard using a blue-violet semiconductor laser, the commercialization of an optical disc having about the 50-GB recording capacity is also becoming increasingly available in its consumer-product use. From now on, it is also wished in the optical disc to accomplish its larger-capacity implementation up to about the HDD (Hard Disk Drive) recording capacity, i.e., 100 GB through 1 TB.

In order to implement an ultra-high recording density like this by using the optical disc, however, it is required to provide a high-density implementation technology which is based on a new scheme. Here, this new scheme is needed to be different from the high-density implementation technology based on the shorter-wavelength implementation and objective lens' higher NA implementation.

In the circumstances where the studies concerning next-generation storage technologies are underway, attention is focused on a hologram recording technology for recording digital information by using holography.

The hologram recording technology is the following technology: A signal light, which has page-data information modulated in a two-dimensional manner by a spatial optical modulator, is superimposed on a reference light within a recording medium. Then, a refractive-index modulation is caused to occur within the recording medium by an interference-fringe pattern produced at the time of this superimposition, thereby recording the information into the recording medium.

At the time of reproducing the information, the reference light used at the information-recording time is irradiated onto the recording medium. As a result of this irradiation, the hologram recorded within the recording medium operates as if it is a diffraction grating, thereby generating a diffraction light. This diffraction light is reproduced as the identical light, including the signal light and phase information recorded.

The signal light reproduced is detected in a two-dimensional manner and at a high speed, using an optical detector such as CMOS or CCD. In this way, the hologram recording technology allows two-dimensional information to be recorded into an optical recording medium at a stroke by using a single hologram. Moreover, this technology allows this information to be reproduced. Furthermore, this technology makes it possible to overwrite plural pieces of page data at a location where the recording medium exists. These features make it possible to accomplish the large-capacity and high-speed recording/reproduction of information.

As the configuration of a hologram recording/reproducing apparatus, the description is given in PATENT LITERATURE 1, for example. In the present document, the following description is given: "The shape of a recording medium 1 is a disk-like shape, for example, and this recording medium 1 is fixed onto a spindle motor 200 by a clamp mechanism. The rotational driving of the spindle motor 200 is so designed as to allow the irradiation position of a coherent beam on the recording medium to be displaced in the tangential direction. The spindle motor 200 is fixed onto a thread motor 201. The rotational-transportation driving of the thread motor 201 is so designed as to allow the irradiation position of the coherent beam on the recording medium to be displaced in the radial direction as well."

CITATION LIST

Patent Literature

PATENT LITERATURE 1: JP4963509

SUMMARY OF INVENTION

Technical Problem

By the way, when the hologram recording medium is taken as an example, one significant advantage of the hologram recording is a point of being capable of recording large-capacity data. If, however, the increase in the recording capacity is pursued, there occurs the following necessity: The accuracy of the positioning control over a position onto which the signal light or reference light is to be irradiated is needed to be enhanced more than conventionally.

In the case of the configuration where the hologram recording medium is fixed onto the spindle motor like the configuration in patent literature 1, the eccentricity becomes a problem as an example. The eccentricity refers to a state where the rotational center of the spindle motor does not coincide with the center of the disc-like hologram recording medium. The causes for the eccentricity are produced in the combination of the eccentricity of the hologram recording medium itself and the eccentricity of the hologram-recording-medium fixing portion fixed onto the rotational axis of the spindle motor. Whatever of these causes is attributed to a cause that is produced at the manufacturing steps. On account of this, there exists a feature that the manner in which the eccentricity is produced varies every time the hologram recording medium is inserted into the hologram recording/reproducing apparatus.

In the configuration given in patent literature 1, the position onto which the signal light or reference light is to be irradiated is changed by being displaced on the hologram recording medium. Here, this position's displacement is caused to occur by controlling the radius r by the thread motor and the rotational angle θ by the spindle motor, respectively.

Referring to FIG. 18, the explanation will be given below concerning problems occurring in the case where the eccentricity exists. Here, for simplicity, consideration is given to the case where the recording is performed at the recording time under the condition that the eccentricity does not exist, but where the eccentricity exists at the reproduction time. FIG. 18 (*a*) illustrates the ideal reference-light irradiation position, and consideration is given to the case where the hologram recorded with the radius r and the rotational angle θ is reproduced. A point O is the center of the disc-like hologram recording medium, and a point P is the ideal reference-light irradiation position. Since, here, the case is assumed where the recording is performed at the recording time under the condition that the eccentricity does not exist, the hologram is recorded at the point P.

Meanwhile, FIG. 18 (*b*) illustrates a hologram reproduction position in the case where the eccentricity exists. FIG. 18 (*b*) illustrates the state where, because of the eccentricity, the rotational center spO of the spindle motor does not coincide with the center of the disc-like hologram recording medium. At this time, if the mechanism structure is a structure that the radius r is determined with the rotational center spO of the spindle motor employed as the criterion, the reference-light irradiation position becomes a position of P'. Since the actual hologram is recorded at the point P, the reference light is not irradiated onto the proper position at the reproduction time. In this way, the reference-light irradiation position P' shifts by the amount Δp of the eccentricity.

In the conventional technologies, even if this difference Δp occurs, a problem is prevented from occurring by controlling the eccentricity amount Δp that arises in a manner of being attributed to the manufacturing steps. Namely, even if the reference-light irradiation position shifts by the amount Δp, the hologram is made reproducible by making the eccentricity amount Δp small. This requires that the eccentricity amount Δp be made smaller than a positioning tolerable amount Δp_th of the reference-light irradiation position.

In this way, the first of the problems in the case where the eccentricity exists is a deterioration of the hologram reproduction quality caused by the drawback that the reference-light irradiation position shifts by the amount Δp.

On the other hand, however, the request for implementing the high-density recording exists in the hologram as well. When the higher-density recording is implemented, the positioning tolerable amount Δp_th of the reference-light irradiation position becomes smaller. As a result, it becomes difficult to manufacture the apparatus and the medium in such a manner that the eccentricity amount Δp becomes smaller than the positioning tolerable amount Δp_th of the reference-light irradiation position.

In this case, the reference-light irradiation position is P', and accordingly the hologram cannot be reproduced properly. This gives rise to the occurrence of a requirement that a positioning operation referred to as "seek" be performed again in order to reproduce the target hologram. Namely, the second of the problems in the case where the eccentricity exists is a lowering of the reproduction transfer rate caused by a failure of the hologram reproduction.

In the above-described description, the explanation has been given in the case where the recording is performed at the recording time under the condition that the eccentricity does not exist, and where the eccentricity exists at the reproduction time. Actually, however, the eccentricity may be able to exist at the recording time as well. When explaining the contents in FIG. 18 (b) in a manner of being replaced by the recording time, the point P becomes the ideal hologram-recorded position and the point P' becomes the actual hologram-recorded position. Namely, in the case where the eccentricity exists at the recording time, the hologram-recorded position at which the hologram was supposed to be recorded with the radius r and the rotational angle θ turns out to shift. In the initial explanation at the reproduction time, the explanation has been given assuming that the hologram is recorded at the point P, i.e., the ideal position. However, when the eccentricity exists at the recording time, and when it differs from the eccentricity at the reproduction time, the point at which the hologram is actually recorded in FIG. 18 (b) is not the point P, but becomes the different position. Namely, if consideration is given to the eccentricity at the recording time as well, the above-described first and second problems become more conspicuous. In patent literature 1, however, no consideration is given to the eccentricity of the medium at all.

In this way, when trying to perform the high-density recording of the hologram, the request for the positioning tolerable amount Δp_th of the reference-light irradiation position becomes severer. In the conventional technologies, this fact makes it difficult to implement the recording/reproduction that is preferable for the hologram recording medium.

Accordingly, an object of the present invention is to provide an information recording/reproducing apparatus that allows implementation of the recording and/or reproduction that are preferable for the hologram recording medium.

Solution to Problem

The above-described problems can be solved by, for example, an invention that is disclosed in the scope of the appended claims.

Advantageous Effects of Invention

According to the present invention, it becomes possible to implement the recording and/or reproduction that are preferable for the recording medium.

BRIEF DESCRIPTION OF THE DRAWINGS

FIG. 4 (a) This is a flowchart up to completion of the preparation for the recording or reproduction in the hologram recording/reproducing apparatus.

FIG. 4 (b) This is a flowchart of the recording processing in the hologram recording/reproducing apparatus.

FIG. 4 (c) This is a flowchart of the reproduction processing in the hologram recording/reproducing apparatus.

FIG. 9 (b) This is a diagram for explaining an output signal from a first eccentricity detection sensor in the first embodiment.

FIG. 13 (b) This is a diagram for explaining the output signal from the first eccentricity detection sensor in the case where the fixed position of the first eccentricity detection sensor is changed.

FIG. 14 (b) This is a diagram for explaining problems in the case where the control method in the first embodiment is not used.

FIG. 15 (b) This is a diagram for illustrating the data processing flow at the reproduction time.

FIG. 18 (b) This is the diagram for explaining the case where the eccentricity exists.

DESCRIPTION OF EMBODIMENTS

Hereinafter, referring to drawings, the explanation will be given below concerning embodiments of the present invention.

Embodiment 1

Figure 1:
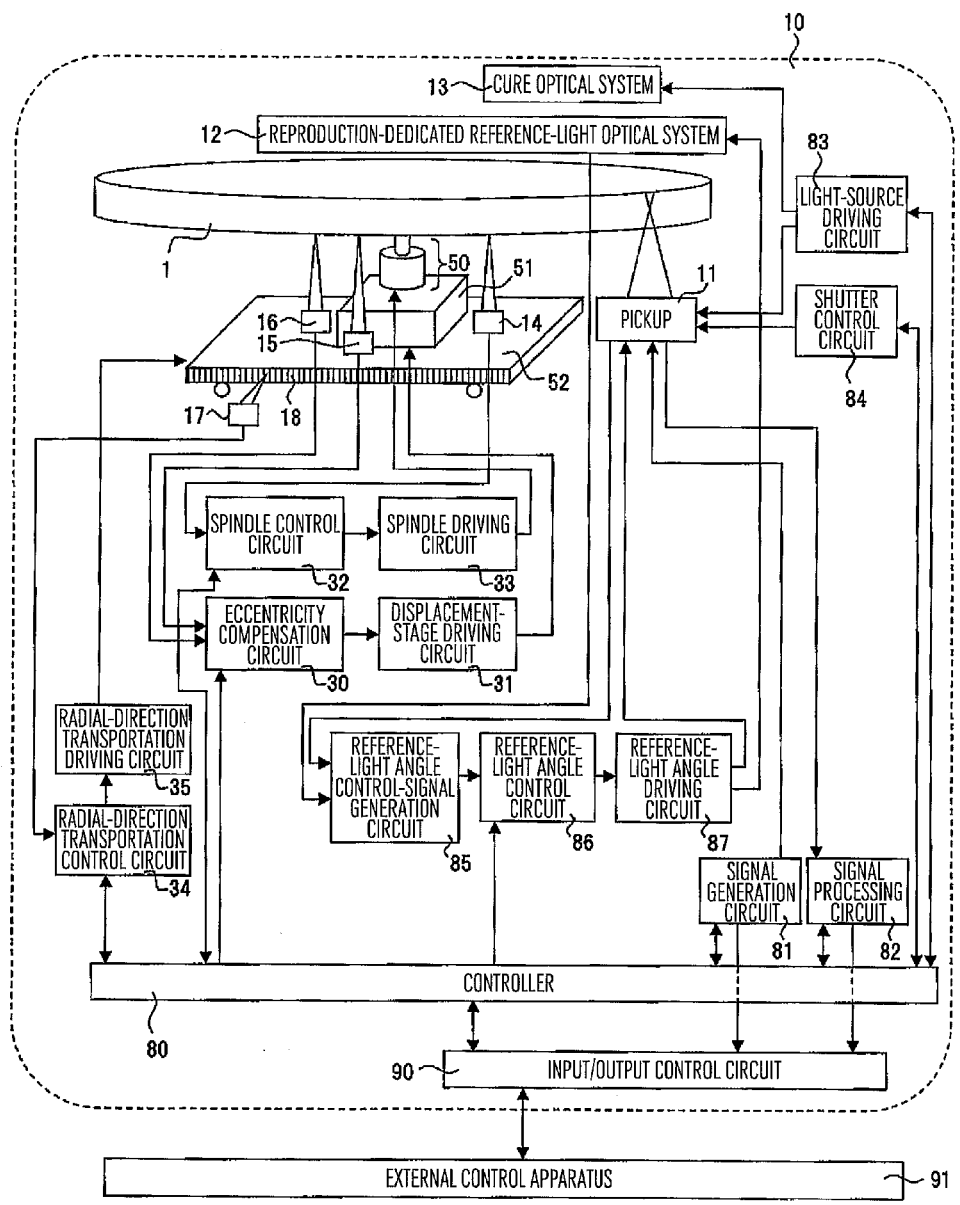
FIG. 1 This is a block diagram for illustrating a hologram recording/reproducing apparatus in a first embodiment.

In accordance with the accompanying drawings, the explanation will be given below regarding the embodiments of the present invention. FIG. 1 is a block diagram for illustrating a hologram recording medium's recording/reproducing apparatus for recording and/or reproducing digital information by using holography.

A hologram recording/reproducing apparatus 10 is connected to an external control device 91 via an input/output control circuit 90. When recording information into a hologram recording medium 1, the hologram recording/reproducing apparatus 10 receives the information signal to be recorded from the external control device 91 via the input/output control circuit 90. When reproducing information from the hologram recording medium 1, the hologram recording/reproducing apparatus 10 transmits the information signal reproduced to the external control device 91 via the input/output control circuit 90.

The hologram recording medium 1 in the present embodiment is a disc-like medium. Moreover, the hologram recording medium 1 in the present embodiment is equipped with two types of marks of a predetermined pattern. One of these marks is an angle-detection-dedicated mark, and is the mark for detecting the rotational angle of the hologram recording medium 1. The other mark is an eccentricity-detection-dedicated mark, and is the mark for detecting the position of the hologram recording medium 1. The details of these marks will be described layer.

The hologram recording/reproducing apparatus 10 includes a pickup 11, a reproduction-dedicated reference-light optical system 12, a cure optical system 13, a rotational-angle detection sensor 14, a first eccentricity detection sensor 15, a second eccentricity detection sensor 16, a radial-position detection sensor 17, a spindle motor 50, a displacement stage 51, and a radial-direction transportation unit 52.

The spindle motor 50 has a (not-illustrated) medium-detachable/attachable unit, which allows the hologram recording medium 1 to be detached/attached from/to the rotational axis of the spindle motor 50. The hologram recording medium 1 is so configured as to be made rotatable by the spindle motor 50. Simultaneously, the hologram recording medium 1 is so configured as to be made displaceable in the radial direction by the radial-direction transportation unit 52 with the position of the pickup 11 employed as its criterion.

Each of the displacement stage 51, the rotational-angle detection sensor 14, the first eccentricity detection sensor 15, and the second eccentricity detection sensor 16 is fixed onto a movable portion of the radial-direction transportation unit 52. Furthermore, the spindle motor 50 is fixed onto a movable portion of the displacement stage 51.

As a result of these fixings, the radial-direction transportation unit 52, which is drivable in the radial direction, is installed on a (not-illustrated) predetermined base member onto which the pickup 11 is fixed. The displacement stage 51, the first eccentricity detection sensor 15, the second eccentricity detection sensor 16, and the rotational-angle detection sensor 14 are fixed onto the movable portion of the radial-direction transportation unit 52. The spindle motor 50 is fixed onto the movable portion of the displacement stage 51. The hologram recording medium 1 equipped with the predetermined marks is fixable onto the rotational axis of the spindle motor 50.

Focusing attention on the movable portions, and describing the mechanism-based installation sequence results in the following mechanism: Namely, a mechanism is selected where the predetermined base member onto which the pickup 11 is fixed, the radial-direction transportation unit 52 onto whose movable portion the displacement stage 51, the first eccentricity detection sensor 15, the second eccentricity detection sensor 16, and the rotational-angle detection sensor 14 are fixed, the spindle motor 50, and the hologram recording medium 1 equipped with the predetermined marks are installed in this sequence.

The displacement stage 51 in the present embodiment, which is a movable stage of mutually-orthogonal two axes, is displaceable within a flat plane that is substantially parallel to the recording surface of the hologram recording medium 1. In the present embodiment, one of these movable axes is assumed to be the Y axis by being taken in the same direction as the transportation direction of the radial-direction transportation unit 52, and the other movable axis that is orthogonal thereto is assumed to be the X axis.

The position onto which the signal light and/or the reference light is to be irradiated is a position fixed onto the apparatus, and is determined by the position of the pickup 11 (which will be described later). In the present embodiment, the spindle motor 50, the movable portion of the radial-direction transportation unit 52, and the displacement stage 51 function as the units for changing the position on the hologram recording medium 1 onto which the signal light and/or the reference light is to be irradiated.

The rotational-angle detection sensor 14 detects the rotational angle of the hologram recording medium 1, using the angle-detection-dedicated mark provided on the hologram recording medium 1. An output signal from the rotational-angle detection sensor 14 is inputted into a spindle control circuit 32. When changing the rotational angle at which the signal light and the reference light are to be irradiated, the spindle control circuit 32 generates a driving signal on the basis of the output signal from the rotational-angle detection sensor 14 and a command signal from a controller 80. Then, the spindle control circuit 32 drives the spindle motor 50 via a spindle driving circuit 33. This makes it possible to control the rotational angle of the hologram recording medium 1.

Also, a scale 18 having a predetermined pattern is fixed onto the movable portion of the radial-direction transportation unit 52. The radial-position detection sensor 17 detects the position of the movable portion of the radial-direction transportation unit 52, using the scale 18. When changing the radial position onto which the signal light and the reference light are to be irradiated, a radial-direction transportation control circuit 34 generates a driving signal on the basis of an output signal from the radial-position detection sensor 17 and a command signal from the controller 80. Then, the radial-direction transportation control circuit 34 drives the radial-direction transportation unit 52 via a radial-direction transportation driving circuit 35. This allows the hologram recording medium 1 to be transported in the radial direction, thereby making it possible to control the radial position onto which the signal light and the reference light are to be irradiated.

The first eccentricity detection sensor 15 and the second eccentricity detection sensor 16 detect the position of the hologram recording medium 1, using the eccentricity-detection-dedicated mark provided on the hologram recording medium 1. An output signal from the first eccentricity detection sensor 15 and an output signal from the second eccentricity detection sensor 16 are inputted into an eccentricity compensation circuit 30. The eccentricity compensation circuit 30 generates a driving signal for compensating the eccentricity, thereby driving the displacement stage 51 via a displacement-stage driving circuit 31. The details of the first eccentricity detection sensor 15, the second eccentricity detection sensor 16, and the eccentricity compensation circuit 30 will be described layer. Anyway, this configuration allows the hologram recording/reproducing apparatus 10 in the present embodiment to operate in such a manner that the positioning of the hologram recording medium 1 is performed with the eccentricity-detection-dedicated mark used as its criterion.

The pickup 11 plays a role of recording digital information into the hologram recording medium 1 by irradiating the reference light and the signal light onto the hologram recording medium 1 to take advantage of holography. At this time, the information signal to be recorded is sent to a spatial optical modulator (which will be described later) inside the pickup 11 via a signal generation circuit 81. Then, the signal light is modulated by this spatial optical modulator.

When reproducing the information recorded into the hologram recording medium 1, a light wave, which is the reference light emitted from the pickup 11 and caused to enter the hologram recording medium 1 in a direction opposite to the direction at the recording time, is generated in the reproduction-dedicated reference-light optical system 12. Moreover, a reproduced light, which is reproduced by the reproduction-dedicated reference light, is detected by an optical detector (which will be described later) inside the pickup 11. Then, the signal is reproduced by a signal processing circuit 82.

Furthermore, the angle of the reference light is controlled by a reference-light angle control circuit 86. In a reference-light angle control-signal generation circuit 85, a control signal used for controlling the reference-light angle is generated from an output signal from at least either of the pickup 11 and the reproduction-dedicated reference-light optical system 12. The reference-light angle control circuit 86 generates a driving signal in accordance with an instruction from the controller 80, and using the control signal outputted from the reference-light angle control-signal generation circuit 85. The driving signal outputted from the reference-light angle control circuit 86 is supplied to an actuator 220 (which will be described later) inside the pickup 11 and an actuator 224 (which will be described later) inside the reproduction-dedicated reference-light optical system 12 via a reference-light angle driving circuit 87. Driving the actuator 220 and the actuator 224 in this way makes it possible to control the angle of the reference light that is to enter the hologram recording medium 1.

The irradiation time of the reference light and the signal light to be irradiated onto the hologram recording medium 1 can be adjusted in such a manner that the open/close time of a shutter inside the pickup 11 is controlled by the controller 80 via a shutter control circuit 84.

The cure optical system 13 plays a role of generating a light beam that is used for the pre-cure and post-cure of the hologram recording medium 1. The pre-cure is a pre-step at which, when recording information at a desired position within the hologram recording medium 1, a predetermined light beam is irradiated in advance onto the desired position before the reference light and the signal light are irradiated onto the desired position. The post-cure is a post-step at which, after recording the information at the desired position within the hologram recording medium 1, the predetermined light beam is irradiated onto the desired position in order to make an additional writing thereto impossible. It is preferable that the light beam used for the pre-cure and post-cure be an incoherent light, i.e., a low-coherence light.

A predetermined light-source driving current is supplied from a light-source driving circuit 83 to light-sources inside the pickup 11 and the cure optical system 13. A light beam can be emitted from each of these light-sources with a predetermined light-amount associated therewith.

Also, in the pickup 11 and the cure optical system 13, a few optical-system configurations or all of the optical-system configurations may be simplified by being unified into one configuration. Also, concerning the rotational-angle detection sensor 14, the first eccentricity detection sensor 15, and the second eccentricity detection sensor 16, a few sensors or all of the sensors may also be configured as a single sensor by being integrated with each other.

Figure 2:
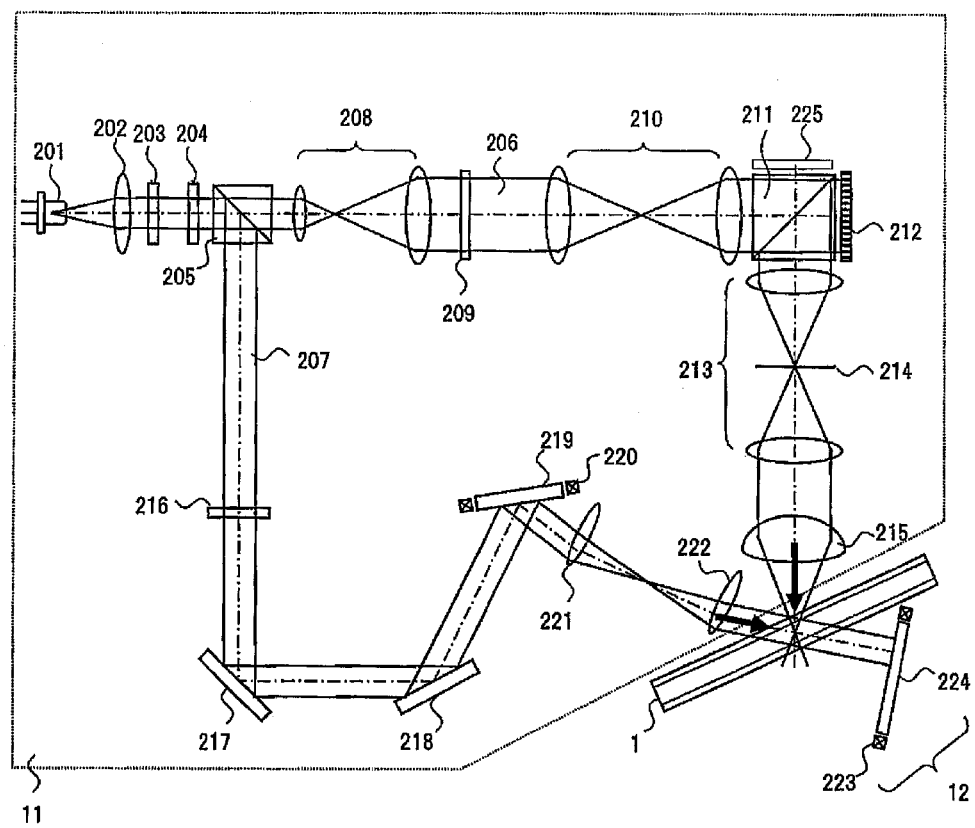
FIG. 2 This is a diagram for explaining the recording principle of the hologram recording/reproducing apparatus.

FIG. 2 illustrates the recording principle in an example of the basic optical-system configuration of the pickup 11 and the reproduction-dedicated reference-light optical system 12 in the hologram recording/reproducing apparatus 10. The reproduction-dedicated reference-light optical system 12 is constituted from an actuator 223 and a galvanometer mirror 224.

A light beam emitted from a light-source 201 passes through a collimator lens 202, then entering a shutter 203. When the shutter 203 is opened, the light beam passes through this shutter 203. After that, the polarization direction of the light beam is controlled by an optical element 204 constituted from, e.g., a half-wave plate, so that the light-amount ratio between the p polarization and the s polarization becomes equal to a desired ratio. After that, the light beam enters a PBS (Polarization Beam Splitter) prism 205.

The light beam, which has passed through the PBS prism 205, works as a signal light 206. Then, the light-beam diameter of this signal light 206 is enlarged by a beam expander 208. After that, the signal light 206 passes through a phase mask 209, relay lenses 210, and a PBS prism 211, then entering a spatial optical modulator 212.

The signal light 206, to which information is added by the spatial optical modulator 212, is reflected by the PBS prism 211, then propagating through relay lenses 213 and a spatial filter 214. After that, the signal light 206 is focused onto the hologram recording medium 1 by an objective lens 215.

Meanwhile, the light beam, which is reflected by the PBS prism 205, works as a reference light 207. Then, depending on the recording time or reproduction time, the polarization direction of this reference light 207 is set into a predetermined polarization direction by a polarization-direction conversion element 216. After that, the reference light 207 passes through a mirror 217 and a mirror 218, then entering a galvanometer mirror 219. The angle of this galvanometer mirror 219 is made adjustable by an actuator 220. As a result, the incident angle of the reference light 207, which is to enter the hologram recording medium 1 after passing through a lens 221 and a lens 222, can be set at a desired angle. Incidentally, in order to set the incident angle of the reference light, an element for converting the wave front of the reference light is also employable instead of the galvanometer mirror.

In this way, the signal light 206 and the reference light 207 are caused to enter the hologram recording medium 1 so that they are superimposed on each other within the hologram recording medium 1. This causes an interference-fringe pattern to be formed within the hologram recording medium 1. Accordingly, the information is recorded by writing this pattern into the hologram recording medium 1. Also, the incident angle of the reference light 207, which is to enter the hologram recording medium 1, can be changed by the galvanometer mirror 219. This allows implementation of the recording based on the angle-multiplexing scheme.

Hereinafter, in holograms that are recorded into one and the same area while gradually changing the reference-light angle, the hologram corresponding to each reference-light angle is referred to as "a page", and a set of the pages that are angle-multiplexed into one and the same area is referred to as "a book".

Figure 3:
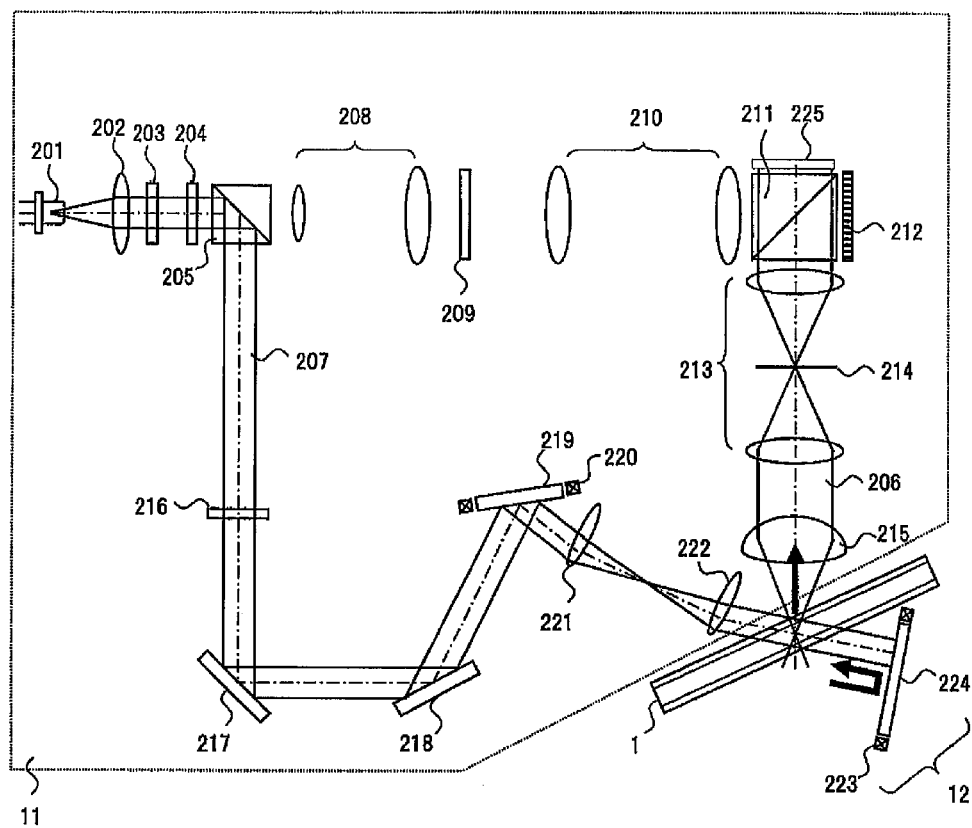
FIG. 3 This is a diagram for explaining the reproduction principle of the hologram recording/reproducing apparatus.

FIG. 3 illustrates the reproduction principle in an example of the basic optical-system configuration of the pickup 11 and the reproduction-dedicated reference-light optical system 12 in the hologram recording/reproducing apparatus 10. When reproducing the information recorded into the hologram recording medium 1, as described above, the reference light is caused to enter the hologram recording medium 1. Moreover, the light beam, which has passed through the hologram recording medium 1, is reflected by the galvanometer mirror 224 whose angle is made adjustable by the actuator 223. This process generates the reproduction-dedicated reference light for the recorded information.

The reproduced light, which is reproduced by this reproduction-dedicated reference light, propagates through the objective lens 215, the relay lenses 213, and the spatial filter 214. After that, the reproduced light passes through the PBS prism 211, then entering an optical detector 225. This makes it possible to reproduce the recorded signal. An element that is employable as the optical detector 225 is an image sensor such as, e.g., CMOS image sensor or CCD image sensor. Whatever element, however, is also employable, as long as it is capable of reproducing the page data.

Incidentally, in the present embodiment, the reference-light angle control-signal generation circuit 85 detects the angle of the reference light reflected by the galvanometer mirror 219, using, as the input, the output signal from an (not-illustrated) angle detection sensor set up on the actuator 220. Then, the generation circuit 85 generates the control signal used for controlling the reference-light angle. Similarly, regarding the reproduction-dedicated reference-light optical system 12, the reference-light angle control-signal generation circuit 85 detects the angle of the reference light reflected by the galvanometer mirror 224, using, as the input, the output signal from an (not-illustrated) angle detection sensor set up on the actuator 223. Then, the generation circuit 85 generates the control signal used for controlling the reference-light angle. A sensor that is employable as each of the angle detection sensors set up on the actuator 220 and actuator 223 is, e.g., an optical encoder.

By the way, in the recording technology using the principle of the angle-multiplexing of holography, there exists a tendency that the tolerable error for a shift of the reference-light angle becomes extremely small. On account of this, the following configuration is also employable: Namely, a mechanism for detecting the shift amount of the reference-light angle is provided independently inside the pickup 11 without using the angle detection sensor set up on the actuator 220. Then, the reference-light angle control-signal generation circuit 85 generates the control signal used for controlling the reference-light angle, using an output signal from this mechanism as the input.

FIG. 4 illustrates flowcharts of the recording and reproduction in the hologram recording/reproducing apparatus 10. Here, in particular, the explanation will be given below concerning the holography-used recording/reproduction. Incidentally, in the present specification, a processing up to which the preparation for the recording or reproduction is completed after the hologram recording medium 1 is inserted into the hologram recording/reproducing apparatus 10 will be referred to as "set-up processing". Also, a processing of recording information into the hologram recording medium 1 from the preparation-completed state will be referred to as "recording processing", and a processing of reproducing the information, which is recorded into the hologram recording medium 1, from the preparation-completed state will be referred to as "reproduction processing".

FIG. 4 (a) illustrates a flowchart of the set-up processing, and FIG. 4 (b) illustrates a flowchart of the recording processing, and FIG. 4 (c) illustrates a flowchart of the reproduction processing.

As illustrated in FIG. 4 (a), when the set-up processing is started (step S401), the hologram recording/reproducing apparatus 10 makes a medium judgment as to whether or not the medium inserted therein is a medium for recording or reproducing digital information by using holography (step S402).

If, as a result of the medium judgment, the medium inserted therein is judged to be the hologram recording medium 1 for recording or reproducing digital information by using holography, the hologram recording/reproducing apparatus 10 reads control data provided within the hologram recording medium 1 (step S403). In this way, the apparatus 10 acquires, for example, information about the hologram recording medium 1, and information about respective types of setting conditions at the recording and reproduction times.

After reading the control data, the hologram recording/reproducing apparatus 10 performs a learning processing associated with each type of adjustment in response to the control data, and the pickup 11 (step S404). This allows the hologram recording/reproducing apparatus 10 to complete the preparation for the recording or reproduction, thereby terminating the set-up processing (step S405).

Incidentally, in the present embodiment, the learning processing at the step S404 includes a processing of switching ON an eccentricity compensation control (which will be described later). Hereinafter, it is assumed that the eccentricity compensation control will always be switched ON.

Next, referring to the flowchart in FIG. 4 (b), the explanation will be given below concerning a processing up to which information is recorded from the preparation-completed state. When the recording processing is started (step S411), the hologram recording/reproducing apparatus 10 receives data to be recorded (step S412). Then, to the spatial optical modulator 212 inside the pickup 11, the apparatus 10 transmits two-dimensional data corresponding to the data to be recorded.

After that, in order to record high-quality information into the hologram recording medium 1, depending on the requirements, the hologram recording/reproducing apparatus 10 performs an each-type-of-recording-dedicated learning processing in advance. Here, this learning processing is, e.g., power optimization of the light-source 201 and optimization of the light-exposure time by the shutter 203 (step S413).

After that, in a seek operation (step S414), the hologram recording/reproducing apparatus 10 controls the spindle motor 50, the radial-direction transportation unit 52, and the displacement stage 51, using the spindle control circuit 32, the radial-direction transportation control circuit 34, and the eccentricity compensation circuit 30. This allows the apparatus 10 to perform the positioning of the hologram recording medium 1 so that the light beams irradiated from the pickup 11 and the cure optical system 13 are irradiated onto a predetermined position on the hologram recording medium 1. If the hologram recording medium 1 has address information, the apparatus 10 reproduces the address information, thereby confirming whether or not the hologram recording medium 1 is positioned at the target position. If the hologram recording medium 1 is not deployed at the target position, the apparatus 10 calculates a shift amount relative to the predetermined position, then repeating the positioning operation of the hologram recording medium 1 again. The flowchart of the seek operation in the present embodiment will be described later.

After that, the apparatus 10 performs a data recording processing of recording the data to be recorded into the hologram recording medium 1 as the hologram (step S415). The details of this data recording processing will be described layer. When the data recording processing is completed, the apparatus 10 terminates the recording processing (step S416). Incidentally, the data may be verified, depending on the requirements.

Next, referring to the flowchart in FIG. 4 (c), the explanation will be given below concerning a processing of reproducing the information, which is recorded into the hologram recording medium 1, from the preparation-completed state. When the reproduction processing is started (step S421), in a seek operation (step S422) at first, using the spindle control circuit 32, the radial-direction transportation control circuit 34, and the eccentricity compensation circuit 30, the hologram recording/reproducing apparatus 10 performs positioning of the hologram recording medium 1 so that the light beams irradiated from the pickup 11 and the cure optical system 13 are irradiated onto a predetermined position on the hologram recording medium 1. If the hologram recording medium 1 has the address information, the apparatus 10 reproduces the address information, thereby confirming whether or not the medium 1 is positioned at the target position. If the medium 1 is not positioned at the target position, the apparatus 10 calculates a shift amount relative to the predetermined position, then repeating the positioning operation again.

After that, the apparatus 10 causes the reference light to be emitted from the pickup 11. Moreover, the apparatus 10 reads the information, which is recorded into the hologram recording medium 1, from the two-dimensional data detected by the optical detector 225 (step S423), then transmitting the reproduced data (step S424). When the transmission of the reproduced data is completed, the apparatus 10 terminates the reproduction processing (step S425).

Figure 15B:
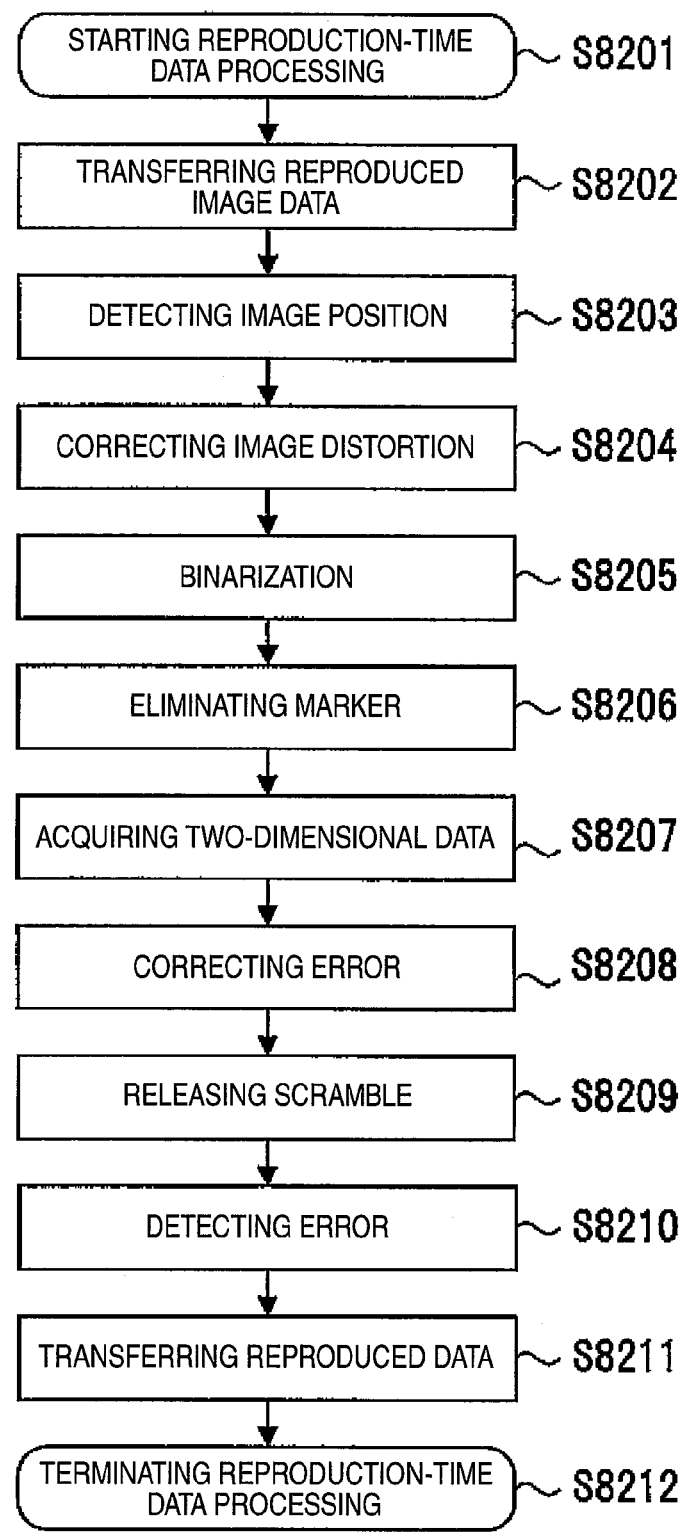
FIG. 15 (a) This is a diagram for illustrating the data processing flow at the recording time.

FIG. 15 illustrates the data processing flow at the recording time and the data processing flow at the reproduction time. FIG. 15 (a) illustrates the recording-data processing flow in the signal generation circuit 81 until the conversion of the recording data into the two-dimensional data on the spatial optical modulator 212 after the recording-data reception processing step S412 in the input/output control circuit 90. FIG. 15 (b) illustrates the reproduced-data processing flow in the signal processing circuit 82 until the reproduced-data transmission processing step S424 in the input/output control circuit 90 after the detection of the two-dimensional data by the optical detector 225.

Referring to FIG. 15 (a), the explanation will be given below regarding the data processing flow at the recording time. When the data processing at the recording time is started (step S8101), the signal generation circuit 81 receives the recording data (step S8102). Subsequently, the circuit 81 divides the recording data into a plurality of data strings, then performing the CRC implementation of each data string so that an error detection can be performed at the reproduction time (step S8103). Subsequently, in order to substantially equalize the on-pixel number and the off-pixel number, and in order to prevent repetition of one and the same pattern, the circuit 81 applies a scrambling to each data string, whereby a pseudo random-number data string is added to each data string (step S8104). After that, the circuit 81 performs an error-correction encoding such as Reed-Solomon coding, so that an error correction can be performed at the reproduction time (step S8105). Next, the circuit 81 transforms these data strings into M×N two-dimensional data, and repeats this transformation by the amount of one-page data, thereby configuring the two-dimensional data by the amount of one page (step S8106). Moreover, the circuit 81 adds a marker, which becomes the criterion in image-position detection and image-distortion correction at the reproduction time, to the two-dimensional data configured in this way (step S8107), then transferring the marker-added data to the spatial optical modulator 212 (step S8108). The foregoing steps complete the data processing at the recording time (step S8109).

Next, referring to FIG. 15 (b), the explanation will be given below regarding the data processing flow at the reproduction time. When the data processing at the reproduction time is started (step S8201), the reproduced image data detected by the optical detector 225 is transferred to the signal processing circuit 82 (step S8202). Subsequently, the circuit 82 detects the image position in such a manner that the marker included in this image data is employed as the criterion (step S8203). Furthermore, the circuit 82 corrects the deformations such as image's inclination/magnification/distortion (step S8204). After that, the circuit 82 performs the binarization processing (step S8205), then removing the marker (step S8206). Subsequently, the circuit 82 acquires the two-dimensional data by the amount of one page (step S8207). After transforming the two-dimensional data obtained in this way into a plurality of data strings, the circuit 82 performs the error-correction processing, thereby eliminating a parity data string (step S8208). Next, the circuit 82 releases the scrambling (step S8209), then performing the CRC-based error detection processing (step S8210). Finally, the circuit 82 transmits the reproduced data, which is created by deleting the CRC parity, via the input/output control circuit 90 (step S8211). The foregoing steps complete the data processing at the reproduction time (step S8212).

Figure 16:
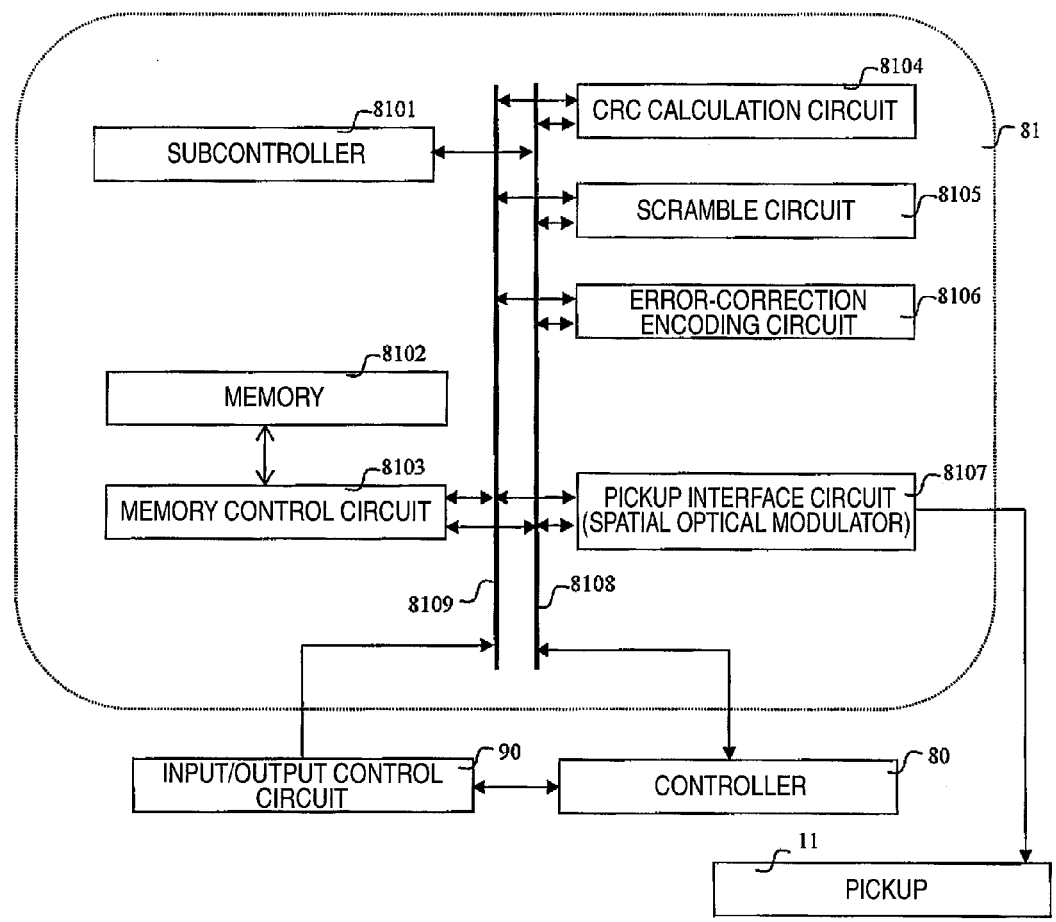
FIG. 16 This is a block diagram for illustrating a signal generation circuit inside the hologram recording/reproducing apparatus.

FIG. 16 is a block diagram for illustrating the signal generation circuit 81 of the hologram recording/reproducing apparatus 10.

When the input of the recording data is started into the input/output control circuit 90, the input/output control circuit 90 issues, to the controller 80, a notification to the effect that the input of the recording data is started. Having received the present notification, the controller 80 instructs the signal generation circuit 81 to perform the recording processing of the one-page amount of recording data inputted from the input/output control circuit 90. A notification of the processing instruction from the controller 80 is issued to an intra-signal-generation-circuit-81 subcontroller 8101 via a control-dedicated line 8108. Having received the present notification, the subcontroller 8101 controls respective signal processing circuits via the control-dedicated line 8108 so that the respective signal processing circuits operate in parallel to each other. At first, the subcontroller 8101 controls a memory control circuit 8103 to store, into a memory 8102, the recording data inputted from the input/output control circuit 90 via a data line 8109. When the recording data stored into the memory 8102 reaches a certain constant amount, the subcontroller causes a CRC calculation circuit 8104 to perform the control of performing the CRC implementation of the recording data. Next, the subcontroller causes a scramble circuit 8105 to apply the scrambling to the CRC-implemented data, whereby a pseudo random-number data string is added to the CRC-implemented data. Moreover, the subcontroller causes an error-correction encoding circuit 8106 to perform the error-correction encoding control of adding the parity data string to the data. Finally, the subcontroller causes a pickup interface circuit 8107 to read the error-correction-encoded data from the memory 8102 in the arrangement sequence of the two-dimensional data on the spatial optical modulator 212. Then, after adding the marker, which becomes the criterion at the reproduction time, to the two-dimensional data, the subcontroller transfers the two-dimensional data to the spatial optical modulator 212 inside the pickup 11.

Figure 17:
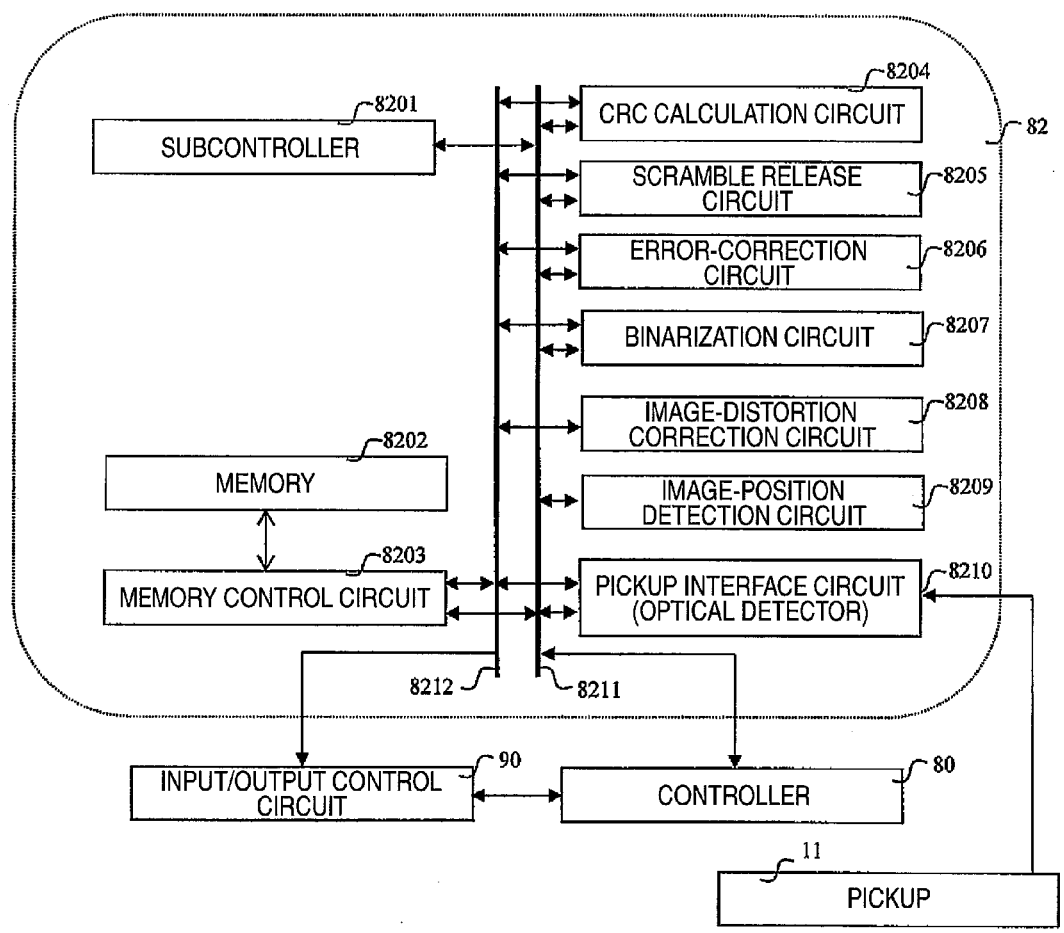
FIG. 17 This is a block diagram for illustrating a signal processing circuit inside the hologram recording/reproducing apparatus.

FIG. 17 is a block diagram for illustrating the signal processing circuit 82 of the hologram recording/reproducing apparatus 10.

When the image data is detected by the optical detector 225 inside the pickup 11, the controller 80 instructs the signal processing circuit 82 to perform the reproduction processing of the one-page amount of data inputted from the pickup 11. A notification of the processing instruction from the controller 80 is issued to an intra-signal-processing-circuit-82 subcontroller 8201 via a control-dedicated line 8211. Having received the present notification, the subcontroller 8201 controls respective signal processing circuits via the control-dedicated line 8211 so that the respective signal processing circuits operate in parallel to each other. At first, the subcontroller 8201 controls a memory control circuit 8203 to store, into a memory 8202, the image data inputted from the pickup 11 via a pickup interface circuit 8210 and a data line 8212. When the image data stored into the memory 8202 reaches a certain constant amount, the subcontroller causes an image-position detection circuit 8209 to perform a control of detecting the marker from within the image data stored into the memory 8202, and extracting its effective data range. Next, the subcontroller causes an image-distortion correction circuit 8208 to make the correction of the deformations such as image's inclination/magnification/distortion, then performing a control of transforming the size of the image data into an expected two-dimensional data size. Moreover, the subcontroller causes a binarization circuit 8207 to make the "0"-or-"1" judgment on each bit data of a plurality of bits constituting the size-transformed two-dimensional data, and thereby to perform the binarization of each bit data. Then, the subcontroller causes the binarization circuit to perform a control of storing the data onto the memory 8202 in the arrangement sequence of outputs of the reproduced data. Next, the subcontroller causes an error-correction circuit 8206 to correct an error included in each data string, and causes a scramble release circuit 8205 to release the scrambling whereby a pseudo random-number data string is added to the data. After that, the subcontroller causes a CRC calculation circuit 8204 to confirm that no error is included within the reproduced data on the memory 8202. After that, the subcontroller transfers the reproduced data to the input/output control circuit 90 from the memory 8202.

Figure 6:
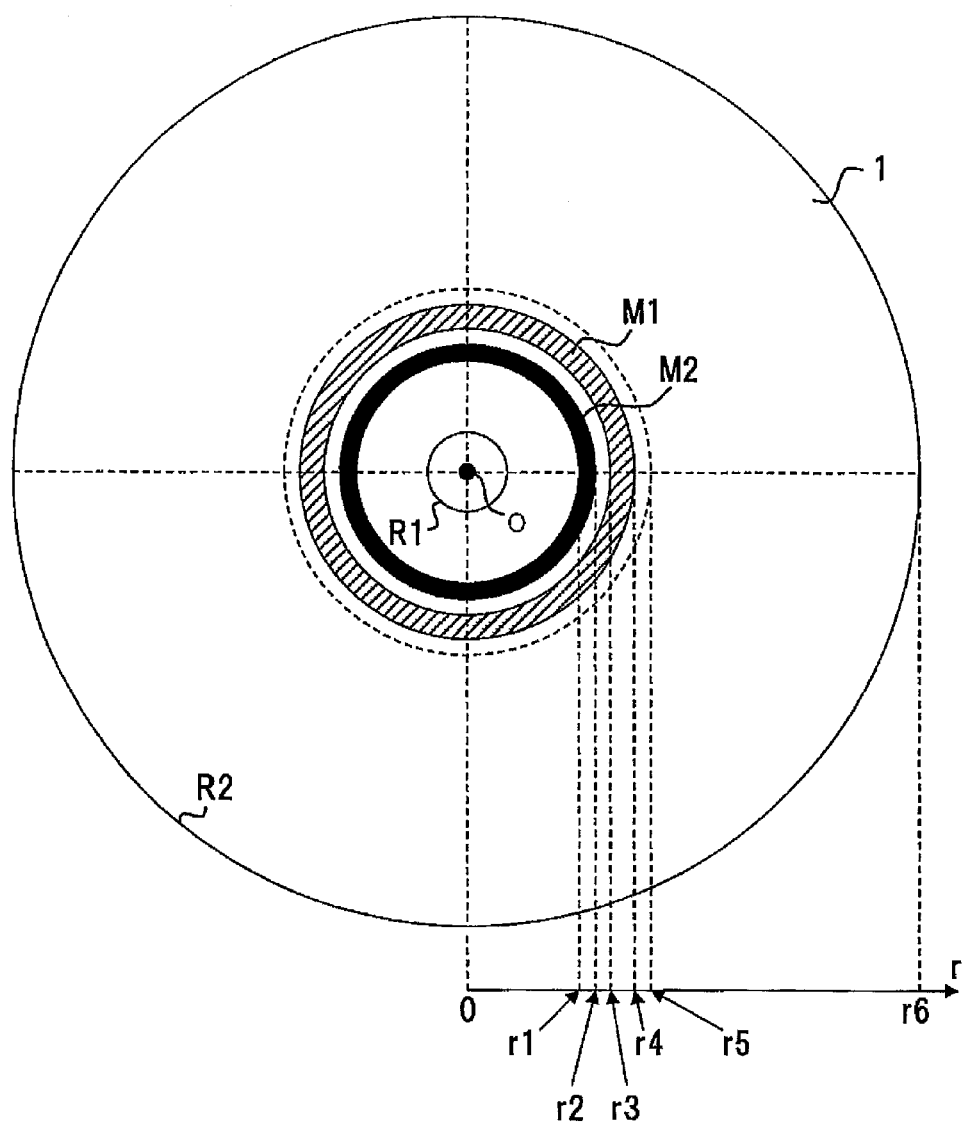
FIG. 6 This is a diagram for explaining a hologram recording medium in the first embodiment.

Next, referring to FIG. 6, the explanation will be given below concerning the two types of marks provided on the hologram recording medium 1 in the present embodiment. FIG. 6 illustrates the hologram recording medium 1, where a circle R1 indicates the inner-most circumference of the medium, and where a circle R2 indicates the outer-most circumference of the medium. A point O in FIG. 6 indicates the geometrical center of the hologram recording medium 1. Also, in the explanation that will be given hereinafter, a variable r indicates the radius that is measured from the point O.

As illustrated in FIG. 6, in the area on the inner-circumference side of the hologram recording medium 1, a predetermined mark indicated by M2 is provided in the area of $r1 \leq r \leq r2$, and a predetermined mark indicated by M1 is provided in the area of $r3 \leq r \leq r4$. Also, in the hologram recording medium 1, an area in which user data is to be recorded as the hologram is the area of $r5 \leq r \leq r6$. Namely, the marks M1 and M2 are provided on the inner-circumference side as compared with the area in which user data is to be recorded as the hologram.

The mark M1 is an angle-detection-dedicated mark, and the mark M2 is an eccentricity-detection-dedicated mark. Next, referring to FIG. 7, the explanation will be given below regarding the fixed position of each of the sensors for detecting these two marks.

Figure 7:
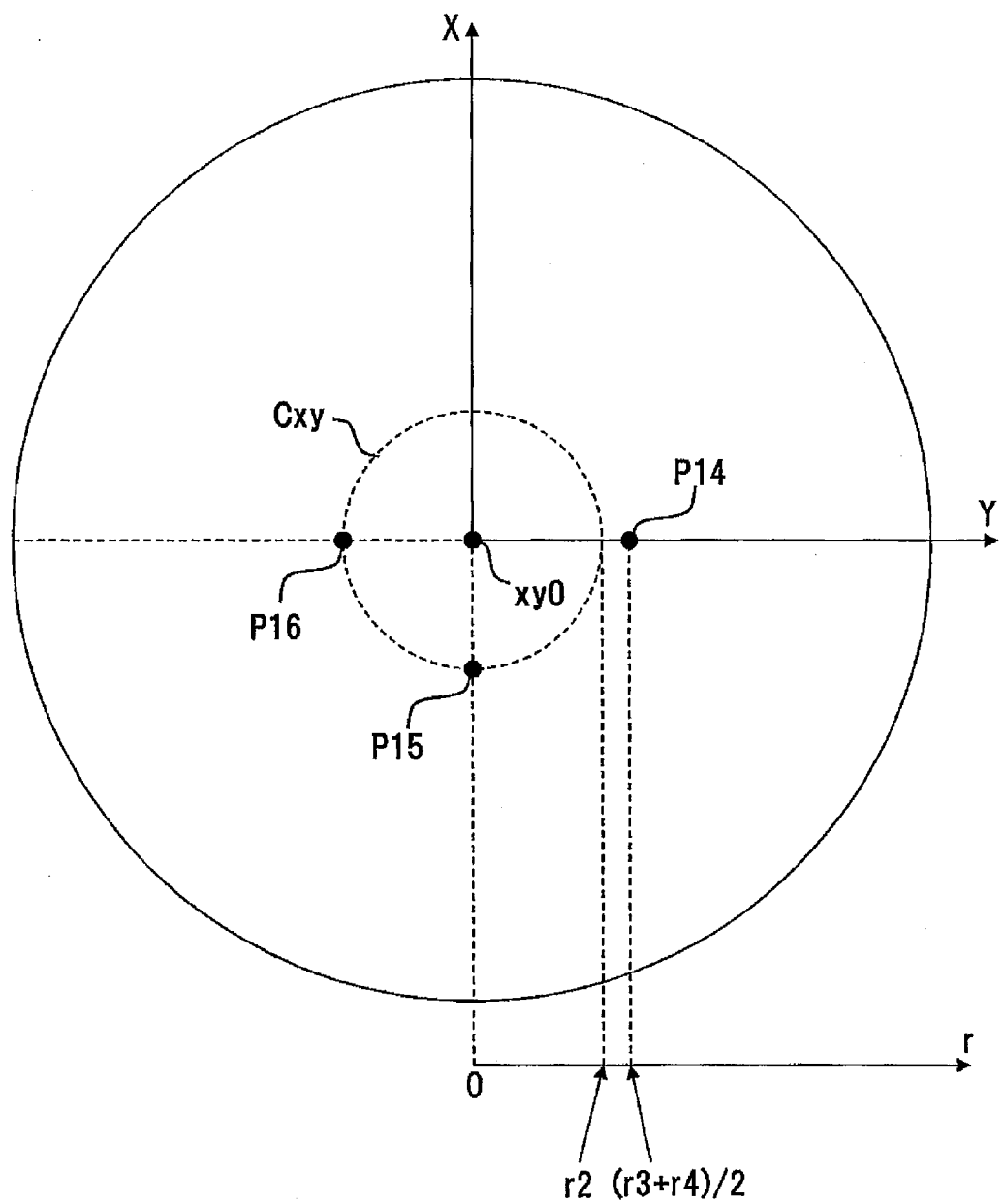
FIG. 7 This is a diagram for explaining the fixed position of each sensor in the first embodiment.

As explained in FIG. 1, each of the displacement stage 51, the rotational-angle detection sensor 14, the first eccentricity detection sensor 15, and the second eccentricity detection sensor 16 is fixed onto the movable portion of the radial-direction transportation unit 52. FIG. 7 is a diagram for explaining the fixed position of each of these sensors in the case where the movable portion of the radial-direction transportation unit 52 is employed as the criterion.

A point xyO indicates the driving criterion positon of the displacement stage 51. For example, when both of the movable ranges of the displacement stage 51 in the X direction and the Y direction are equal to ±1 mm, a point, which the displacement stage 51 has reached after displacing by 0.5 mm in the positive direction from the negative direction's movable end in association with the X axis, and which the displacement stage 51 has reached after displacing by 0.5 mm in the positive direction from the negative direction's movable end in association with the Y axis, is the point xyO. Namely, it is assumed that, when the movable portion of the displacement stage 51 exists at the driving criterion positon xyO, the rotational axis of the spindle motor 50 is positioned directly above the point xyO.

As illustrated herein, the transverse direction on the drawing becomes the Y axis, and the longitudinal direction thereon becomes the X axis. A point P14 indicates the sensor center of the rotational-angle detection sensor 14. Similarly, a point P15 indicates the sensor center of the first eccentricity detection sensor 15, and a point P16 indicates the sensor center of the second eccentricity detection sensor 16. The point P15 and the point P16 exist on a circle Cxy, whose radius is equal to r2 and whose center is the point xyO. Here, in the present embodiment, "sensor center" indicates the central position of an optical spot that is irradiated by the sensor. Also, for example, it is represented as "the rotational-angle detection sensor 14 is deployed at the point P14" that the rotational-angle detection sensor 14 is deployed so that the central position of an optical spot irradiated by the rotational-angle detection sensor 14 coincides with the point P14.

From FIG. 7 and FIG. 6, when the movable portion of the displacement stage 51 exists at the driving criterion positon xyO, and when the eccentricity does not exist in the hologram recording medium 1, the rotational-angle detection sensor 14 is positioned at the center of the angle-detection-dedicated mark M1 provided in the area of r3≤r≤r4. Also, when the movable portion of the displacement stage 51 exists at the driving criterion positon xyO, and when the eccentricity does not exist in the hologram recording medium 1, the first eccentricity detection sensor 15 and the second eccentricity detection sensor 16 are positioned at the edge of the outer circumference of the eccentricity-detection-dedicated mark M2 provided in the area of r1≤r≤r2.

Subsequently, the explanation will be given below concerning the characteristics of each mark, and the signals outputted from each sensor.

Figure 8:
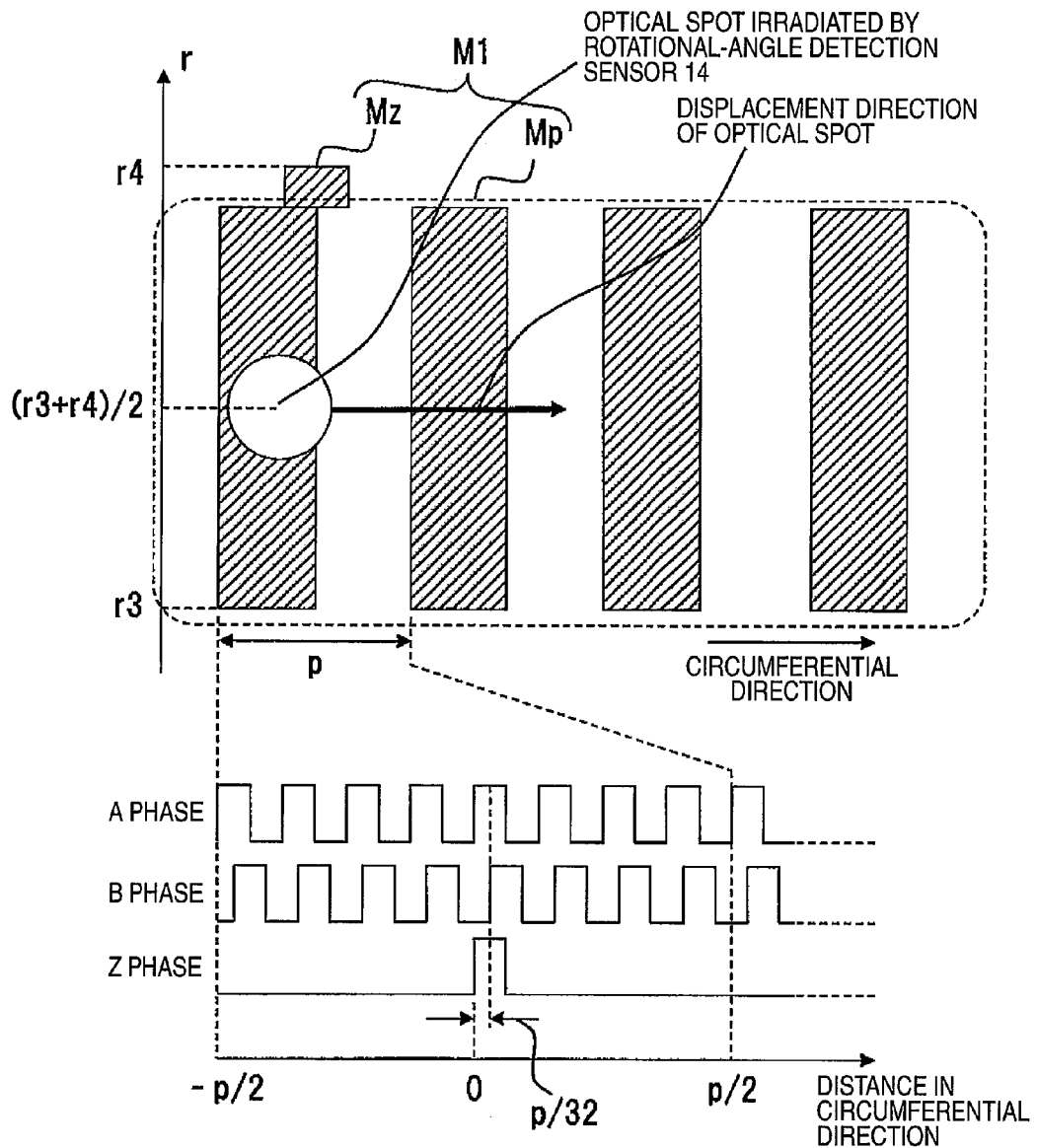
FIG. 8 This is a diagram for explaining an angle-detection-dedicated mark in the first embodiment, and the signals outputted from a rotational-angle detection sensor.

FIG. 8 is a diagram for illustrating a schematic diagram of the angle-detection-dedicated mark M1, and the signals outputted from the rotational-angle detection sensor 14. As illustrated in FIG. 8, the angle-detection-dedicated mark M1 is constituted from marks Mp and a mark Mz. Here, the reflection portion and the non-reflection portion of the marks Mp are repeated with a predetermined period p; while the mark Mz is provided at only one time for the execution of one rotation of the medium 1. The marks Mp are marks for generating an A-phase signal and a B-phase signal (which will be described later); while the mark Mz is a mark for generating a Z-phase signal (which will be described later).

As schematically illustrated in FIG. 8, a detection light of a predetermined wavelength is irradiated from the rotational-angle detection sensor 14, then causing an optical spot to occur on the marks Mp. The rotational-angle detection sensor 14 detects the rotational angle of the medium 1 by detecting a light which is reflected by the marks Mp. If the optical spot irradiated onto the marks Mp from the rotational-angle detection sensor 14 advances in the right direction on the drawing, three types of signals illustrated on the drawing are obtained as the output signals from the rotational-angle detection sensor 14. The A-phase signal and the B-phase signal are square waves whose eight periods are outputted while the optical spot is displacing over the period p of the marks Mp. The phase of the A-phase signal and the phase of the B-phase signal are different from each other by the amount of 90 degrees. Moreover, the large-or-small relationship between these phases changes, depending on the displacement direction of the optical spot irradiated onto the marks Mp. Namely, if the optical spot irradiated onto the marks Mp advances in the right direction in FIG. 8, the B-phase signal becomes an output whose phase advances by 90 degrees as compared with the phase of the A-phase signal. Conversely, if the optical spot irradiated onto the marks Mp advances in the left direction in FIG. 8, the B-phase signal becomes an output whose phase retards by 90 degrees as compared with the phase of the A-phase signal. Furthermore, the Z-phase signal is generated by an (not-illustrated) optical spot irradiated onto the mark Mz. At only one time for the execution of one rotation of the medium 1, the Z-phase signal outputs a pulse whose width is equal to the width of the A-phase signal.

These A-phase signal, B-phase signal, and Z-phase signal are of a general output scheme as the output signals from an incremental-type encoder. In the configuration given in the present embodiment, the rotational angle of the medium 1 can be obtained from these three types of signals. As one example, the angle that becomes equal to 0 degree is determined by the Z-phase signal, then accumulating an increase/decrease in the rotational angle from the A-phase signal and the B-phase signal. This method makes it possible to calculate the present rotational angle. Incidentally, the phase difference between the A-phase signal and the B-phase signal is equal to 90 degrees. Accordingly, the minimum resolving power of the rotational-angle detection sensor 14 in the present embodiment is an amount which is equivalent to one-fourth of the period of the A-phase signal. As a result, this minimum resolving power becomes equal to p/32 in the distance conversion on the marks Mp. When the distance on the marks Mp is converted into the rotational angle, it is all right just to calculate and determine the central angle of the arc of the sector. This is because the relationship between the arc and the radius in the sector has been already known.

Incidentally, the configuration illustrated in FIG. 8 has been used as the explanation of the rotational-angle detection sensor 14. The present invention, however, is not limited thereto. For example, the sensor 14 may also be a sensor that uses the detection principle of an absolute-type encoder. Also, the A-phase signal and the like, i.e., the output signals from the rotational-angle detection sensor 14, have been the logical signals (i.e., square waves). The sensor 14, however, may also be a sensor that outputs an analog signal (e.g., sinusoidal wave) which allows acquisition of angle-equivalent information.

Incidentally, if the marks Mp are arranged in a circle-like manner, the configuration of the incremental-type encoder illustrated in FIG. 8 becomes a rotary encoder. If, however, the marks Mp are arranged in a straight-line-like manner, this configuration becomes a line encoder. Namely, this scheme is usable as a sensor for measuring not only the rotational angle but also a one-direction displacement. The radial-position detection sensor 17 in the present embodiment is the incremental-type line encoder. Namely, the foregoing explanation still holds, if the rotational-angle detection sensor 14 is replaced by the radial-position detection sensor 17, and further, if the angle-detection-dedicated mark M1 provided on the hologram recording medium 1 is replaced by the predetermined pattern of the scale 18 fixed onto the movable portion of the radial-direction transportation unit 52. As a result, the A-phase signal, the B-phase signal, and the Z-phase signal are similarly outputted from the radial-position detection sensor 17 as well.

Subsequently, the explanation will be given below regarding the characteristics of the eccentricity-detection-dedicated mark M2, and the signals outputted from the first eccentricity detection sensor 15 and the second eccentricity detection sensor 16. The first eccentricity detection sensor 15 and the second eccentricity detection sensor 16, which are different from each other only in their mounted positions, are of the same type of the sensors. Accordingly, hereinafter, the explanation will be given below regarding the first eccentricity detection sensor 15.

Figure 9A:
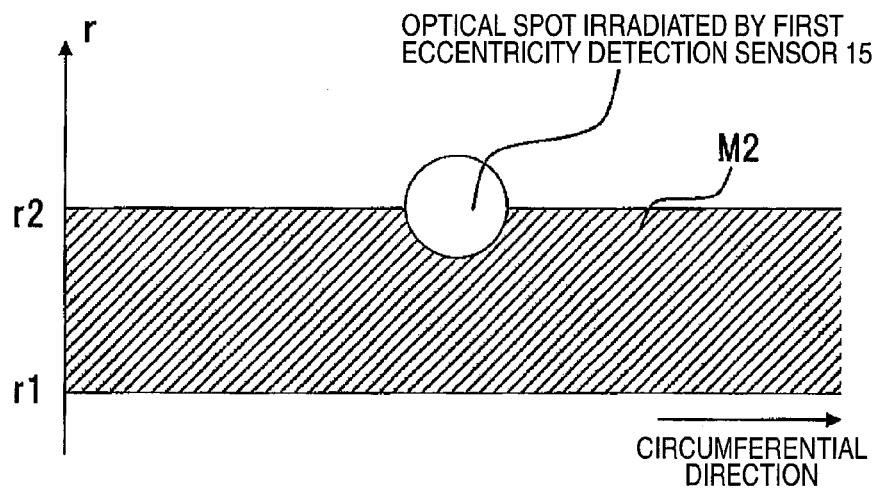
FIG. 9 (a) This is a diagram for explaining an eccentricity-detection-dedicated mark in the first embodiment.
Figure 9B:
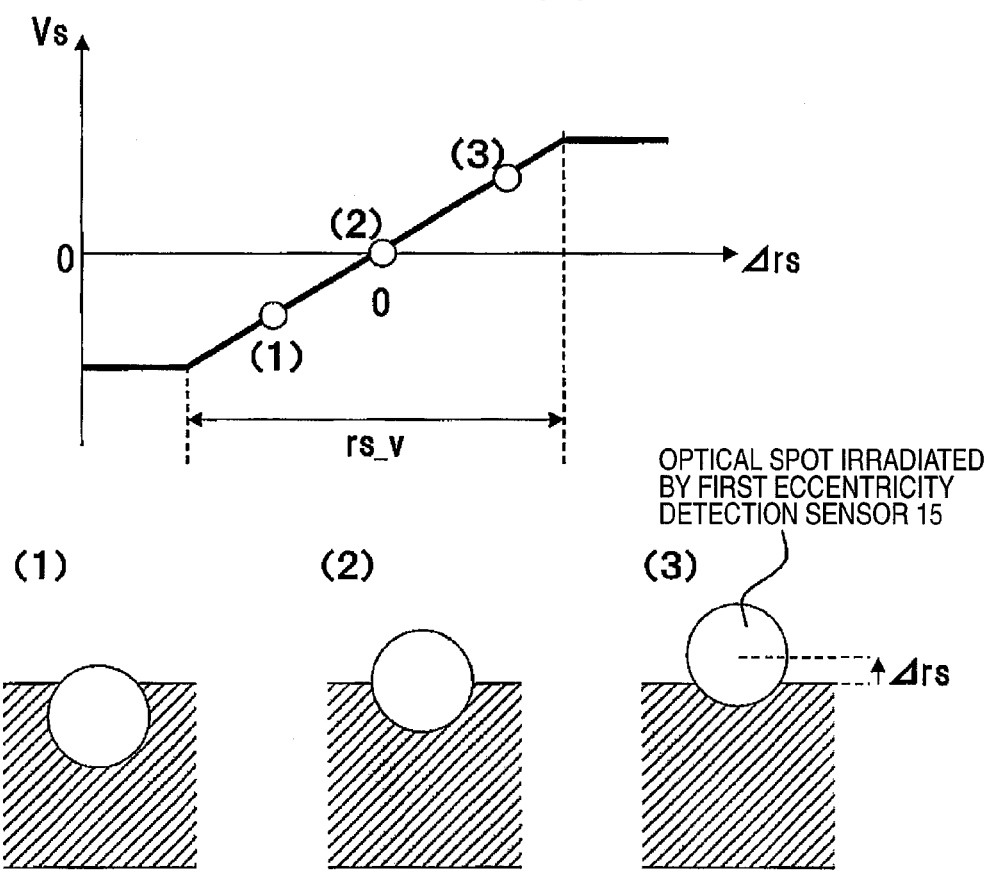

FIG. 9 (a) is a schematic diagram of the eccentricity-detection-dedicated mark M2. In the eccentricity-detection-dedicated mark M2, a metallic film is evaporated over the area of r1≤r≤r2, and functions as a reflection portion. Namely, an oblique-line portion on the drawing is the reflection portion, and portions other than this oblique-line portion are non-reflection portions. A detection light of a predetermined wavelength is irradiated from the first eccentricity detection sensor 15, then causing an optical spot to occur on the mark M2. The first eccentricity detection sensor 15 detects a light which is reflected by the mark M2.

The sensor center of the first eccentricity detection sensor 15 is fixed at the position of the radius r2. On account of this, when the movable portion of the displacement stage 51 exists at the driving criterion positon xyO, and when the eccentricity does not exist in the hologram recording medium 1, as illustrated in FIG. 9 (a), the optical spot irradiated by the first eccentricity detection sensor 15 is positioned at the edge of the outer circumference of the eccentricity-detection-dedicated mark M2 provided in the area of r1≤r≤r2.

FIG. 9 (b) is a diagram for explaining an output signal from the first eccentricity detection sensor 15. There is only one output signal from the first eccentricity detection sensor 15. Namely, the first eccentricity detection sensor 15 outputs a voltage that responds to the relative position relationship between the optical spot, which is caused to occur by the detection light, and the eccentricity-detection-dedicated mark M2.

When the movable portion of the displacement stage 51 does not exist at the driving criterion positon xyO, or when the eccentricity exists in the hologram recording medium 1, as indicated by (1) or (3) in FIG. 9 (b), the optical spot irradiated by the first eccentricity detection sensor 15 and the edge of the outer circumference of the eccentricity-detection-dedicated mark M2 may be able to shift in the radial direction. A difference in the radial direction's relative position between the optical spot irradiated by the first eccentricity detection sensor 15 and the edge of the outer circumference of the eccentricity-detection-dedicated mark M2 is represented by Δrs. If there exists the difference Δrs in the radial direction's relative position, there occurs a change in the light amount of the light that returns to the first eccentricity detection sensor 15 by being reflected by the eccentricity-detection-dedicated mark M2. The execution of the detection of this change makes it possible to implement the sensor for outputting the voltage that responds to the relative position relationship between the optical spot and the eccentricity-detection-dedicated mark M2.

The relationship between the difference Δrs in the radial direction's relative position and the output voltage Vs from the first eccentricity detection sensor 15 turns out to be the one as is illustrated in FIG. 9 (b). Namely, within a predetermined detection range rs_v, the output voltage Vs from the first eccentricity detection sensor 15 becomes a voltage that is proportional to the difference Δrs in the radial direction's relative position between the first eccentricity detection sensor 15 and the eccentricity-detection-dedicated mark M2. Also, when the output voltage Vs becomes equal to zero, the optical spot irradiated by the first eccentricity detection sensor 15 is positioned at the edge of the outer circumference of the eccentricity-detection-dedicated mark M2. Incidentally, concerning the first eccentricity detection sensor 15, the direction in which Δrs is to be taken is the negative direction of the X axis.

As illustrated in FIG. 7, the first eccentricity detection sensor 15 is deployed on the X axis in the orthogonal coordinate system whose origin point is the driving criterion positon xyO. Also, the second eccentricity detection sensor 16 is deployed on the Y axis in the orthogonal coordinate system whose origin point is the driving criterion positon xyO. These two sensors, which are capable of detecting the relative positions with the eccentricity-detection-dedicated mark M2, are deployed in the manner of being orthogonal to each other. This deployment makes it possible to detect the position of the eccentricity-detection-dedicated mark M2. Moreover, if the displacement stage 51 can be controlled so that the output voltages from both of the sensors become equal to zero, it means that the positon of the hologram recording medium 1 can be controlled so that the edge of the eccentricity-detection-dedicated mark M2 is positioned directly above both of the sensors (i.e., the centers of the optical spots irradiated by both of the sensors are positioned at the edge of the eccentricity-detection-dedicated mark M2).

Incidentally, whatever of the rotational-angle detection sensor 14, the first eccentricity detection sensor 15, and the second eccentricity detection sensor 16 irradiates the optical spot onto the hologram recording medium 1 as the detection light for detecting the marks. It is preferable, however, that the wavelength of this detection light is different from the wavelength of the reference light. Incidentally, since the wavelength of the signal light is equal to the wavelength of the reference light, this sentence may also be expressed such that the wavelength of this detection light is different from the wavelength of the signal light. The reason for the above-described preference is that the following fact has been known: Namely, if a light whose wavelength is close to the wavelength of the reference light is irradiated onto a position on an unrecorded hologram recording medium, the reproduction quality in the case where a hologram is recoded afterwards onto this irradiation position becomes deteriorated. For example, when both the wavelength of the signal light and the wavelength of the reproduced light are equal to 405 nm, the light that is employable as the detection light is a 650-nm-wavelength light, which is different from the 405-nm-wavelength reproduced light by the amount of 100 nm or more.

Subsequently, the explanation will be given below concerning the configuration of each control circuit in the present embodiment.

Figure 10:
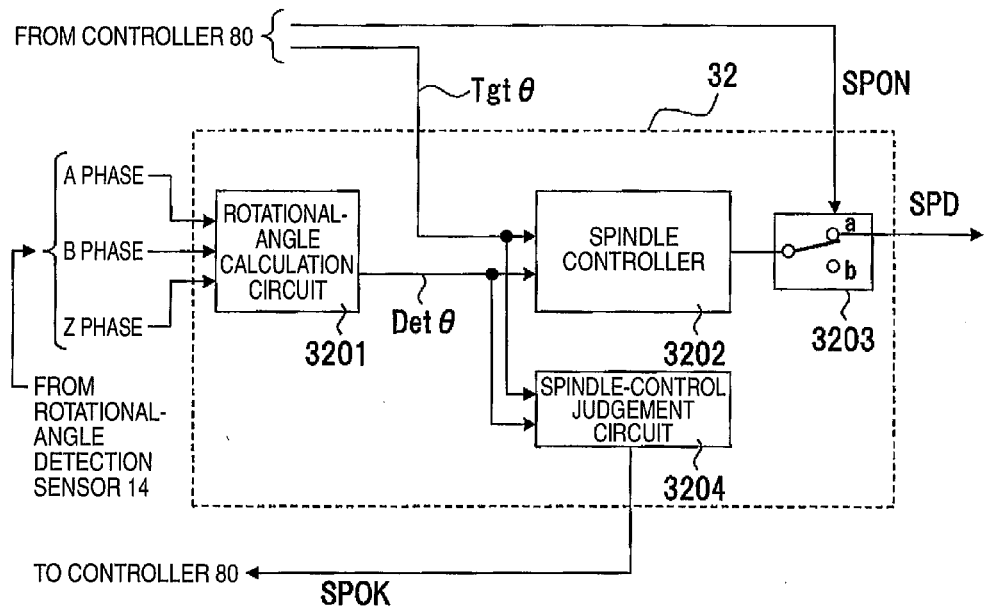
FIG. 10 This is a block diagram for illustrating the configuration of a spindle control circuit in the first embodiment.

Referring to FIG. 10, the explanation will be given below regarding the configuration of the spindle control circuit 32 in the present embodiment. The spindle control circuit 32 is constituted from a rotational-angle calculation circuit 3201, a spindle controller 3202, a spindle-output control switch 3203, and a spindle-control judgment circuit 3204. Based on a command signal from the controller 80, the spindle control circuit 32 controls the spindle motor 50 so that the rotational angle of the hologram recording medium 1 becomes equal to an angle command value Tgtθ from the controller 80. In the present specification, this control is referred to as "spindle control".

Using, as the inputs, the A-phase signal, the B-phase signal, and the Z-phase signal outputted from the rotational-angle detection sensor 14, the rotational-angle calculation circuit 3201 calculates the present rotational angle Detθ of the hologram recording medium 1 from the above-described three signals, then outputting this present rotational angle Detθ as a Detθ signal. The spindle controller 3202 outputs a driving signal for controlling the spindle motor 50, using the Detθ signal and the angle command value Tgtθ signal from the controller 80 as the inputs.

In accordance with a control signal SPON from the controller 80, the spindle-output control switch 3203 controls whether or not the output signal from the spindle controller 3202 should be outputted, using the output signal from the spindle controller 3202 as the input. If the SPON signal is at High, the spindle-output control switch 3203 selects a terminal a, thereby outputting the output signal from the spindle controller 3202 as a SPD signal. Meanwhile, if the SPON signal is at Low, the spindle-output control switch 3203 selects a terminal b, thereby outputting the reference electric potential as the SPD signal without outputting the output signal from the spindle controller 3202. As a result, the SPON signal becomes a signal for instructing the ON/OFF of the spindle control. Also, the spindle-output control switch 3203 functions as a switch for switching the ON/OFF of the spindle control. The SPD signal outputted from the spindle-output control switch 3203 is amplified by the spindle driving circuit 33, then controlling the spindle motor 50.

Using the present rotational angle Detθ signal and the angle command value Tgtθ signal as the inputs, the spindle-control judgment circuit 3204 makes the judgment as to whether or not the rotational angle of the hologram recording medium 1 is a value which is proximate to the angle command value Tgtθ, then outputting the judgment result as a SPOK signal. Incidentally, it is assumed that, if the rotational angle of the hologram recording medium 1 is the value proximate to the angle command value Tgtθ, the SPOK signal is switched at High. For example, the spindle-control judgment circuit 3204 can be implemented as the following circuit: Namely, this circuit measures a lapse time which has elapsed after a difference between the present rotational angle Detθ detected by the rotational-angle detection sensor 14 and the angle command value Tgtθ became smaller than a predetermined threshold value. Then, this circuit makes the above-described judgment based on a criterion that this lapse time measured will continue for a predetermined time or more. The SPOK signal, i.e., the judgment result, is inputted into the controller 80. On account of this, the SPOK signal allows the controller 80 to make the judgment as to whether or not the rotational angle of the hologram recording medium 1 is the value proximate to the angle command value Tgtθ. Namely, the spindle-control judgment circuit 3204 functions as a circuit for making the judgment on the convergence of the spindle control.

Figure 11:
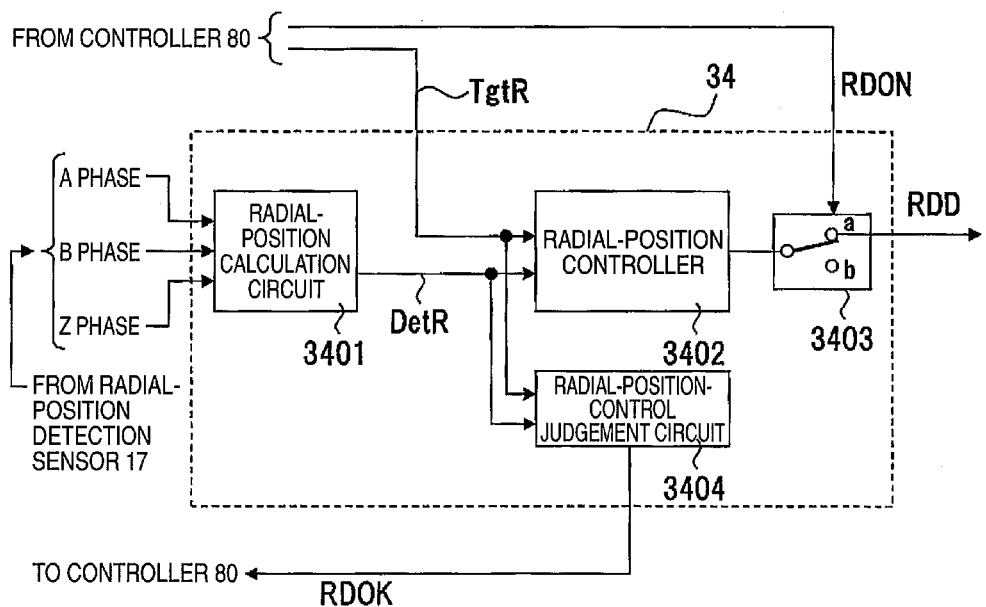
FIG. 11 This is a block diagram for illustrating the configuration of a radial-direction transportation control circuit in the first embodiment.

Referring to FIG. 11, the explanation will be given below regarding the configuration of the radial-direction transportation control circuit 34 in the present embodiment. The radial-direction transportation control circuit 34 is constituted from a radial-position calculation circuit 3401, a radial-position controller 3402, a radial-position-output control switch 3403, and a radial-position-control judgment circuit 3404. Based on a command signal from the controller 80, the radial-direction transportation control circuit 34 controls the radial-direction transportation unit 52 so that the position of the movable portion of the radial-direction transportation unit 52 becomes equal to a radial-position command value TgtR from the controller 80. In the present specification, this control is referred to as "radial position control". Making the comparison between FIG. 10 and FIG. 11 shows that the configuration of the radial-direction transportation control circuit 34 is similar to the configuration of the spindle control circuit 32.

Using, as the inputs, the A-phase signal, the B-phase signal, and the Z-phase signal outputted from the radial-position detection sensor 17, the radial-position calculation circuit 3401 calculates the present radial position DetR of the hologram recording medium 1 from the above-described three signals, then outputting this present radial position DetR as a DetR signal. The radial-position controller 3402 outputs a driving signal for controlling the radial-direction transportation unit 52, using the DetR signal and the radial-position command value TgtR signal from the controller 80 as the inputs.

In accordance with a control signal RDON from the controller 80, the radial-position-output control switch 3403 controls whether or not the output signal from the radial-position controller 3402 should be outputted, using the output signal from the radial-position controller 3402 as the input. If the RDON signal is at High, the radial-position-output control switch 3403 selects a terminal c, thereby outputting the output signal from the radial-position controller 3402 as a RDD signal. Meanwhile, if the RDON signal is at Low, the radial-position-output control switch 3403 selects a terminal d, thereby outputting the reference electric potential as the RDD signal without outputting the output signal from the radial-position controller 3402. As a result, the RDON signal becomes a signal for instructing the ON/OFF of the radial position control. Also, the radial-position-output control switch 3403 functions as a switch for switching the ON/OFF of the radial position control. The RDD signal outputted from the radial-position-output control switch 3403 is amplified by the radial-direction transportation driving circuit 35, then controlling the radial-direction transportation unit 52.

Using the present radial position DetR signal and the radial-position command value TgtR signal as the inputs, the radial-position-control judgment circuit 3404 makes the judgment as to whether or not the radial position of the hologram recording medium 1 is a value which is proximate to the radial-position command value TgtR, then outputting the judgment result as a RDOK signal. Incidentally, it is assumed that, if the radial position of the hologram recording medium 1 is the value proximate to the radial-position command value TgtR, the RDOK signal is switched at High. For example, the radial-position-control judgment circuit 3404 can be implemented as the following circuit: Namely, this circuit measures a lapse time which has elapsed after a difference between the present radial position DetR detected by the radial-position detection sensor 17 and the radial-position command value TgtR became smaller than a predetermined threshold value. Then, this circuit makes the above-described judgment based on a criterion that this lapse time measured will continue for a predetermined time or more. The RDOK signal, i.e., the judgment result, is inputted into the controller 80. On account of this, the RDOK signal allows the controller 80 to make the judgment as to whether or not the radial position of the hologram recording medium 1 is the value proximate to the radial-position command value TgtR. Namely, the radial-position-control judgment circuit 3404 functions as a circuit for making the judgment on the convergence of the radial position control.

Incidentally, the configuration of the spindle-control judgment circuit 3204 in the present embodiment has been given as follows: Namely, this circuit measures a lapse time which has elapsed after a difference between the present rotational angle Detθ and the angle command value Tgtθ became smaller than a predetermined threshold value. Then, this circuit makes the above-described judgment based on a criterion that this lapse time measured will continue for a predetermined time or more. The configuration of the spindle-control judgment circuit 3204, however, may also be some other configuration, as long as the spindle-control judgment circuit 3204 is capable of making the judgment as to whether or not the rotational angle of the hologram recording medium 1 is the value proximate to the angle command value Tgtθ. For example, the configuration is also allowable where, if the present rotational angle Detθ becomes equal to the angle command value Tgtθ at least one time, the SPOK signal is switched at High at this very point-in-time. The situation is also basically the same concerning the radial-position-control judgment circuit 3404 as well.

Figure 12:
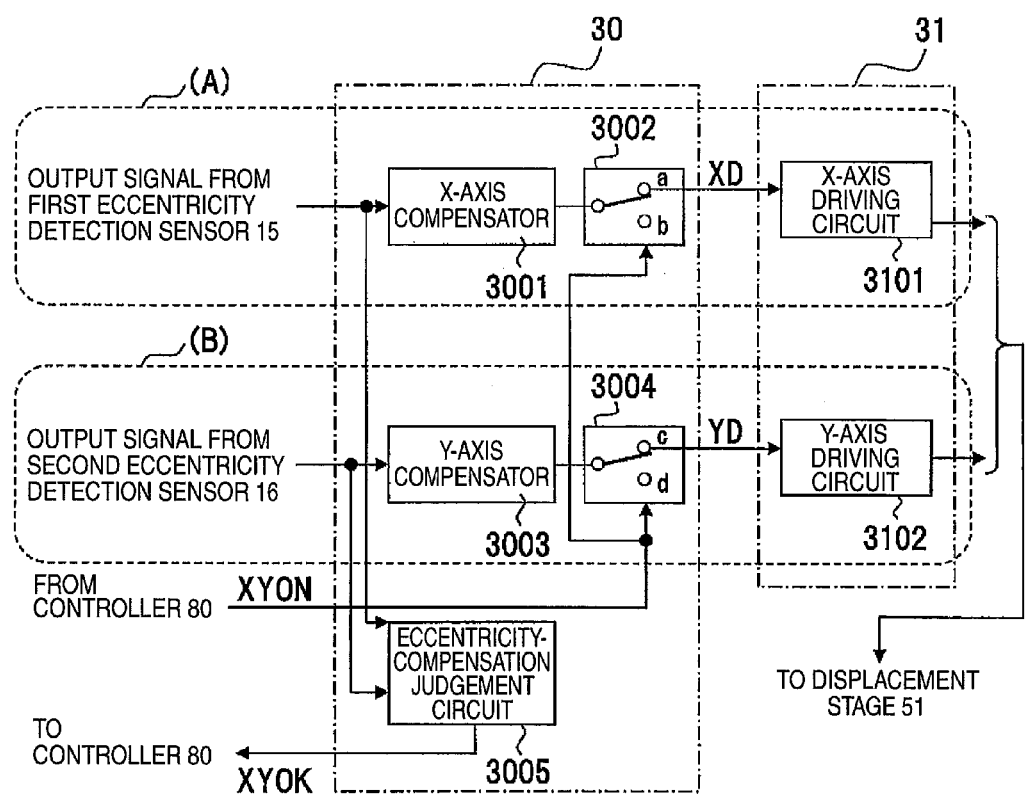
FIG. 12 This is a block diagram for illustrating the configuration of eccentricity compensation circuits and displacement-stage driving circuits in the first embodiment.

Referring to FIG. 12, the explanation will be given below concerning the configuration of the eccentricity compensation circuit 30 and the displacement-stage driving circuit 31 in the present embodiment. The eccentricity compensation circuit 30 is constituted from an X-axis compensator 3001, an X-axis-output control switch 3002, a Y-axis compensator 3003, a Y-axis-output control switch 3004, and an eccentricity-compensation judgment circuit 3005. Also, the displacement-stage driving circuit 31 is constituted from an X-axis driving circuit 3101 and a Y-axis driving circuit 3102. Based on a command signal from the controller 80, the eccentricity compensation circuit 30 controls the displacement stage 51 so that the positioning of the hologram recording medium 1 is performed with the eccentricity-detection-dedicated mark used as its criterion. In the present specification, this control is referred to as "eccentricity compensation control".

The X-axis compensator 3001 inputs therein an output signal from the first eccentricity detection sensor 15, then generating a driving signal for driving the X axis of the displacement stage 51. In accordance with a control signal XYON from the controller 80, the X-axis-output control switch 3002 controls whether or not the output signal from the X-axis compensator 3001 should be outputted, using the output signal from the X-axis compensator 3001 as the input. If the XYON signal is at High, the X-axis-output control switch 3002 selects a terminal a, thereby outputting the output signal from the X-axis compensator 3001 as an XD signal. Meanwhile, if the XYON signal is at Low, the X-axis-output control switch 3002 selects a terminal b, thereby outputting the reference electric potential as the XD signal without outputting the output signal from the X-axis compensator 3001. The XD signal outputted from the X-axis-output control switch 3002 is amplified by the X-axis driving circuit 3101, then controlling the X axis of the displacement stage 51.

The Y-axis compensator 3003 inputs therein an output signal from the second eccentricity detection sensor 16, then generating a driving signal for driving the Y axis of the displacement stage 51. In accordance with the control signal XYON from the controller 80, the Y-axis-output control switch 3004 controls whether or not the output signal from the Y-axis compensator 3003 should be outputted, using the output signal from the Y-axis compensator 3003 as the input. If the XYON signal is at High, the Y-axis-output control switch 3004 selects a terminal a, thereby outputting the output signal from the Y-axis compensator 3003 as a YD signal. Meanwhile, if the XYON signal is at Low, the Y-axis-output control switch 3004 selects a terminal b, thereby outputting the reference electric potential as the YD signal without outputting the output signal from the Y-axis compensator 3003. The YD signal outputted from the Y-axis-output control switch 3004 is amplified by the Y-axis driving circuit 3102, then controlling the Y axis of the displacement stage 51.

Using the output signal from the first eccentricity detection sensor 15 and the output signal from the second eccentricity detection sensor 16 as the inputs, the eccentricity-compensation judgment circuit 3005 makes the judgment as to whether or not the positioning of the hologram recording medium 1 with the eccentricity-detection-dedicated mark used as its criterion has been completed, then outputting the judgment result as an XYOK signal. Incidentally, it is assumed that, if the positioning of the hologram recording medium 1 with the eccentricity-detection-dedicated mark used as its criterion has been completed, the XYOK signal is switched at High. The XYOK signal is inputted into the controller 80. On account of this, the XYOK signal allows the controller 80 to make the judgment as to whether or not the positioning of the hologram recording medium 1 with the eccentricity-detection-dedicated mark used as its criterion has been completed. Namely, the eccentricity-compensation judgment circuit 3005 functions as a circuit for making the judgment on the convergence of the eccentricity compensation control.

Here, the explanation will be given below regarding the controls performed in the X-axis compensator 3001 and the Y-axis compensator 3003. First of all, the eccentricity-compensation judgment circuit 3005 is an attached and subordinate circuit. On account of this, as is shown from FIG. 12, in the control system associated with the eccentricity compensation circuit 30 and the displacement-stage driving circuit 31, the X-axis-related control system indicated by a dashed line (A) and the Y-axis-related control system indicated by a dashed line (B) are independent of each other. Namely, the output signal from the first eccentricity detection sensor 15 and the output signal from the second eccentricity detection sensor 16 are inputted into the eccentricity compensation circuit 30. Nevertheless, it is only the output signal from the first eccentricity detection sensor 15 that is used for the control over the X axis of the displacement stage 51. Similarly, it is only the output signal from the second eccentricity detection sensor 16 that is used for the control over the Y axis of the displacement stage 51.

In the X-axis compensator 3001, the control is performed so that the voltage of the output signal from the first eccentricity detection sensor 15 to be inputted therein becomes equal to zero. In the Y-axis compensator 3003, the control is performed so that the voltage of the output signal from the second eccentricity detection sensor 16 to be inputted therein becomes equal to zero. These controls are general feedback controls, and the X-axis compensator 3001 or the Y-axis compensator 3003 can be implemented using a general CPU as an example.

As having been explained using FIG. 9 or FIG. 7, both of the output signal from the first eccentricity detection sensor 15 and the output signal from the second eccentricity detection sensor 16 are made equal to zero. This operation is equivalent to the operation that the positon of the hologram recording medium 1 is controlled so that the edge of the eccentricity-detection-dedicated mark M2 is positioned directly above both of the sensors. Accordingly, the above-described operations of the X-axis compensator 3001 and the Y-axis compensator 3003 make it possible to control the positon of the hologram recording medium 1 so that the edge of the eccentricity-detection-dedicated mark M2 is positioned directly above both of the sensors.

When explained using FIG. 6, the case where the eccentricity exists in the hologram recording medium 1 is the case where the geometrical center of the circle R1 of the innermost circumference of the medium does not coincide with the geometrical center O of the hologram recording medium 1. Even in this case, the displacement stage 51 controls the positon of the hologram recording medium 1, using the eccentricity-detection-dedicated mark M2. Concretely, the geometrical center O of the eccentricity-detection-dedicated mark M2 is so controlled as to coincide with the driving criterion position of the displacement stage 51.

Here, the position onto which the signal light and/or reference light is to be irradiated is a position that is fixed onto the apparatus. On account of this, even in the case where the eccentricity exists, this operation causes the displacement stage to be operated so that the positioning of the hologram recording medium 1 is performed with the eccentricity-detection-dedicated mark used as its criterion. This can also be translated into a phrase that the displacement stage can be controlled so that the signal light and/or the reference light is irradiated onto the position at which the eccentricity is cancelled.

As was explained in FIG. 12, however, a limitation associated with the deployment of the sensors exists in order to control the X axis and the Y axis independently of each other. In the present embodiment, the first eccentricity detection sensor 15 and the second eccentricity detection sensor 16 are deployed in the manner of being orthogonal to each other with reference to the driving criterion positon xyO. Simultaneously, the directions in which the sensors are orthogonal to each other are made identical to the directions of the driving axes of the displacement stage 51. Next, the explanation will be given below regarding the reason why a configuration like this is employed.

Figure 13A:
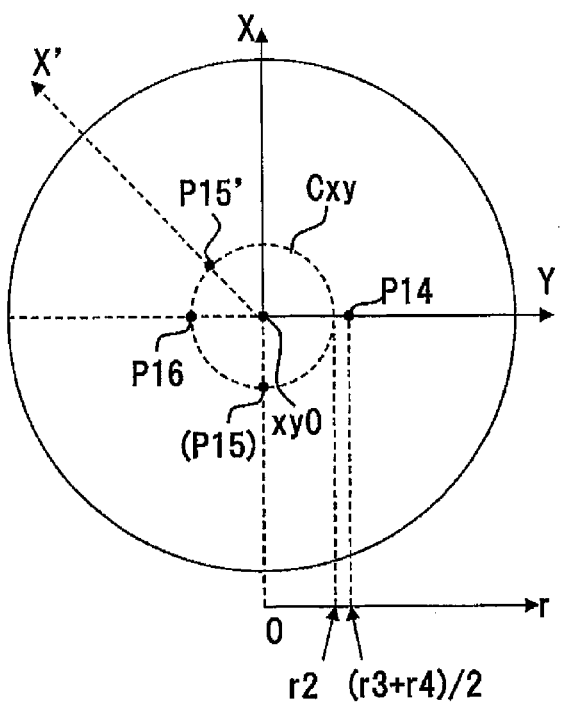
FIG. 13 (a) This is a diagram for explaining the case where the fixed position of the first eccentricity detection sensor is changed.
Figure 13B:
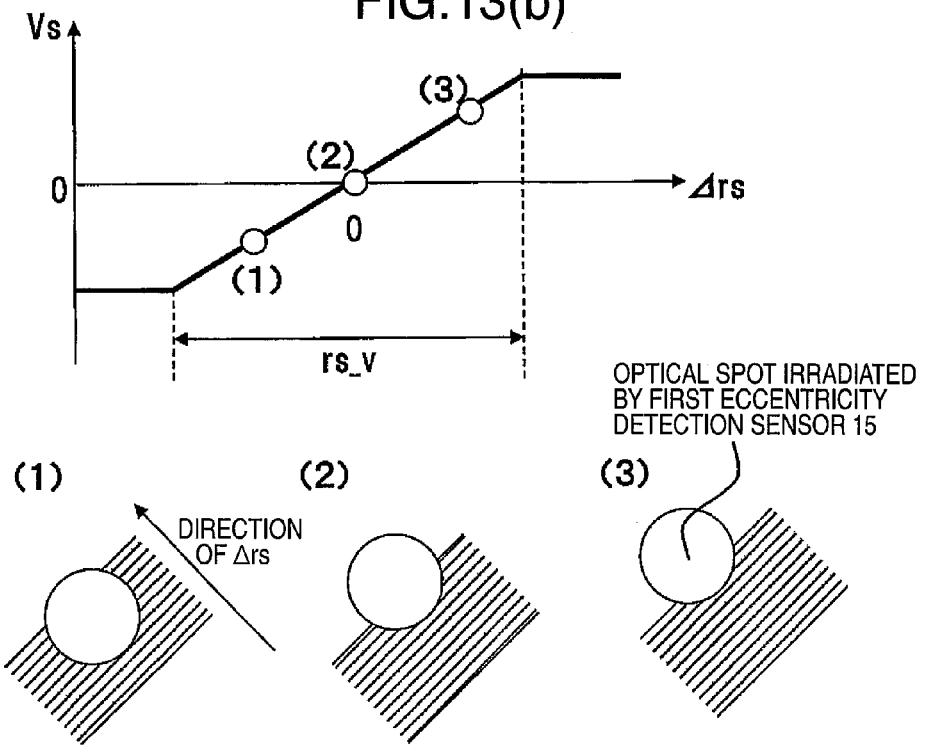

As an example, consideration is given to the case where, as illustrated in FIG. 13 (a), the fixed position of the first eccentricity detection sensor 15 is changed to P15'. What is different from the case illustrated in FIG. 7 is only the fixed positions of the first eccentricity detection sensor 15. It is assumed that P15' exists on a straight line that forms 45 degrees with respect to the Y-axis negative direction. In FIG. 13 (a), the direction that forms 45 degrees with respect to the Y-axis negative direction is represented as being an X' axis.

Also, it is assumed that, as the precondition of the explanation that will be given hereinafter, the configurations of the spindle control circuit 32, the radial-direction transportation control circuit 34, and the eccentricity compensation circuit 30 are the ones that are common to the explanations given so far. Namely, the configuration of the eccentricity compensation circuit 30 is that, based on the output signal from the first eccentricity detection sensor 15, the eccentricity compensation circuit 30 drives the X axis of the displacement stage 51.

The output signal from the first eccentricity detection sensor 15 in the case where the fixed position of the first eccentricity detection sensor 15 is changed to the position of P15' turns out to be the one as is illustrated in FIG. 13 (B). Namely, the direction in which Δrs is to be taken is not set as being the X-axis direction, but is set as being the X'-axis direction. When the way in which Δrs is to be taken is changed in this way, the relationship between Δrs and the output voltage Vs becomes the same relationship as the one in the case of FIG. 9 (b).

When performing the control actually, however, the control systems are needed to be independent of each other in proximity to a target point of the control. Concretely, in the case of FIG. 13 (a), consideration is given to the situation where the hologram recording medium 1 has displaced in the left direction by an infinitesimal distance. In this case, only the Y axis requires the displacement by the displacement stage 51. In the case of FIG. 13 (a), however, the edge of the eccentricity-detection-dedicated mark M2 is inclined by 45 degrees in proximity to the point P15'. On account of this, when the hologram recording medium 1 has displaced in the left direction by the infinitesimal distance, the output from the first eccentricity detection sensor 15 also varies. As a result, there is a possibility that the eccentricity compensation control by the eccentricity compensation circuit 30 will not converge. Moreover, in the worst case, there is also a possibility that the control over the two axes, i.e., the X axis and the Y axis, by the displacement stage 51 will oscillate. This problem becomes particularly serious, if the response speed of the X-axis control system and the response speed of the Y-axis control system are equal to each other.

Meanwhile, with respect to the case where the first eccentricity detection sensor 15 is deployed at the position of P15 like the configuration in the present embodiment, consideration is similarly given to the situation where the hologram recording medium 1 has displaced in the left direction by an infinitesimal distance. In this case, the X-axis-direction displacement of the edge of the eccentricity-detection-dedicated mark M2 in proximity to the point P15 is equal to substantially zero. This is obvious from the fact that the tangent to the circle Cxy at the point P15 becomes parallel to the Y axis. On account of this, in the case of the configuration in the present embodiment, the X axis is seldom driven, and only the Y axis is driven. For this reason, no problem will occur as long as the configuration in the present embodiment is not changed.

As a result of the condition that an operation like this is performed with respect to the X axis and the Y axis simultaneously, the control over the two axes by the displacement stage 51 converges into a preferable position without oscillating. From the above-described explanation, it is preferable to employ the configuration that the first eccentricity detection sensor 15 and the second eccentricity detection sensor 16 are deployed in the manner of being orthogonal to each other with reference to the driving criterion positon xyO.

Incidentally, as is shown from the above-described explanation, the limitation associated with the deployment of the sensors is as follows: Namely, the tangents to the circle Cxy at the point P15 and the point P16, i.e., the points at which the eccentricity detection sensors are to be deployed, are parallel to the driving axes of the displacement stage 51.

Subsequently, referring to a flowchart illustrated in FIG. 5, the explanation will be given below concerning the seek processing S414 in the present embodiment. Incidentally, the same flowchart also holds for the seek processing S422 as well. Here, in the seek processing in the case where the hologram recording medium 1 is a disc-like medium, the radius r and the rotational angle θ become its parameters. Hereinafter, the driving axis of the radius r and the driving axis of the rotational angle θ will be referred to as "r axis" and "θ axis", respectively.

Incidentally, in the present embodiment, the eccentricity compensation control is started by switching the XYON signal at High in the learning processing step S404 that is performed before the seek processing S414. On account of this, the eccentricity compensation control has been already held in the ON state at the point-in-time at which the seek processing S414 is started.

When the seek processing is started (step S501), a difference between the coordinate (r, θ), at which the hologram of a target address is positioned, and the present position is calculated, thereby calculating the displacement amounts about the r axis and the θ axis (step S502). Next, it is judged whether or not the displacement amount of the r axis is a value other than zero (step S503). If the displacement amount of the r axis is the value other than zero (the case of Yes at the step S503), the RDON signal is switched at High, thereby switching the radial position control ON to start the displacement of the r axis (step S504). Subsequent to the step S504, the processing transfers to a step S505 (which will be described later). Meanwhile, if the displacement amount of the r axis is zero (the case of No at the step S503), the processing transfers to the step S505 without performing the step S504.

At the step S505, it is judged whether or not the displacement amount of the θ axis is a value other than zero. If the displacement amount of the θ axis is the value other than zero (the case of Yes at the step S505), the SPON signal is switched at High, thereby switching the spindle control ON to start the displacement of the θ axis (step S506). Subsequent to the step S506, the processing transfers to a step S507 (which will be described later). Meanwhile, if the displacement amount of the θ axis is zero (the case of No at the step S505), the processing transfers to the step S507 without performing the step S506.

At the step S507, it is judged whether or not the displacements of the r axis and the θ axis have been completed. Here, if all of the RDOK signal, the SPOK signal, and the XYOK signal are at the High level, it is judged that the displacements have been completed.

If it is judged that the displacements have been not completed (the case of No at the step S507), the processing returns to the step S507 again. Namely, if any one of the RDOK signal, the SPOK signal, and the XYOK signal is at the Low level, it is not judged that the displacements have been completed. Namely, the seek processing becomes an operation that is standby until all of the above-described three signals are simultaneously switched at the High level.

Meanwhile, if it is judged that the displacements have been completed (the case of Yes at the step S507), both of the RDON signal and the SPON signal are switched at Low, thereby switching the radial position control and the spindle control OFF to terminate the displacements (step S508).

Next, it is judged whether or not the processing is the seek processing at the reproduction time (step S509). If the processing is not the seek processing at the reproduction time (the case of No at the step S509), the processing proceeds to a step S515 (which will be described later), then terminating the seek processing. Meanwhile, if the processing is the seek processing at the reproduction time (the case of Yes at the step S509), the processing does not terminate the seek processing with this, but continues the seek processing. Here, the seek processing is continued until the hologram recording medium 1 is properly positioned at the target address with the address information that is obtained by reproducing the recorded hologram. This is because the seek processing at the recording time becomes a seek processing onto an unrecorded portion, and because the address information cannot be obtained.

Meanwhile, if the processing is the seek processing at the reproduction time (the case of Yes at the step S509), it is judged whether or not the hologram is reproducible by trying to reproduce the hologram (step S510). This reproduction is performed by irradiating the reference light onto the position on the positioned hologram recording medium 1. If the hologram is not reproducible (the case of No at the step S510), it means that the positioning could not be performed accurately. On account of this, the processing calculates r-axis and θ-axis retry values based on predetermined retry parameters (step S511), then returning to the step S502. This executes a retry seek processing that allows the medium to displace to a proximity to the positioned position.

Meanwhile, if the hologram is reproducible (the case of Yes at the step S510), the address information included in the reproduced hologram is acquired (step S512). Subsequently, it is judged whether or not the acquired address is the target address (step S513). If the acquired address is not the target address (the case of No at the step S513), it means that the positioning could not be performed accurately. On account of this, the processing calculates a difference between the coordinate (r, θ) of the acquired address and the coordinate (r, θ) of the target address, then returning to the step S502. This executes a retry seek processing which is based on the address information on the hologram.

Meanwhile, If the acquired address is the target address (the case of Yes at the step S513), the seek processing is terminated (step S515).

Here, in the flowchart given in the present embodiment, its feature lies in the following point, for example: Namely, in the case of a seek processing where the displacement amount of the r axis is zero, and where only the θ axis is driven, even if the spindle control converges up to a proximity to the angle command value Tgtθ, and even if the SPOK signal is held at High, unless the XYOK signal outputted from the eccentricity-compensation judgment circuit 3005 is switched at High, the spindle control is not switched OFF (namely, the SPD signal and the output signal from the spindle controller 3202 continue to be outputted). In the conventional-technology configuration where there is not provided a circuit equivalent to the eccentricity compensation circuit 30 in the present embodiment, the SPOK signal functions as a convergence judgment circuit for making the convergence judgment on the spindle control. Accordingly, if the SPOK signal is switched at High, the spindle control may be switched OFF purely. In the present embodiment, however, this OFF operation is not executed. The reason why this OFF operation is not executed will be described later.

Next, the explanation will be given below concerning effects based on the present embodiment. First, as the configuration for cancelling the eccentricity, a mechanism is selected where the radial-direction transportation unit 52 onto whose movable portion the displacement stage 51 and the sensors are fixed, the spindle motor 50, and the hologram recording medium 1 equipped with the predetermined marks are installed in this sequence. The present inventor has found that the preferable configuration for cancelling the eccentricity becomes this installation sequence.

If the ease with which the apparatus is implemented is not taken into consideration, the best configuration for cancelling the eccentricity is a configuration where, unlike this installation sequence, the displacement stage 51 is installed on the spindle motor 50. This configuration makes it possible to cancel the eccentricity using the simplest and easiest method. Namely, when giving the explanation using FIG. 18 (*b*), even in the case where the eccentricity exists, the center O of the hologram recording medium 1 can be caused to coincide with the rotational center spO of the spindle motor 50. This configuration, however, makes it very difficult to implement the displacement stage 51. This is because, from the circumstances where the displacement stage 51 is installed on the rotational axis of the rotating spindle motor 50, the electrical wiring of the control system of the displacement stage 51 (i.e., the wiring used for the connection between the displacement-stage driving circuit 31 and the displacement stage 51) needs to be set up along the rotational axis. The implementation of this requires the set-up of an expensive mechanism. Moreover, the long-term implementation is also difficult as life-expectancy of the apparatus.

On account of this, the installation sequence of the spindle motor 50 and the displacement stage 51 becomes the sequence in which, like the configuration in the present embodiment, the spindle motor 50 is installed on the movable portion of the displacement stage 51. Also, the marks provided on the hologram recording medium 1 are so configured as to slide onto the inner-circumference side. Accordingly, it is preferable that the sensors are fixed onto the same member as the displacement stage 51, and are transported in the radial direction by the radial-direction transportation unit 52 in a manner of being integrated with the hologram recording medium 1. As a result, the installation sequence becomes the one where the displacement stage 51 and the sensors are fixed onto the movable portion of the radial-direction transportation unit 52.

In this way, the first effect in the present embodiment is the following point: Namely, the compatibility between the cancelling of the eccentricity and the ease with which the apparatus is implemented can be solved by the ingenious idea of the mechanism-based installation sequence.

Next, the explanation will be given below regarding the second effect. As described above, the displacement stage 51 cannot be installed on the rotational axis of the spindle motor 50. Instead, the configuration becomes the one where the spindle motor 50 is installed on the movable portion of the displacement stage 51. In the case of this configuration, a featured control becomes necessary in an aspect of the control as well.

Figure 18A:
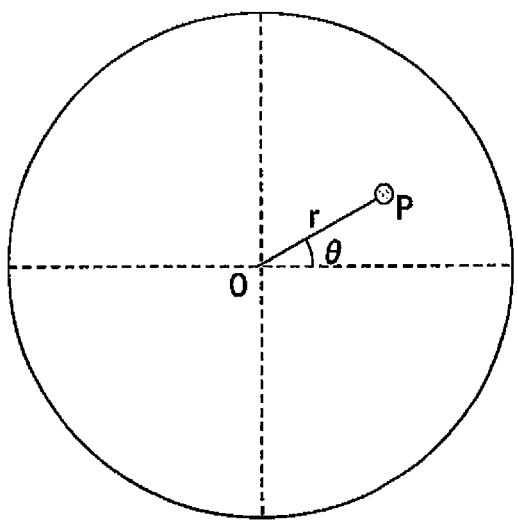
FIG. 18 (a) This is the diagram for explaining the case where the eccentricity does not exist.
Figure 18B:
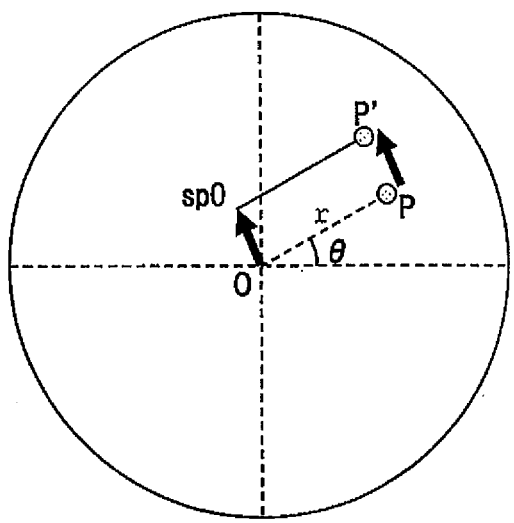

If the displacement stage 51 can be installed on the rotational axis of the spindle motor 50, when giving the explanation using FIG. 18 (*b*), the center O of the hologram recording medium 1 can be caused to coincide with the rotational center spO of the spindle motor 50. In the case of the configuration in the present embodiment, however, even in the case where the eccentricity exists, the center O of the hologram recording medium 1 cannot be caused to coincide with the rotational center spO of the spindle motor 50. In the case of the present embodiment, the center O of the hologram recording medium 1 and the rotational center spO of the spindle motor 50 are left unchanged in the state where they are shifted from each other. The center O of the hologram recording medium 1, however, is caused to coincide with the driving criterion positon xyO of the displacement stage 51. This allows the reference light and/or the signal light to be controlled so that the reference light and/or the signal light is irradiated onto the position at which the eccentricity is cancelled.

Figure 14A:
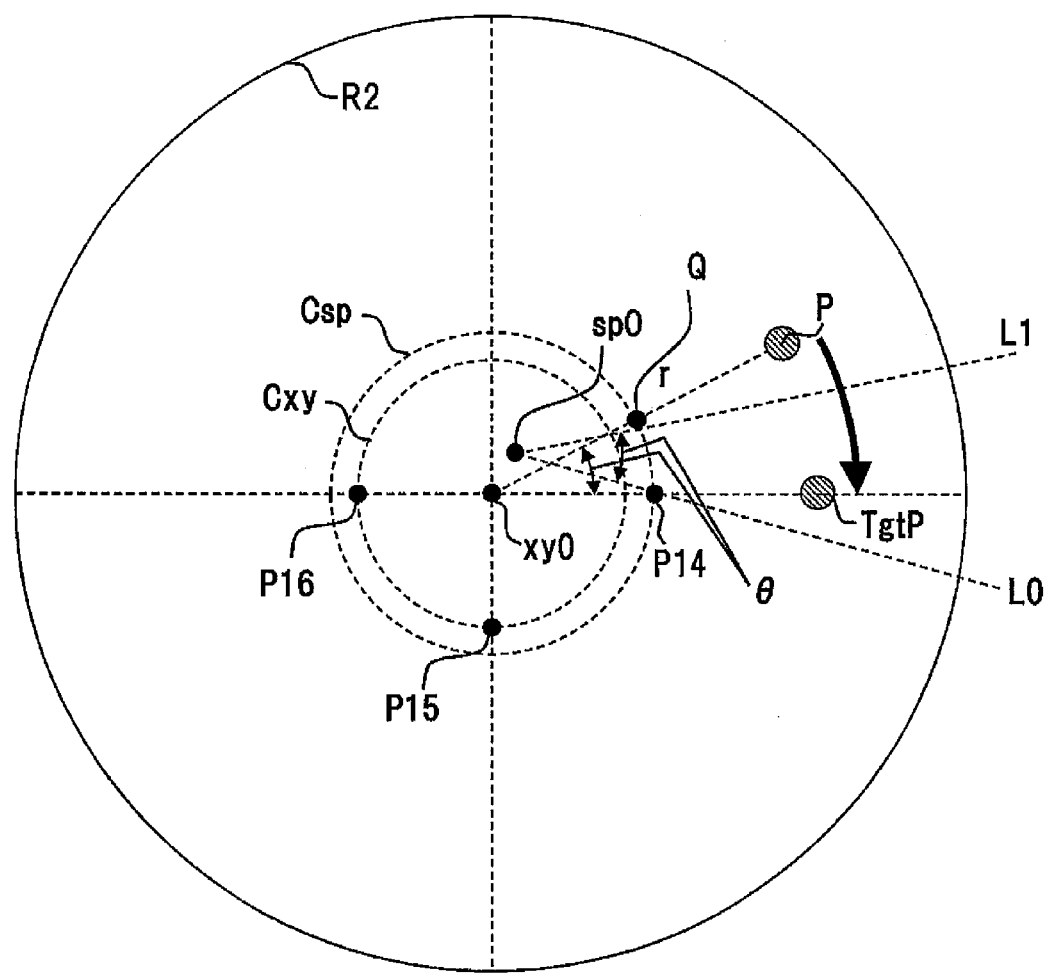
FIG. 14 (a) This is a diagram for explaining the case where the control method in the first embodiment is not used.
Figure 14B:
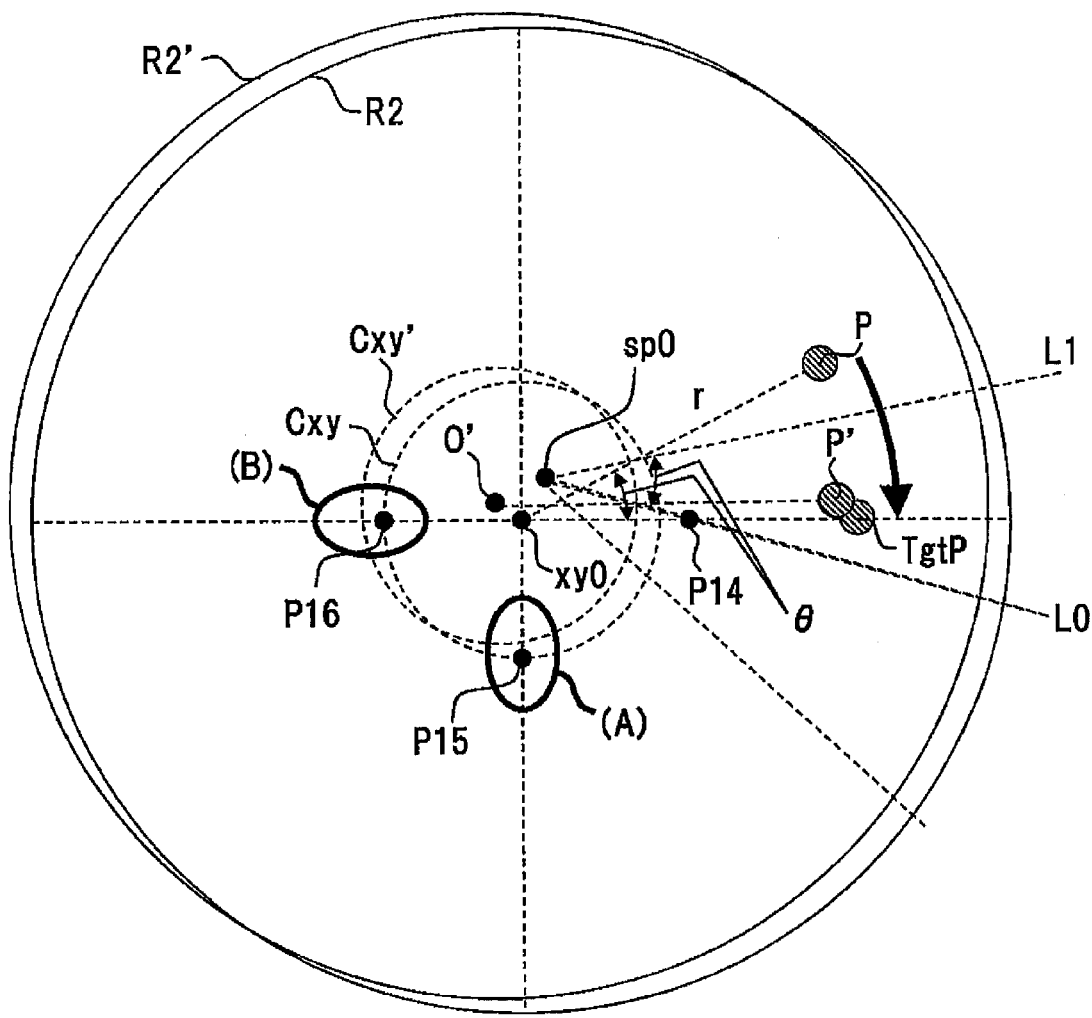

Referring to FIG. 14, the explanation will be given below concerning the reason why the featured control becomes necessary when implementing the preferable mechanism-based installation sequence like the configuration in the present embodiment. FIG. 14 (*a*) is a schematic diagram for illustrating the position relationship between the hologram recording medium 1 and each sensor. A circle R2 indicates the outer-most circumference of the hologram recording medium 1, and a circle Cxy indicates the edge of the outer circumference of the eccentricity-detection-dedicated mark M2, and a circle Csp indicates the central line of the angle-detection-dedicated mark M1.

According to the present embodiment, the center O of the hologram recording medium 1 coincides with the driving criterion positon xyO of the displacement stage 51. Accordingly, in FIG. 14 (*a*), this situation is illustrated as such. It is assumed that, in FIG. 14 (*a*), the eccentricity exists. Namely, the rotational center spO of the spindle motor 50 is so illustrated as to be a position that does not coincide with the driving criterion positon xyO of the displacement stage 51.

Usually, in a seek operation performed in an optical disc apparatus, the spindle control and the radial position control are performed independently of each other. These two controls may be performed simultaneously, or may be performed sequentially. If this conventional control technique is followed, it turns out that the spindle control, the radial position control, and the eccentricity compensation control may also be performed independently of each other. Nevertheless, when the configuration in the present embodiment is employed, the spindle control and the eccentricity compensation control cannot be performed independently of each other.

Now, it is assumed that a target hologram is recorded at the position indicated by a point P, and that a seek operation where the spindle motor 50 is rotated is performed in order to reproduce this target hologram. Incidentally, here, it is assumed that the radial position control has been already completed. The displacement destination of the point P is indicated by a point TgtP. The point TgtP is a position onto which the reference light is irradiated. Usually, the reference light is irradiated onto a position that is substantially directly below the objective lens 215. Accordingly, it is allowable to rephrase that the objective lens 215 is deployed directly above the point TgtP. Now, consideration is given to a seek operation where, when the eccentricity does not exist, the spindle motor 50 is rotated by the amount of $(-\theta)$.

Consideration is given to a hypothesized case where the spindle control is performed before the eccentricity compensation control is performed. In this case, the hologram recording medium 1 is rotated by the amount of $(-\theta)$ with the point spO, i.e., the rotational center of the spindle motor 50, as the center. For the explanation, the straight line connected between the point spO and a point P14 is represented by L0, and the straight line obtained by rotating the straight line L0 around the point spO by the amount of $(+\theta)$ is represented by L1. The hologram recording medium 1 is rotated by the amount of $(-\theta)$ with the point spO as the center. This means that L0 is rotated with the point spO as the center so that L1 is overlapped with L0, since the sensor that detects the rotational angle is the rotational-angle detection sensor 14 set up at the point P14.

FIG. 14 (*b*) illustrates the state implemented after this rotation. As a result of this rotation, the point P is displaced to a point P'. Also, the center O of the hologram recording medium 1 is displaced from the driving criterion positon xyO of the displacement stage 51 to a point O'. Regarding the circle R2 and the circle Cxy as well, the after-rotation circles are similarly illustrated in this "'(: dash)"-attached manner.

As is shown from the drawing, simply rotating the spindle motor 50 by the amount of (−θ) does not make it possible to displace the target hologram to the destination position TgtP. Also, performing the eccentricity compensation control subsequently to this rotation makes it possible to cause the point O' to coincide with the point xyO. The displacement by this eccentricity compensation control, however, does not allow the point P' to coincide with the point TgtP. The reason for this is as follows: Namely, in the configuration in the present embodiment, the rotational center spO of the spindle motor 50 does not coincide with the driving criterion positon xyO of the displacement stage 51. As a result, the rotation amount needed for rotating the spindle motor 50 is no longer the amount of (−θ).

Also, in the explanation described above, the explanation has been given regarding the case where the spindle control is performed before the eccentricity compensation control is performed. Nevertheless, the eccentricity compensation control cannot be performed before the spindle control is performed. The reason for this is as follows: Namely, in the before-seek diagram in FIG. 14 (*a*), the edge of the outer circumference of the eccentricity-detection-dedicated mark M2 has been already positioned directly above the two eccentricity detection sensors, and the eccentricity compensation control in the present embodiment will not operate. This is because it cannot be known at the before-seek stage to what extent the displacement stage 51 should be driven when transferring to the after-seek state where the spindle motor 50 has been rotated by the amount of (−θ).

On account of this, in the seek operation where the spindle motor 50 is rotated, the spindle control and the eccentricity compensation control are needed to be performed simultaneously like the present embodiment, for example.

When the spindle control and the eccentricity compensation control are performed simultaneously, even if the state becomes the one as is illustrated in FIG. 14 (*b*), the point P15 and the circle Cxy' do not coincide with each other in a portion indicated by (A) in FIG. 14 (*b*). As a result, the output from the first eccentricity detection sensor 15 becomes equal to a value other than zero. Similarly, in a portion indicated by (B) in FIG. 14 (*b*), the output from the second eccentricity detection sensor 16 also becomes equal to a value other than zero. On account of this, the center O' of the hologram recording medium 1 is controlled by the eccentricity compensation control so that it coincides with the driving criterion positon xyO. At this time, the point P' is displaced again, and the detection angle by the rotational-angle detection sensor 14 is also changed by this eccentricity compensation control. As a result of the simultaneous operations of these two controls, in the seek's final state, the center O' of the hologram recording medium 1 is controlled onto the position at which it coincides with the driving criterion positon xyO.

Simultaneously, the spindle control also continues to be performed in the meantime as well. As a result, in the rotational-angle detection sensor 14 fixed onto the position of the point P14, a change amount of the rotational angle detected during the seek time-period becomes equal to the amount of (−θ) accurately. This means that a point Q illustrated in FIG. 14 (*a*) comes onto the straight line connected between the center O' of the hologram recording medium 1 and the point P14. The point Q is a point obtained by rotating the point P14 around the point xyO by the amount of (+θ). Considering that, in the seek's final state, the center O' of the hologram recording medium 1 is controlled onto the position at which it coincides with the driving criterion positon xyO, this means that the point Q illustrated in FIG. 14 (*a*) comes onto the X axis. This, namely, means that the point P comes onto the X axis, and that the point P is displaced onto the target position TgtP. This allows implementation of the high-accuracy positioning operation even in the configuration in the present embodiment.

This operation is implemented as follows: In FIG. 5, i.e, the flowchart in present embodiment, based on the condition that both of the SPOK signal and the XYOK signal are at the High level at the step S507, the spindle control at the step S508 is switched OFF.

In this way, even if the spindle control converges up to a proximity to the angle command value Tgtθ, and even if the SPOK signal is held at High, unless the XYOK signal outputted from the eccentricity-compensation judgment circuit 3005 is switched at High, the spindle control must not be switched OFF. Like the present embodiment, the spindle control and the eccentricity compensation control are needed to continue to operate simultaneously, until the judgment results of both of the SPOK signal and the XYOK signal turn out to be OK.

As having been explained so far, the spindle control and the eccentricity compensation control are performed simultaneously. This makes it possible to perform the seek operation properly even in the configuration in the present embodiment. The second effect in the present embodiment is the following point:

The two points explained above, i.e., the preferable installation sequence for cancelling the eccentricity and the control that becomes necessary in that case, are implemented. This makes it possible to perform the positioning control at the position at which the eccentricity is cancelled even in the case where there exists the shift, i.e., the eccentricity between the rotational center of the spindle motor 50 and the geometrical center of the disc-like hologram recording medium 1. More concretely, the spindle control circuit 32 and the eccentricity compensation circuit 30 operate in accordance with the present embodiment, thereby performing the positioning of the hologram recording medium 1 with the geometrical center of the eccentricity-detection-dedicated mark as the criterion. Even in the case where the eccentricity exists, this makes it possible to perform the recording or reproduction of the hologram by irradiating the signal light or the reference light onto the position at which the eccentricity is cancelled.

As having been explained using FIG. 18, a deterioration of the program reproduction quality and a lowering in the reproduction transfer rate can be mentioned as the problems in the case where the eccentricity exists. According to the present embodiment, the operation is made executable so that the eccentricity substantially disappears at either the recording time or the reproduction time. This makes it possible to solve the problems such as a deterioration of the program reproduction quality and a lowering in the reproduction transfer rate.

In this way, the third effect in the present embodiment is the following point: Namely, the recording or reproduction of the hologram is performed by irradiating the signal light or the reference light onto the position at which the eccentricity is cancelled. This makes it possible to solve the problems such as a deterioration of the program reproduction quality and a lowering in the reproduction transfer rate.

Moreover, as the control system for cancelling the eccentricity is, the two sensors for detecting the edges of the concentric eccentricity-detection-dedicated marks are deployed in the manner of being orthogonal to each other. Simultaneously, the directions in which the sensors are orthogonal to each other are made identical to the directions of the driving axes of the displacement stage 51. As having been explained using FIG. 13, this configuration allows the X axis and the Y axis to be controlled independently of each other in the eccentricity compensation circuit 30 and the displacement-stage driving circuit 31. This allows implementation of the simplification of the eccentricity compensation circuit 30, thereby making it possible to accomplish the low-cost implementation of the apparatus.

Also, as the characteristics of the first eccentricity detection sensor 15 and the second eccentricity detection sensor 16, the characteristics are employed where the voltage is outputted which responds to the relative position relationship between each sensor and the eccentricity-detection-dedicated mark M2. The use of each sensor having the characteristics permits the X-axis compensator 3001 to perform the control so that the output signal from the first eccentricity detection sensor 15 becomes equal to a predetermined voltage, which is an easy-to-implement configuration. The situation is basically the same concerning the Y-axis compensator 3003 as well. This makes it possible to accomplish the low-cost implementation of the apparatus.

In this way, the fourth effect in the present embodiment is the point of making it possible to accomplish the low-cost implementation of the apparatus.

Also, of the controls over the radius r, the rotational angle θ, and the eccentricity, concerning the controls over the rotational angle θ and the eccentricity, the configuration is employed such that the marks are provided on the hologram recording medium 1, and the controls are performed by detecting the marks. The positioning of the hologram recording medium 1 is performed such that each mark provided on the hologram recording medium 1 is used as the criterion. This allows implementation of the high-accuracy positioning control that does not depends on a variation among the apparatuses. Namely, the manner of the eccentricity at the hologram-recording-medium fixed portion mounted onto the rotational axis of the spindle motor 50 varies among the apparatuses. It becomes possible, however, to implement the high-accuracy positioning control that does not depends on this variation.

In this way, the fifth effect in the present embodiment is the following point: Namely, the angle-detection-dedicated mark M1 and the eccentricity-detection-dedicated mark M2 are provided on the hologram recording medium 1. This allows implementation of the high-accuracy positioning control where the medium 1 is used as the criterion.

Also, the configuration is employed such that the marks are provided on the hologram recording medium 1 concerning the rotational angle θ and the eccentricity. The reason for this is as follows: Namely, as illustrated in FIG. 6, these two marks can be made concentric, and thus can be embedded in such a manner that the sacrifice of the recording capacity of the hologram recording medium 1 becomes its minimum. With respect to the radial direction, considering that the detection in the radial direction is performed all the time, the marks are needed to be deployed over the entire surface area on which the user data is recorded as the hologram. This is not realistic from the viewpoints that the recording capacity becomes lowered, and further, the manufacturing cost of the medium becomes higher. Accordingly, it is preferable that the concentric marks for detecting the rotational angle θ and the eccentricity are provided on the hologram recording medium 1, and simultaneously, these marks are provided on an area that is different from the area on which the information-recorded hologram is recorded. This results in the preferable configuration where the marks are provided in such a manner that the sacrifice of the recording capacity becomes its minimum.

In this way, the sixth effect in the present embodiment is the following point: Namely, the sacrifice of the recording capacity resulting from providing the marks are suppressed down to its minimum.

As having been explained so far, the plurality of effectszz in the present embodiment can be mentioned. The configuration in the present embodiment allows implementation of the recording/reproduction that is preferable for the hologram recording medium.

The operation explained so far makes it possible to perform the recording or reproduction of the hologram at a position at which the eccentricity is cancelled. Also, simultaneously, the optimization of the mechanism-based installation sequence is performed. This makes it possible to accomplish the low-cost implementation and long-life-expectancy implementation of the apparatus.

In this way, according to the present embodiment, it becomes possible to implement the recording/reproduction that is preferable for the hologram recording medium.

Embodiment 2

In the first embodiment, the configuration is employed such that the angle-detection-dedicated mark M1 and the eccentricity-detection-dedicated mark M2 are provided on the hologram recording medium 1 as the different marks. It is possible, however, that the angle-detection-dedicated mark M1 and the eccentricity-detection-dedicated mark M2 are co-used as one and the same mark. The present embodiment is an embodiment in the case where the angle-detection-dedicated mark M1 and the eccentricity-detection-dedicated mark M2 are co-used.

Figure 19:
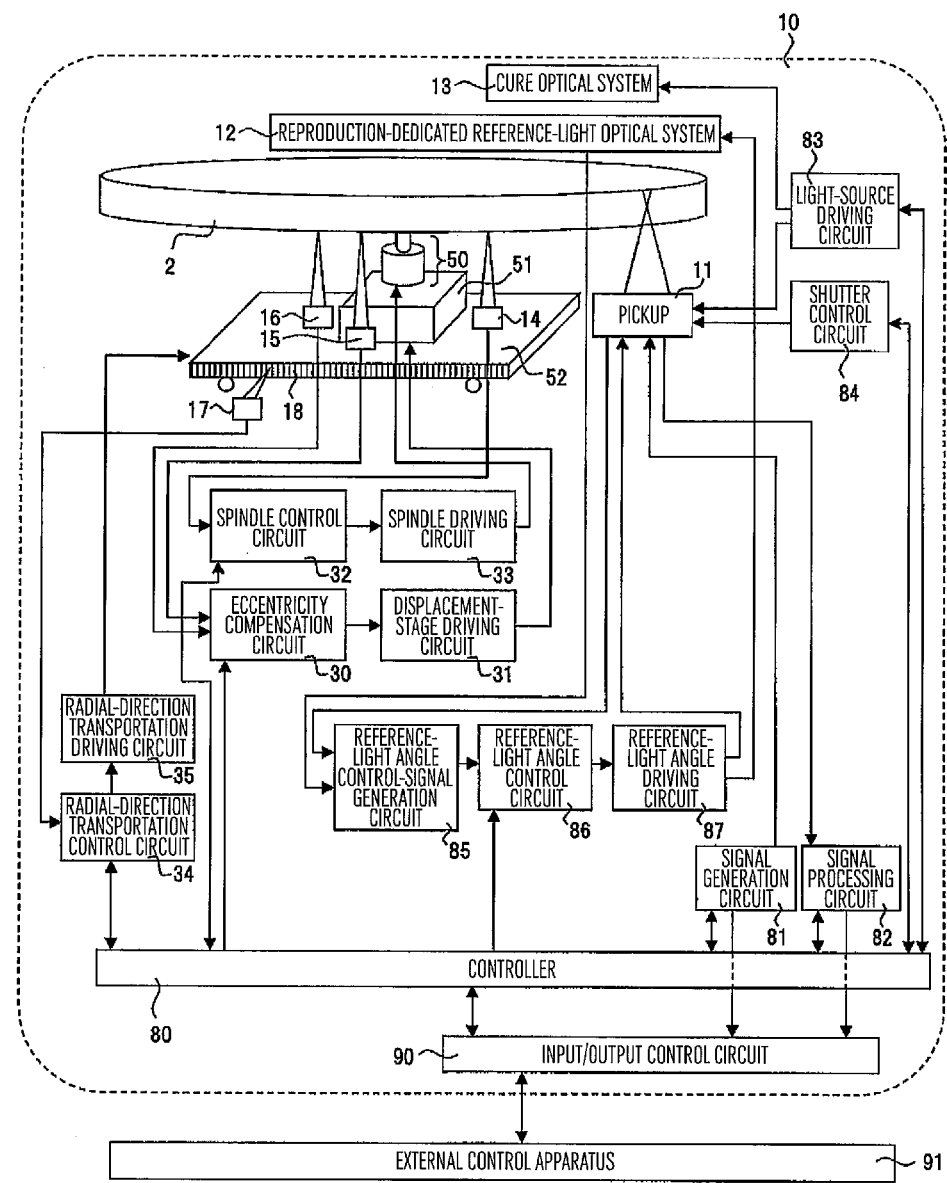
FIG. 19 This is a block diagram for illustrating a hologram recording/reproducing apparatus in a second embodiment.

FIG. 19 is a block diagram for illustrating a hologram recording medium's recording/reproducing apparatus for recording and/or reproducing digital information by using holography. Incidentally, the same reference numerals are affixed to configuration components that are common to the ones in FIG. 1, i.e., the block diagram of the first embodiment. Accordingly, the explanation thereof will be omitted here. There exist two points in which the present embodiment differs from the first embodiment. The first point is that the structure of a hologram recording medium 2 is different from the first embodiment. The second point is that the first eccentricity detection sensor 15 and the second eccentricity detection sensor 16 are fixed onto the movable portion of the radial-direction transportation unit 52. Their mounted positions, however, differ from the ones in the first embodiment. The difference in the mounted positions will be described later, using another drawing.

Figure 20:
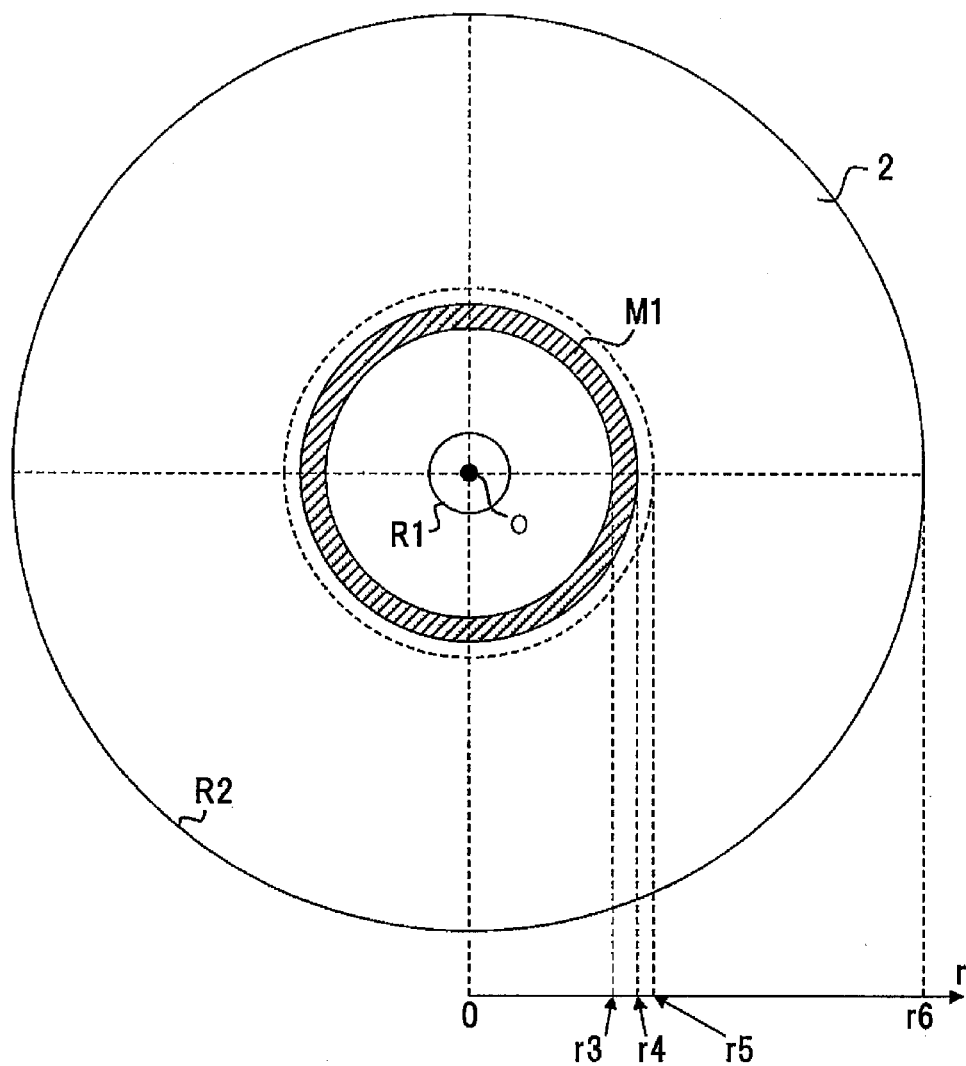
FIG. 20 This is a diagram for explaining a hologram recording medium in the second embodiment.

Referring to FIG. 20, the explanation will be given below concerning the hologram recording medium 2 in the second embodiment. The same reference numerals are affixed to configuration components that are common to the ones in FIG. 6 in the first embodiment. Accordingly, the explanation thereof will be omitted here. The point in which the hologram recording medium 2 differs from the first embodiment is that the eccentricity-detection-dedicated mark M2 does not exist. The angle-detection-dedicated mark M1 is the same as the first embodiment, and exists in the area of r3≤r≤r4.

Figure 21:
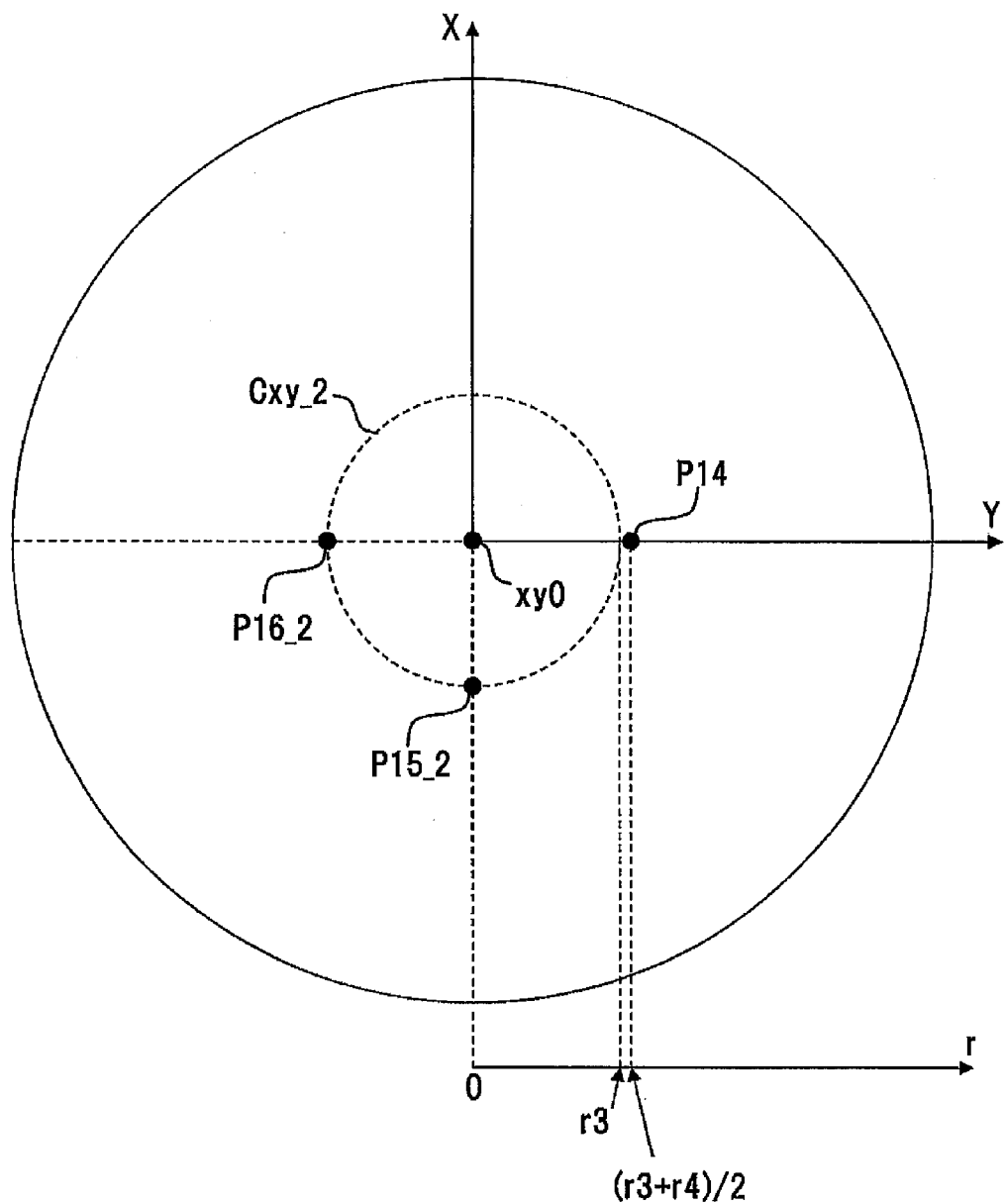
FIG. 21 This is a diagram for explaining the fixed position of each sensor in the second embodiment.

Subsequently, referring to FIG. 21, the explanation will be given below regarding the mounted positions of the sensors fixed onto the movable portion of the radial-direction transportation unit 52. FIG. 21 is a diagram for explaining the fixed position of each of the sensors with the movable portion of the radial-direction transportation unit 52 employed as the criterion. The same reference numerals are affixed to configuration components that are common to the ones in FIG. 7 in the first embodiment. Accordingly, the explanation thereof will be omitted here. Since the angle-detection-dedicated mark M1 is the same as the first embodiment, the point P14 indicating the mounted position of the rotational-angle detection sensor 14 is common to the case of the first embodiment.

A point P15_2 indicates the sensor center of the first eccentricity detection sensor 15, and a point P16_2 indicates the sensor center of the second eccentricity detection sensor 16. The point P15_2 and the point P16_2 exist on a circle Cxy_2, whose radius is equal to r3 and whose center is the point xyO.

When the movable portion of the displacement stage 51 exists at the driving criterion positon xyO, and when the eccentricity does not exist in the hologram recording medium 1, the first eccentricity detection sensor 15 and the second eccentricity detection sensor 16 are positioned at the edge of the inner circumference of the angle-detection-dedicated mark M1 provided in the area of r3≤r≤r4.

Subsequently, the explanation will be given below regarding the detection in the first eccentricity detection sensor 15 and the second eccentricity detection sensor 16 in the present embodiment. Incidentally, regarding the rotational-angle detection sensor 14, the detection becomes the same as the one in FIG. 8 in the first embodiment. Accordingly, the explanation thereof will be omitted here.

With respect to the first eccentricity detection sensor 15 and the second eccentricity detection sensor 16, the characteristics of a single sensor is the same as the characteristics explained in FIG. 9 in the first embodiment. On account of this, hereinafter, the explanation will be given below concerning the first eccentricity detection sensor 15.

Figure 22:
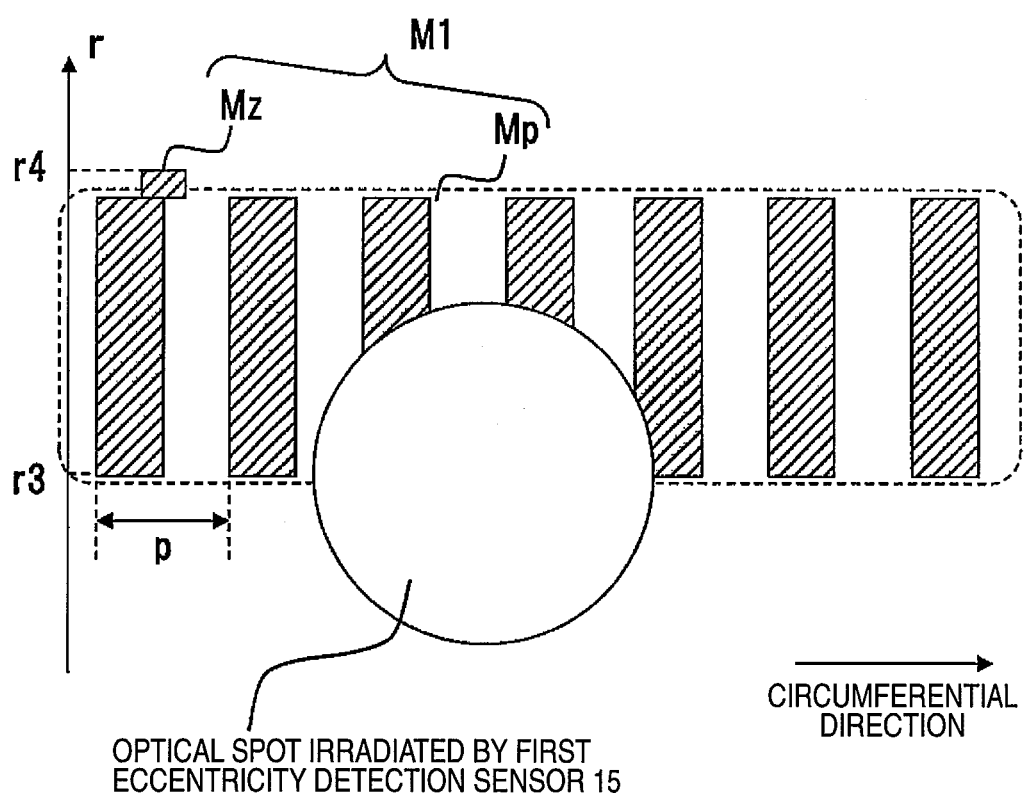
FIG. 22 This is a diagram for explaining the relationship between the angle-detection-dedicated marks and the first eccentricity detection sensor in the second embodiment.

The mark shape is deployed at a position onto which an optical spot emitted from the first eccentricity detection sensor 15 is irradiated. This mark shape differs from the case in the first embodiment. When the movable portion of the displacement stage 51 exists at the driving criterion positon xyO, and when the eccentricity does not exist in the hologram recording medium 1, as illustrated in FIG. 22, the optical spot irradiated from the first eccentricity detection sensor 15 is positioned at the edge of the inner circumference of the angle-detection-dedicated mark M1 provided in the area of r3≤r≤r4. Here, as was explained in the first embodiment, the first eccentricity detection sensor 15 is a sensor for detecting the light amount of a light that is reflected by the eccentricity-detection-dedicated mark M2, and that returns to the first eccentricity detection sensor 15. On account of this, if, as illustrated in FIG. 22, the optical spot irradiated from the first eccentricity detection sensor 15 is sufficiently larger than the period p of the angle-detection-dedicated mark M1, similarly to the case in FIG. 9 (b) in the first embodiment, the first eccentricity detection sensor 15 outputs by the light-amount difference the voltage that responds to the relative position relationship between the optical spot and the eccentricity-detection-dedicated mark M2. Namely, in the configuration in the present embodiment as well, each of the first eccentricity detection sensor 15 and the second eccentricity detection sensor 16 functions as the sensor for detecting the relative position relationship between the optical spot irradiated as the detection light and the eccentricity-detection-dedicated mark M2. This allows implementation of the eccentricity compensation control that is similar to the one in the first embodiment.

Next, the explanation will be given below concerning the effects obtained by using the present embodiment. When the angle-detection-dedicated mark M1 and the eccentricity-detection-dedicated mark M2 are separately provided like the first embodiment, it is necessary that the geometrical centers of the two concentric marks coincide with each other, and that the degrees of circularity of the two concentric marks are ensured. If this condition is not satisfied, the positioning accuracy of the hologram recording medium 1 becomes lowered resultantly. On account of this, when performing the high-density recording of the hologram, the hologram recording medium 1 is needed to be manufactured so that this condition is satisfied. Meanwhile, according to the configuration in the present embodiment, it is all right just to maintain the degree of circularity of the angle-detection-dedicated mark M1 alone. On account of this, the configuration in the present embodiment makes it possible to suppress the manufacturing cost of the hologram recording medium 2 in comparison with the case in the first embodiment.

Also, in the case of the present embodiment, the eccentricity-detection-dedicated mark M2 in the first embodiment need not be provided. As a result, it becomes possible to suppress the manufacturing cost of the hologram recording medium 2 from the viewpoint of reductions in the material expense and the manicuring steps as well.

The operation explained so far makes it possible to perform the recording or reproduction of the hologram at a position at which the eccentricity is cancelled. Also, simultaneously, the optimization of the mechanism-based installation sequence is performed. This makes it possible to accomplish the low-cost implementation and long-life-expectancy implementation of the apparatus.

In this way, according to the present embodiment, it becomes possible to implement the recording/reproduction that is preferable for the hologram recording medium.

Embodiment 3

In the first embodiment, the eccentricity compensation control has been set as an operation that is switched ON in the set-up processing, and that continues to be switched ON all the time thereinafter. The eccentricity compensation control, however, need not necessarily be switched ON all the time. Namely, some other mode is also implementable as its implementation mode. The present embodiment is a modified example of the first embodiment in this point-of-view.

The block diagram of a hologram recording/reproducing apparatus in the present embodiment is common to FIG. 1, i.e., the block diagram of the first embodiment. Also, the respective configuration components constituting the hologram recording/reproducing apparatus are also common to the ones in FIG. 1.

The present embodiment differs from the first embodiment only in a partial portion of its operation. Namely, of the respective processings in FIG. 4, i.e., the flowcharts of the set-up processing, the recording processing, and the reproduction processing in the first embodiment, the present embodiment differs therefrom in the concrete processing contents at the learning processing step S404, the seek processing S414, and the seek processing S423. Hereinafter, the points in which the present embodiment differs from the first embodiment will be explained.

In the first embodiment, it has been assumed that the XYON signal is switched at High at the learning processing step S404 in FIG. 4, and that the eccentricity compensation control continues to be switched ON all the time thereinafter. In the learning processing in the present embodiment, however, the XYON signal is not switched at High. Namely, the set-up processing is terminated without switching the eccentricity compensation control ON.

Subsequently, referring to a flowchart illustrated in FIG. 23, the explanation will be given below concerning the seek processing S414 in the present embodiment. Incidentally, the same flowchart also holds for the seek processing S422 as well. Here, the same numbers are affixed to the steps at which the same processing contents as FIG. 5, i.e., the flowchart of the first embodiment, are explained. Accordingly, the explanation of the processing contents will be omitted here.

Figure 5:
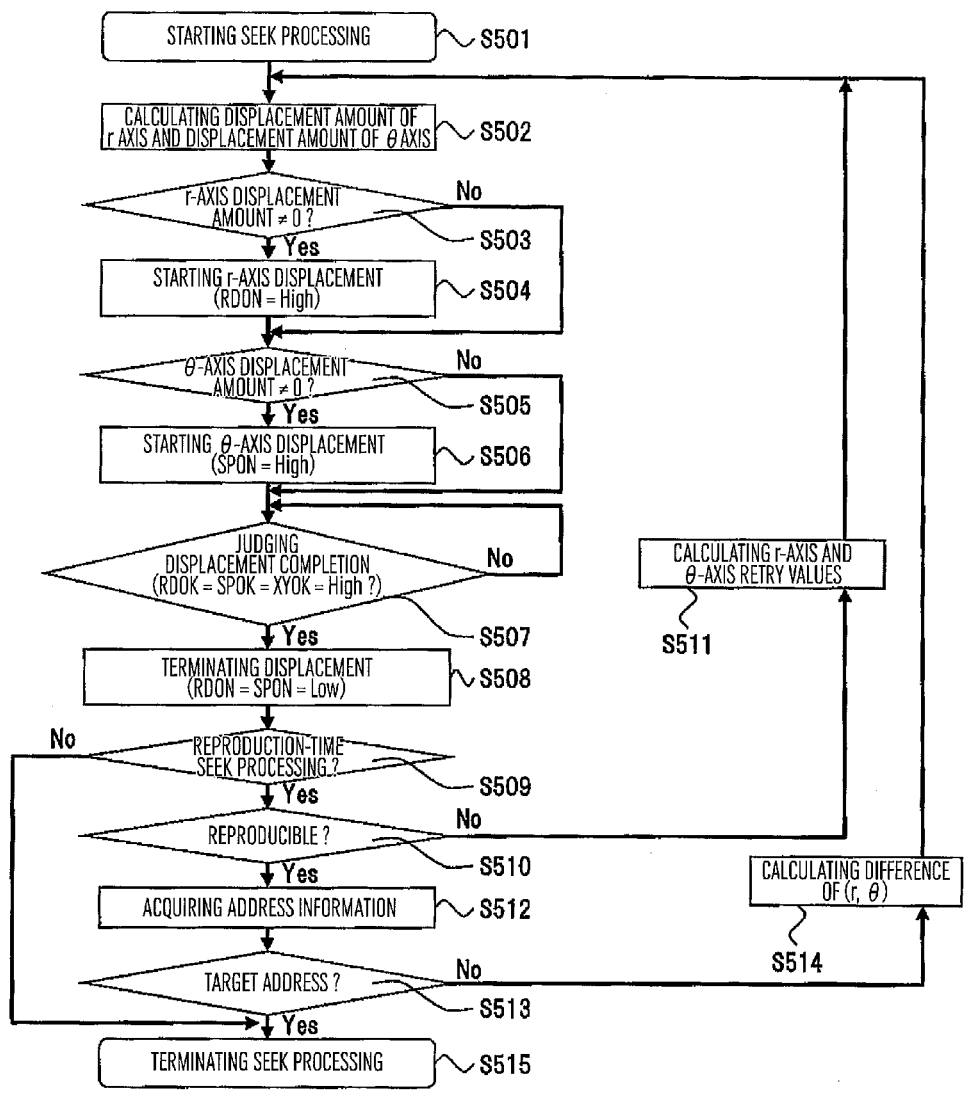
FIG. 5 This is a flowchart of the seek processing in the first embodiment.

There exist two points in which the flowchart of the present embodiment differs from FIG. 5, i.e., the flowchart of the first embodiment. The first point is the following point: A new step S516 is inserted between the step S501 and the step S502. In the present embodiment, when the seek processing is started (step S501), the eccentricity compensation control is started by switching the XYON signal at High (step S516). After that, the processing proceeds to the step S502. Also, in FIG. 5, i.e., the flowchart of the first embodiment, there existed the pattern of returning to the step S502. In the present embodiment as well, the point of returning to the step S502 is common thereto.

The second point is the following point: The processing contents at the step S508 is replaced by a new step S517. If it is judged that the displacements have been completed in the present embodiment (the case of Yes at the step S507), all of the RDON signal, the SPON signal, and the XYON signal are switched at Low, thereby switching the radial position control, the spindle control, and the eccentricity compensation control OFF to terminate the displacements (step S517). Subsequent to the step S517, the processing proceeds to the step S509.

As a result, the present embodiment differs from the first embodiment in the following points: Namely, the eccentricity compensation control is started at the step S516, i.e., the starting step of the seek processing. Also, not only the RDON signal and the SPON signal, but also the XYON signal are switched at Low in the displacement-terminating processing at the step S517.

Consequently, the eccentricity compensation control becomes an operation that is switched ON only during the seek processing. In the present embodiment as well, similarly to the first embodiment, the following point is common therebetween: The spindle control and the eccentricity compensation control are operated simultaneously. Moreover, the spindle control and the eccentricity compensation control are caused to continue to operate simultaneously, until the judgment results of both of the SPOK signal and the XYOK signal turn out to be OK. Consequently, even in the flowchart of the present embodiment, the contents explained as the second effect in the first embodiment also hold in the case of the present embodiment as well.

Here, even in the case of the modified example where, like the second embodiment, the ON/OFF timing of the eccentricity compensation control is changed, there exists a featured point that is common to the first embodiment. Namely, as the feature of the control method that is necessary in the case of the mechanism-based installation sequence as was explained in the first embodiment, the following point can be mentioned: Namely, the spindle control has converged already at the point-in-time at which the spindle control is switched OFF. In addition thereto, the eccentricity compensation control has also converged already. This point is one of the features of the control method in the present embodiment.

The operation explained so far makes it possible to perform the recording or reproduction of the hologram at a position at which the eccentricity is cancelled. In this way, according to the present embodiment, it becomes possible to implement the recording/reproduction that is preferable for the hologram recording medium.

Embodiment 4

In the third embodiment, the operation of the seek processing is employed such that, every time the seek processing is performed, the eccentricity compensation control is switched ON while the displacements of the r axis and the θ axis are underway. It is also possible, however, to employ the operation such that the eccentricity compensation control is not performed every time the seek processing is performed. Also, effects based thereon exist. The present embodiment is a modified example of the third embodiment in this point-of-view.

The block diagram of a hologram recording/reproducing apparatus in the present embodiment is common to FIG. 1, i.e., the block diagram of the first embodiment. Also, the respective configuration components constituting the hologram recording/reproducing apparatus are also common to the ones in FIG. 1.

The present embodiment differs from the third embodiment only in a partial portion of its operation. Namely, of the respective processings in FIG. 4, i.e., the flowcharts of the set-up processing, the recording processing, and the reproduction processing in the third embodiment (and the first embodiment), the present embodiment differs therefrom in the concrete processing contents at the seek processing S414 and the seek processing S422. Incidentally, in the third embodiment, it has been set that the set-up processing is terminated without switching the eccentricity compensation control ON. This point is also common in the present embodiment as well.

First of all, the explanation will be given below concerning a seek operation that is assumed by the hologram recording/reproducing apparatus 10 in the present embodiment. The hologram recording/reproducing apparatus 10 in the present embodiment makes the following assumption: A seek processing where only the spindle motor 50 is rotated is continued in a plurality of times. At this time, it is assumed that the controller 80 in the present embodiment is equipped with a function of memorizing the θ-axis displacement amount $\Delta\theta k$ in a k-th (k: natural number) seek processing, and a function of memorizing a sum-total which is obtained by adding the θ-axis displacement amounts $\Delta\theta k$ in a plurality of seek processings.

Moreover, in the present embodiment, in the continued seek processings where only the spindle motor 50 is rotated, the eccentricity compensation control is not performed every time the seek processing is performed. The controller 80 calculates a cumulative rotational angle θsum by the amount of which the spindle motor 50 has been rotated from a point-in-time at which the eccentricity compensation control was terminated last to the present point-in-time. Then, only when the cumulative rotational angle θsum becomes larger than a threshold value, the controller 80 performs the eccentricity compensation control. Hereinafter, a flowchart for implementing this operation will be explained.

Referring to a flowchart illustrated in FIG. 24, the explanation will be given below concerning the seek processing S414 in the present embodiment. Incidentally, the same flowchart also holds for the seek processing S422 as well. Here, the same numbers are affixed to the steps at which the same processing contents as FIG. 23, i.e., the flowchart of the third embodiment, are explained. Accordingly, the explanation of the processing contents will be omitted here.

Figure 23:
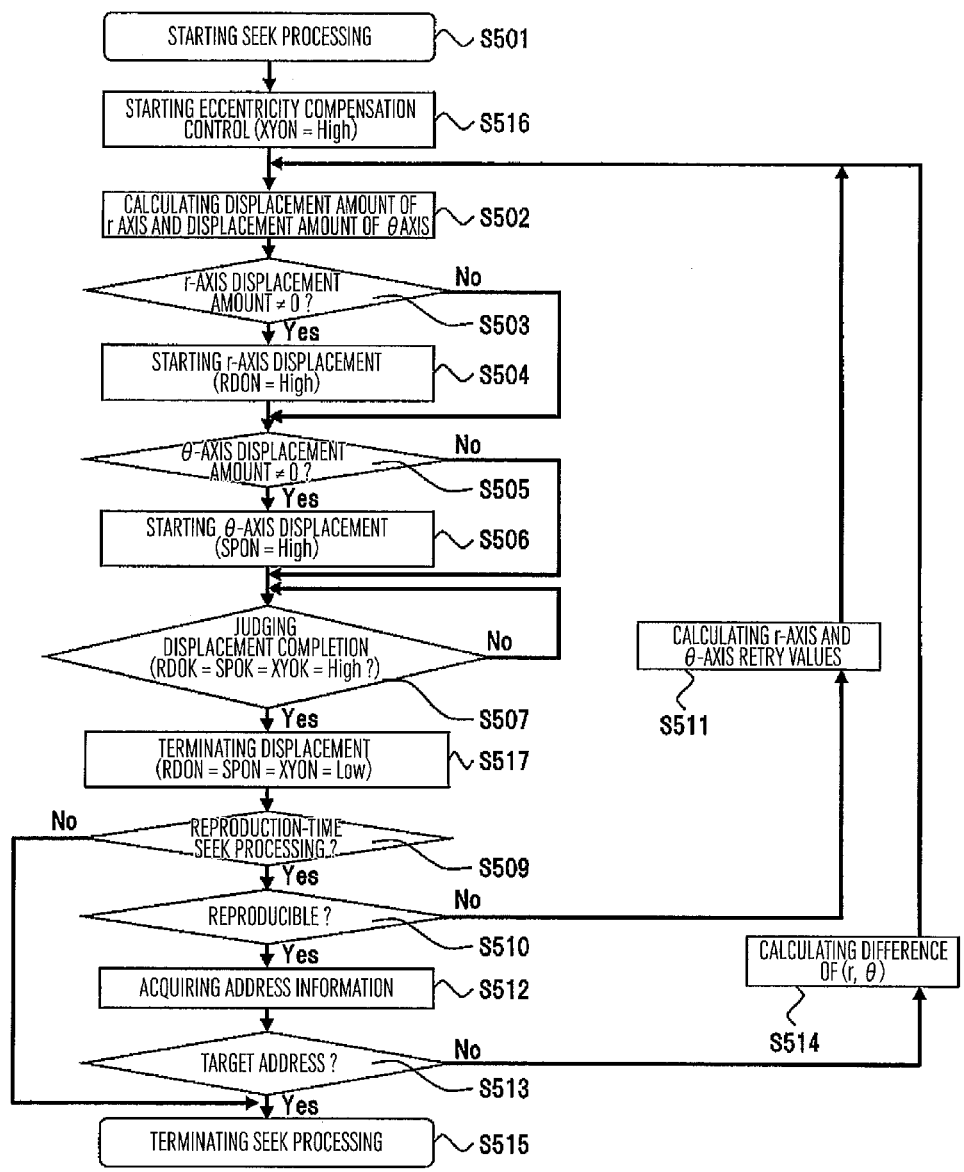
FIG. 23 This is a flowchart of the seek processing in a third embodiment.
Figure 24:
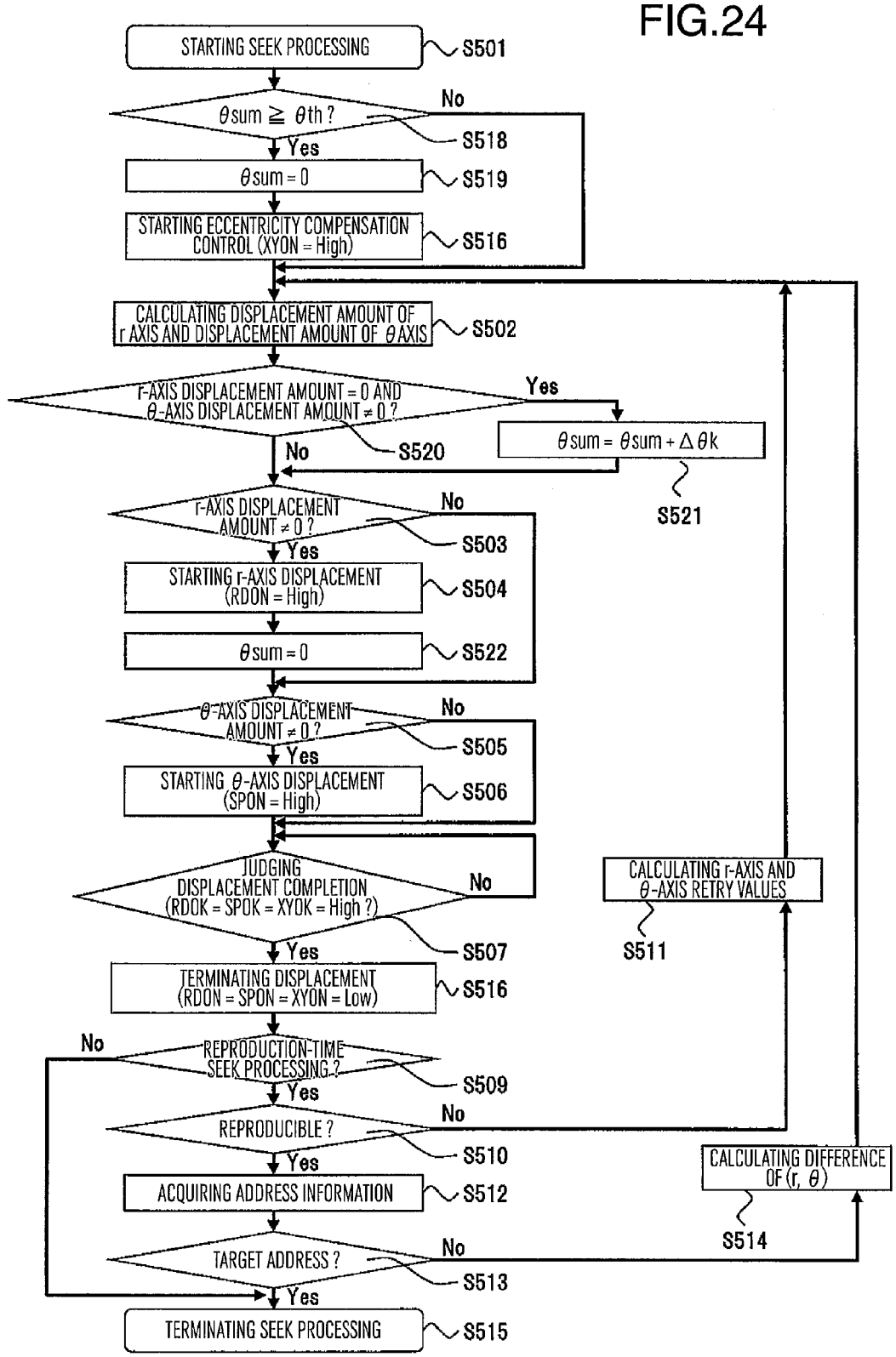
FIG. 24 This is a flowchart of the seek processing in a fourth embodiment.

When compared with FIG. 23, i.e., the flowchart of the third embodiment, newly-added steps are five steps, which are a step S518 through a step S522. The step S518 and the step S519 are inserted between the step S501 and the step S516 in FIG. 23. The step S520 and the step S521 are inserted between the step S502 and the step S503 in FIG. 23. Furthermore, the step S522 is inserted between the step S504 and the step S505 in FIG. 23. Hereinafter, the explanation will be given below regarding the respective steps.

In the present embodiment, when the seek processing is started (step S501), it is judged whether or not the cumulative rotational angle θsum, by the amount of which the spindle motor 50 has been rotated from a point-in-time at which the eccentricity compensation control was terminated last to the present point-in-time, is larger than a threshold value θth (step S518). Here, it is assumed that the cumulative rotational angle θsum is memorized into the controller 80. If θsum is larger than the threshold value θth (the case of Yes at the step S518), the value of the cumulative rotational angle θsum memorized into the controller 80 is set at zero (step S519). After that, the processing proceeds to the step S516, and further, transfers to the step S502. Meanwhile, if θsum is not larger than the threshold value θth (the case of No at the step S518), the processing transfers to the step S502 without performing the step S519 and the step S516.

At the step S502, a difference between the coordinate (r, θ), at which the hologram of a target address is positioned, and the present position is calculated, thereby calculating the displacement amounts about the r axis and the θ axis. Hereinafter, the θ-axis displacement amount is represented by Δθk. Next, it is judged whether or not "the r-axis displacement amount is equal to zero, and the θ-axis displacement amount is not equal to zero" holds (step S520). This condition is equivalent to the judgment as to whether or not the processing is the seek processing where only the spindle motor 50 is rotated.

If "the r-axis displacement amount is equal to zero, and the θ-axis displacement amount is not equal to zero" holds (the case of Yes at the step S520), the θ-axis displacement amount Δθk is added to the value of the cumulative rotational angle θsum memorized into the controller 80 (step S521). After the step S521, the processing proceeds to the step S503. Meanwhile, if "the r-axis displacement amount is equal to zero, and the θ-axis displacement amount is not equal to zero" does not hold (the case of No at the step S520), the processing transfers to the step S503 without performing the step S521.

Also, after the step S504 is executed, the value of the cumulative rotational angle θsum memorized into the controller 80 is set at zero (step S522). After that, the processing transfers to the step S505.

According to the above-described flowchart, the following operations are implemented: As long as the seek processing where only the spindle motor 50 is rotated is continued, the cumulative rotational angle θsum continues to be added. If a seek processing where the radial-direction transportation unit 52 is driven is performed, the cumulative rotational angle θsum is reset at zero. Moreover, as long as a seek processing is performed where the cumulative rotational angle θsum managed in this way becomes larger than the threshold value θth, the eccentricity compensation control is switched ON.

Next, the explanation will be given below concerning the effects obtained by using the present embodiment. When the present embodiment is used, the eccentricity compensation control is not executed every time the seek processing is executed. Accordingly, unlike the case of the first embodiment, it is impossible to perform the recording or reproduction of the hologram at a position at which the eccentricity is cancelled. On account of this, the recording or reproduction of the hologram is performed in a manner of being positioned at an infinitesimally-shifted position. At this time, it strongly depends on performance of the optical system and characteristics of the hologram recording medium 1 whether or not its influence will be exerted on the recording or reproduction. Namely, even if, like the present embodiment, the eccentricity compensation control is not executed every time, and even if the eccentricity is not completely cancelled, no problem occurs as long as a positioning error caused thereby is smaller than a tolerable amount requested.

Meanwhile, the execution of the eccentricity compensation control means that the displacement stage 51 is driven. The spindle motor 50 is fixed onto the movable portion of the displacement stage 51. It is effective enough to consider only the hologram recording medium 1 as the load imposed when the spindle motor 50 is rotated. It is absolutely necessary, however, to consider the spindle motor 50 and the hologram recording medium 1 as the load imposed when the displacement stage 51 is driven. In general, the weight of the spindle motor 50 is heavier as compared with that of the hologram recording medium 1. On account of this, there is a feature that it is of the difficult configuration to drive the displacement stage 51 at a high speed.

Also, the load imposed on the radial-direction transportation unit 52 is much heavier. On account of this, concerning the r axis and the θ axis, i.e., the driving axes in the seek processing, there is also a feature that it is of the difficult configuration to drive the r axis at a high speed.

Here, consideration is given to the sequence in which the hologram will be recorded/reproduced. The r axis and the θ axis are driven in accordance with a predetermined sequence, and finally, the front surface of the hologram recording medium 1 is scanned. This allows execution of the recording or reproduction of all the data with respect to the hologram recording medium 1. Here, since the θ axis is more suitable for the high-speed driving as compared with the r axis, it is preferable to lessen the number of displacements of the r axis. This is implementable by executing the following operation: Namely, the irradiation position is changed into a circumferential direction (whose rotational direction is assumed to be the clockwise direction) by repeating the θ-axis driving in a plurality of times. Then, the r axis is displaced at one time by the amount of a predetermined spacing. Then, again, the irradiation position is changed into a circumferential direction (whose rotational direction is assumed to be the counterclockwise direction) by repeating the θ-axis driving in a plurality of times. This operation is repeated, thereby scanning a substantially rectangular area. Namely, in order to enhance the transfer rate at the recording or reproduction time, it is preferable that the seek processing where only the spindle motor 50 is rotated becomes an operation which is continued in a plurality of times.

However, even when the seek processing where only the spindle motor 50 is rotated is executed continuously in order to enhance the transfer rate in this way, if the eccentricity compensation control is executed every time the seek processing is executed, there exists the following problem: Namely, the convergence of the displacement stage 51 in the eccentricity compensation control is slow, and resultantly, the transfer rate becomes lowered. According to the operation in the present embodiment, the eccentricity compensation control is not executed every time the seek processing is executed. This makes it possible to reduce the lowering in the transfer rate. The threshold value θth is set within a range in which the positioning error becomes smaller than a tolerable amount requested. Here, the positioning error is caused to occur by the condition that the eccentricity compensation control is not executed while the spindle motor 50 is rotated by the amount of the rotational angle θsum. This setting allows implementation of the configuration where the influence exerted on the recording or reproduction of the hologram does not become the problem, while suppressing the lowering in the transfer rate down to its minimum.

Namely, according to the flowchart in the present embodiment, it becomes possible to suppress the lowering in the transfer rate, which is caused by the execution of the eccentricity compensation control. In this way, according to the present embodiment, it becomes possible to implement the recording/reproduction that is preferable for the hologram recording medium.

The edge of the outer circumference of the eccentricity-detection-dedicated mark M2 in the first embodiment, and the edge of the inner circumference of the angle-detection-dedicated mark M1 in the second embodiment become edges that are used when the eccentricity compensation control is performed. In this way, as the edges used when the eccentricity compensation control is performed, the edge on the inner-circumference side of the predetermined mark provided on the medium may be detected, or the edge on the outer-circumference side of the predetermined mark provided thereon may be detected.

The edge of the outer circumference of the eccentricity-detection-dedicated mark M2 in the first embodiment, and the edge of the inner circumference of the angle-detection-dedicated mark M1 in the second embodiment become the edges that are used when the eccentricity compensation control is performed. With respect to each edge used in this eccentricity compensation control, it is preferable that the degree of circularity is managed by a predetermined criterion. For example, if the degree of circularity is guaranteed by the standard, the positioning performance based on the use of the eccentricity compensation control of the present invention can be guaranteed.

Also, in the above-described embodiments, the configuration has been employed as follows: A light of a predetermined wavelength is irradiated from each of the first eccentricity detection sensor 15 and the second eccentricity detection sensor 16 in the above-described embodiments, and a light that is reflected by the reflection portion is detected. Each eccentricity detection sensor, however, is effective enough to output the voltage that responds to the relative position relationship with the eccentricity-detection-dedicated mark M2 as is illustrated in FIG. 9 (*b*). A sensor that does not irradiate a light is also usable. For example, each eccentricity detection sensor may also be a sensor for photographing the eccentricity-detection-dedicated mark M2 by using a light-receiving element such as a camera, and outputting, from the photographed result, the voltage that responds to the relative position relationship with the eccentricity-detection-dedicated mark M2.

When a camera is used as the first eccentricity detection sensor 15, "sensor center" in the present specification can be rephrased such that it indicates the central position of an area to be photographed by the camera. Namely, "sensor center" in the present specification indicates the central position of an area to be detected by the sensor. Also, deploying the sensor at a point S means that the central position of an area to be detected by the sensor is caused to coincide with the point S.

Incidentally, as the most preferable configuration in the above-described embodiments, the configuration has been employed as follows: The sensors are deployed in a manner of being orthogonal to each other with reference to the driving criterion positon xyO. In addition, the eccentricity compensation circuit 30 is so configured as to be independent of each other in the X axis and the Y axis. Moreover, the control over the X axis and the control over the Y axis are so configured as to be simultaneously started by one and the same control signal XYON. Another implementation mode, however, is also implementable.

For example, the configuration is also allowable where the control over the X axis and the control over the Y axis are performed not simultaneously, but alternately. In this case, it is insufficient that the control over the X axis and the control over the Y axis are performed in a one-by-one manner. Namely, the operation becomes such that the control over the X axis and the control over the Y axis are repeated in a plurality of times.

Also, the following mode is also implementable: Namely, the sensors are not deployed at the positions that are orthogonal to each other with reference to the driving criterion positon xyO. Instead, as illustrated in FIG. 13 (*a*) for example, the fixed position of the first eccentricity detection sensor 15 is changed to P15'. One implementation mode of this configuration is that the driving axes of the displacement stage 51 are not permitted to become orthogonal to each other. As described earlier, the limitation associated with the deployment of the sensors has been given as follows: Namely, the tangents to the circle Cxy at the point P15 and the point P16, i.e., the points at which the eccentricity detection sensors are to be deployed, are parallel to the driving axes of the displacement stage 51. On account of this, for example, satisfying this constraint when the X axis of the displacement stage 51 is the X' axis in FIG. 13 (*a*) absolutely requires that the fixed position of the first eccentricity detection sensor 15 be P15'. In this way, the configuration is also implementable where the driving axes of the displacement stage 51 are not permitted to become orthogonal to each other.

Another implementation mode of the mode where the fixed position of the first eccentricity detection sensor 15 is changed to P15' is as follows: Namely, the response speed of the X-axis control system and the response speed of the Y-axis control system are made different from each other. In an XY stage, usually, the mechanism of the other movable axis is installed on the mechanism of one movable axis (which is set as being the X axis for explanation). On account of this, when the comparison is made between the X-axis control system and the Y-axis control system, the weight of Y-axis driving units (e.g., stepping motor and lead screw) is excessively imposed on the X-axis control system.

This weight allows the response speed of the X-axis control system to be designed so that the response speed of the X-axis control system becomes slower than the response speed of the Y-axis control system. In this case, however, in addition to the fact that the constraint is imposed on the mechanism design, there is an aspect that the response speed of the X-axis control system becomes slower more than necessary. Accordingly, the configuration in the first embodiment is more preferable.

Still another implementation mode of the mode where the fixed position of the first eccentricity detection sensor 15 is changed to P15' is as follows: Namely, in the eccentricity compensation circuit 30, the X axis and the Y axis are not controlled in the manner of being independent of each other. The position of the geometrical center O of the eccentricity-detection-dedicated mark M2 can be calculated by making the calculation from the output voltage from the first eccentricity detection sensor 15 and the output voltage from the second eccentricity detection sensor 16. This calculation is made in the eccentricity compensation circuit 30. Then, based on the calculated amount, the constraint is imposed onto the X axis and the Y axis. In the case of this configuration, the calculation becomes a one whose precondition is that the eccentricity-detection-dedicated mark M2 is a perfect circle. As a result, there is an aspect that the requested accuracy of the degree of circularity becomes higher, and that the manufacturing cost of the hologram recording medium 1 becomes higher. On account of this, the configuration in the first embodiment is more preferable.

As having been explained so far, a variety of modified examples are conceivable in association with the configuration of the inside of the eccentricity compensation circuit 30, and the deployment of the eccentricity detection sensors that output the signals to be inputted into the eccentricity compensation circuit 30.

The controllers in the above-described embodiments, e.g., the spindle controller 3202, the radial-position controller 3402, the X-axis compensator 3001, and the Y-axis compensator 3003 can be constituted by digital filters, for example. The digital filters perform the compensation of the gain and phase, thereby ensuring the stability of each control system.

Incidentally, in the above-described embodiments, as the mechanism for controlling the optical beam, which is irradiated from the pickup 11 and the cure optical system 13, so that the optical beam is irradiated onto a predetermined position on the hologram recording medium 1, the configuration of transporting the hologram recording medium 1 has been employed. This configuration is like the radial-direction transportation unit 52 in the first embodiment, for example. The configuration for guiding the irradiation position of the optical beam, however, is not limited to this configuration. For example, the configuration is also allowable where the hologram recording medium 1 is fixed, and where the pickup 11 and the cure optical system 13 are transported. In this case the radial-direction transportation unit 52 need not be used. The displacement stage 51, the first eccentricity detection sensor 15, the second eccentricity detection sensor 16, and the rotational-angle detection sensor 14 are fixed onto a member whose position is fixed.

In the above-described embodiments, the configuration has been employed such that the recording based on the angle-multiplexing scheme is performed by changing the incident angle of the reference light. The present invention, however, is similarly applicable to the case as well where a multiplexing scheme other than the angle-multiplexing scheme is used. Moreover, the present invention is similarly applicable to the case of the hologram recording as well where the angle-multiplexed recording is not performed.

Incidentally, the present invention is not limited to the above-described embodiments. Also, in addition to the above-described examples, a variety of modified examples are included therein. For example, the above-described embodiments have been explained in detail in order to explain the present invention in an easy-to-understand manner. Namely, the above-described embodiments are not necessarily limited to the embodiments that include all of the configurations explained. Also, a partial configuration of the configuration of a certain embodiment can be replaced by the configuration of another embodiment. Also, the configuration of another embodiment can be added to the configuration of a certain embodiment. Also, the addition/deletion/replacement of another configuration can be performed with respect to a partial configuration of the configuration of each embodiment.

Also, the above-described embodiments have been explained employing the hologram recording/reproducing apparatus as the example. The present invention, however, is not limited thereto. Namely, it is also applicable to a recording apparatus and a recording medium where another recording scheme is employed. For example, the present invention is also applicable to a volume-recording-employed recording apparatus and a volume-recording-employed recording medium. When the present invention is applied to the hologram recording/reproducing apparatus, it becomes possible to solve the following problem: Namely, when performing the high-density recording, the request for a positioning tolerable amount of the reference-light irradiation position becomes severer. Accordingly, the present invention makes it possible to implement the high-density recording. On account of this, when the present invention is applied to the hologram recording/reproducing apparatus, the particularly significant effects are implementable.

Also, a partial element or the entire elements of the above-described respective configurations, functions, processing units, and processing methods may also be implemented using hardware in such a manner as to be designed using integrated circuits. Also, the above-described respective configurations and functions may also be implemented using software in such a manner that a processor interprets and executes the programs for implementing the respective functions. The information such as the programs, tables, and files for implementing the respective functions can be stored into the recording apparatuses such as memory, hard disc, and SSD (Solid State Drive), or the recording media such as IC card, SD card, and DVD.

Also, the control lines and information lines indicated herein are the ones that are conceivable as being necessary for the explanation. Namely, all of the control lines and information lines are not necessarily indicated from the product's point-of-view. It is also allowable to consider that almost all the configurations are connected to each other actually.

REFERENCE SIGNS LIST

1 . . . hologram recording medium
2 . . . hologram recording medium
10 . . . hologram recording/reproducing apparatus
11 . . . pickup
14 . . . rotational-angle detection sensor
15 . . . first eccentricity detection sensor
16 . . . second eccentricity detection sensor
17 . . . radial-position detection sensor 30 . . . eccentricity compensation circuit
32 . . . spindle control circuit
34 . . . radial-direction transportation control circuit
50 . . . spindle motor
51 . . . displacement stage
52 . . . radial-direction transportation unit
80 . . . controller
3201 . . . rotational-angle calculation circuit
3202 . . . spindle controller
3203 . . . spindle-output control switch
3204 . . . spindle-control judgment circuit
3401 . . . radial-position calculation circuit
3402 . . . radial-position controller
3403 . . . radial-position-output control switch
3404 . . . radial-position-control judgment circuit
3001 . . . X-axis compensator
3002 . . . X-axis-output control switch
3003 . . . Y-axis compensator
3004 . . . Y-axis-output control switch
3005 . . . eccentricity-compensation judgment circuit
3101 . . . X-axis driving circuit
3102 . . . Y-axis driving circuit

The invention claimed is:

1. A recording/reproducing apparatus for recording or reproducing information by irradiating light onto a recording medium, comprising:
a medium rotation unit for rotating the recording medium;
a displacement stage having a movable portion that moves along at least two driving axes in a predetermined plane, and the medium rotation unit is fixed onto the movable portion;
a rotational-angle detection unit for detecting a rotational angle of the recording medium by using an angle-detection-dedicated mark disposed on the recording medium;
a position detection unit for detecting a position of the recording medium by detecting an edge of an inner-circumference side or an outer-circumference side of an eccentricity-detection-dedicated mark provided on the recording medium; and
a transportation unit on which the displacement stage, the rotational-angle detection unit and the position detection unit are fixed,
wherein the movable portion moves in the predetermined plane relative to the transportation unit, and the predetermined plane is substantially parallel to a recording surface of the recording medium.

2. The recording/reproducing apparatus according to claim 1,
wherein the angle-detection-dedicated mark has a concentric pattern that is disposed circumferentially in a first area on the recording surface of the recording medium, and
wherein the eccentricity-detection-dedicated mark has a concentric pattern that is disposed circumferentially at a second area on the recording surface of the recording medium different from the first area.

3. The recording/reproducing apparatus according to claim 1,
wherein the angle-detection-dedicated mark and the eccentricity-detection-dedicated mark are a same mark having a concentric pattern that is disposed circumferentially on the recording surface of the recording medium.

4. The recording/reproducing apparatus according to claim 1, further comprising:

a medium-rotation control unit for positioning the recording medium at a predetermined rotational angle by controlling the medium rotation unit on the basis of an output signal from the rotational-angle detection unit; and
an eccentricity compensation unit for controlling the movable portion of the displacement stage on the basis of an output signal from the position detection unit,
wherein the eccentricity compensation unit and the medium-rotation control unit operate to position the recording medium at a geometric center of the eccentricity-detection-dedicated mark.

5. The recording/reproducing apparatus according to claim 1, further comprising:
a medium-rotation control unit for positioning the recording medium at a predetermined rotational angle by controlling the medium rotation unit on the basis of an output signal from the rotational-angle detection unit; and
an eccentricity compensation unit for controlling the movable portion of the displacement stage on the basis of an output signal from the position detection unit, and
wherein, when the medium rotation unit is controlled to rotate the recording medium by the predetermined rotational angle with the medium-rotation control unit, the eccentricity compensation unit controls the movable portion of the displacement stage.

6. The recording/reproducing apparatus according to claim 1, further comprising:
a medium-rotation control unit for positioning the recording medium at a predetermined rotational angle by controlling the medium rotation unit on the basis of an output signal from the rotational-angle detection unit;
an eccentricity compensation unit for controlling the movable portion of the displacement stage on the basis of an output signal from the position detection unit;
a medium-rotation control judgment unit for judging convergence of medium-rotation control by the medium-rotation control unit; and
an eccentricity-compensation judgment unit for judging convergence of eccentricity-compensation control by the eccentricity compensation unit, and
wherein the positioning of the recording medium is judged to be completed, when both the medium-rotation control and the eccentricity-compensation control are judged to have converged by the medium-rotation control judgment unit and the eccentricity-compensation judgment unit.

7. The recording/reproducing apparatus according to claim 1, further comprising:
a medium-rotation control unit for positioning the recording medium at a predetermined rotational angle by controlling the medium rotation unit on the basis of an output signal from the rotational-angle detection unit; and
an eccentricity compensation unit for controlling the movable portion of the displacement stage on the basis of an output signal from the position detection unit,
wherein the eccentricity compensation unit drives the movable portion of the displacement stage while the medium-rotation control unit controls the medium rotation unit to rotate the recording medium.

8. The recording/reproducing apparatus according to claim 1, further comprising:
a medium-rotation control unit for positioning the recording medium at a predetermined rotational angle by controlling the medium rotation unit on the basis of an output signal from the rotational-angle detection unit; and an eccentricity compensation unit for controlling the movable portion of the displacement stage on the basis of an output signal from the position detection unit, wherein the medium-rotation control unit controls the medium rotation unit to rotate and stop the recording medium by a predetermined angle repeatedly, wherein a controller calculates a cumulative rotational angle from the repeated rotation of the recording medium by the predetermined angle, and wherein the eccentricity compensation unit drives the movable portion of the displacement stage when the cumulative rotational angle is larger than a predetermined angle.

9. The recording/reproducing apparatus according to claim 1, wherein the position detection unit includes at least two sensors fixed at different positions on the transportation unit, and wherein the sensors output respective voltages according to respective detected positions of the eccentricity-detection-dedicated mark.

10. The recording/reproducing apparatus according to claim 5, wherein the movable portion of the displacement stage moves along a first driving axis and a second driving axis as the at least two driving axes, wherein the position detection unit includes a first sensor and a second sensor fixed separately on the transportation unit corresponding to the first driving axis and the second driving axis, wherein the first sensor and the second sensor each output a respective voltage that corresponds to the eccentricity-detection-dedicated mark, wherein the eccentricity compensation unit controls the movable portion to move along the first driving axis so that the respective voltage output from the first sensor becomes equal to a predetermined voltage, and controls the movable portion to move along the second driving axis so that the respective voltage output from the second sensor becomes equal to the predetermined voltage.

11. The recording/reproducing apparatus according to claim 7, wherein the movable portion of the displacement stage is an XY stage which moves along a first driving axis and a second driving axis which are orthogonal to each other as the at least two driving axes, wherein the position detection unit includes a first sensor and a second sensor, wherein the first sensor and the second sensor each output a respective voltage that corresponds to a relative position with the eccentricity-detection-dedicated mark, wherein the first sensor and the second sensor are fixed separately on the transportation unit corresponding to the first driving axis and the second driving axis, and wherein the eccentricity compensation unit controls the movable portion to move along the first driving axis so that the respective voltage output from the first sensor becomes equal to a predetermined voltage, and controls the movable portion to move along the second driving axis so that the respective voltage output from the second sensor becomes equal to the predetermined voltage.

12. The recording/reproducing apparatus according to claim 1, wherein the information is recorded into the recording medium as a hologram using a signal light and a reference light, wherein at least one of the rotational-angle detection unit and the position detection unit include an optical sensor that irradiates a detection light onto the recording medium, and wherein a wavelength of the detection light is different from a wavelength of the reference light.

13. A recording/reproducing apparatus for recording or reproducing information with respect to a recording medium, comprising:

a medium rotation unit including a spindle and motor to mount and rotate the recording medium around a predetermined rotational axis;

a pickup to record or reproduce the information with respect to the recording medium;

a displacement stage having a movable portion that moves along at least two driving axes in a predetermined plane, and the medium rotation unit is fixed onto the movable portion;

a mark detection unit for detecting a predetermined mark disposed on the recording medium; and a transportation unit on which the displacement stage and the mark detection unit are fixed, wherein the movable portion moves the medium rotation unit relative to the transportation unit, and wherein the pickup is disposed separately from the transportation unit.

14. A recording medium for recording or reproducing information, comprising:

a concentric angle-detection-dedicated mark for detecting a rotational angle of the recording medium; and a concentric eccentricity-detection-dedicated mark for detecting an eccentricity where a rotational center of the recording medium does not coincide with a geometric center of the recording medium, wherein the concentric eccentricity-detection-dedicated mark is provided at a radial distance from the geometric center of the recording medium different from the concentric angle-detection-dedicated mark.

15. The recording medium according to claim 14, wherein a degree of circularity of an edge of an inner-circumference side or an outer-circumference side of the eccentricity-detection-dedicated mark is managed by a predetermined criterion.

16. A recording medium for recording or reproducing information, comprising:

a concentric eccentricity-detection-dedicated mark for detecting an eccentricity where a rotational center of the recording medium does not coincide with a geometric center of the recording medium, wherein a degree of circularity of an edge of an inner-circumference side or an outer-circumference side of the eccentricity-detection-dedicated mark is managed by a predetermined criterion, and wherein the eccentricity-detection-dedicated mark is also for detecting a rotational angle of the recording medium.

17. The recording medium according to claim 14, wherein the concentric eccentricity-detection-dedicated mark is located in a first area having a radial distance from the geometric center of the recording medium different from an information recording area where the information is recorded.

18. The recording medium according to claim 14,
wherein the recording medium is a hologram recording medium in which information is recorded by irradiating a signal light and a reference light onto the recording medium,
   wherein a position of the recording medium is detected by irradiating a light onto the concentric eccentricity-detection-dedicated mark, and a wavelength of the light is different from a wavelength of the reference light.

19. The recording/reproducing apparatus according to claim 1, further comprising:
   a pickup to irradiate a signal light and a reference light into the recording medium,
   wherein the recording medium is a hologram recording medium in which the information is recorded by irradiating the signal light and a reference light into the recording medium,
   wherein at least one of the rotational-angle detection unit and the position detection unit include an optical sensor that irradiates a detection light onto the recording medium,
   wherein a wavelength of the detection light is different from a wavelength of the reference light, and
   wherein the transportation unit moves the recording medium in a radial direction relative to the pickup.

\* \* \* \* \*